United States Patent [19]

Gupta

[11] Patent Number: 5,438,402
[45] Date of Patent: Aug. 1, 1995

[54] SYSTEM AND METHOD FOR MEASURING THE INTERFACE TENSILE STRENGTH OF PLANAR INTERFACES

[75] Inventor: Vijay Gupta, Hanover, N.H.

[73] Assignee: Trustees of Dartmouth College, Hanover, N.H.

[21] Appl. No.: 26,682

[22] Filed: Mar. 5, 1993

[51] Int. Cl.$^6$ .......................... G01L 1/24; G01B 11/16
[52] U.S. Cl. ..................... 356/35.5; 356/32; 356/345; 356/353
[58] Field of Search ............... 356/35.5, 32, 345, 353

[56] References Cited

U.S. PATENT DOCUMENTS

| | | | |
|---|---|---|---|
| 4,180,324 | 12/1979 | Primbsch | 356/35.5 |
| 4,280,764 | 7/1981 | Sica, Jr. et al. | 356/35.5 |
| 4,515,867 | 5/1985 | Bleacher et al. | 428/204 |
| 4,571,077 | 2/1986 | Skeldon | 356/35.5 |
| 4,722,600 | 2/1988 | Chiang | 356/35.5 |
| 4,939,368 | 7/1990 | Brown | 356/35.5 |
| 5,020,904 | 6/1991 | McMahan, Jr. | 356/35.5 |
| 5,026,154 | 6/1991 | Deason | 356/35.5 |

OTHER PUBLICATIONS

Barker, *Laser Interferometry in Shock-Wave Research*, Exp. Mech. pp. 209–215 May (1972).
Fox, *Effect of Water and Paint Coatings on Laser-Irradiated Targets*, Appl. Phys. Lett., 24:461–464 May (1974).
Yang, *Stress Waves Generated in Thin Metallic Films by a Q-Switched Ruby Laser*, J. Appl. Phys., 45:2601–2608, Jun. (1974).
Goosman, *Analysis of the Laser Velocity Interferometer*, J. Appl. Phys., 46:3516–3624 Aug. (1975).
Amery, *Wide Range Velocity Interferometer*, Sixth Symposium on Detonation Office of Naval Research, Dept. of the Navy, Arlington, Va. Aug. 24–27, pp. 673–681 (1976).
Vossen, *Adhesion Measurements of Thin Films, Thick Films, and Bulk Coatings*, edited by K. L. Mittal (STP-640), ASTM (American Society for Testing Materials) Philadelphia, Pa., Nov. 1976, pp. 122–133.
Monchalin et al., *Laser Ultrasonic Generation and Optical Detection with Confocal Fabry-Perot Interferometer*, Materials Eval., 44:1231–1237 Sep. (1960).
Gupta et al., *Measurement of Interface Strength by Laser-Pulse-Induced Spallation*, Material Sci. & Eng., A126:105–117 Jun. (1990).
Gupta et al., *Measurement of Interface Strength by Laser Spallation Technique*, J. Mech. Phys. Solids 40:141–180 (1992).
Gupta et al., *Calculation, Measurement and Control of Interface Strength in Composites*, J. Amer. Ceram. Soc., 76:305–315 Feb. (1993).

*Primary Examiner*—Rolf Hille
*Assistant Examiner*—David Ostrowski
*Attorney, Agent, or Firm*—Lahive & Cockfield

[57] ABSTRACT

A system for measuring the tensile strength of a planar interface between a substrate and a coating which includes an energy source that generates an electromagnetic beam along a first axis, and a sample assembly disposed along the first axis having a first face, and a second face, where the first and second faces are oppositely opposed. The sample assembly includes a confining plate, an energy absorbing layer, a substrate and a coating having a free surface, all in intimate facing contact with each other, and where the sample and coating are in intimate facing contact forms a substrate/coating interface. The coating is positioned along the first axis so that the coating free surface forms the sample assembly second face and the confining plate forms the sample assembly first face. The sample assembly further includes a pulse element for generating a stress pulse responsive to the electromagnetic beam. The substrate and the coating are arranged to receive the generated stress pulse such that the coating free surface moves in response to the stress pulse propagating therethrough. The system further includes a measuring element for measuring the movement of the coating free surface in response to the generated stress pulse, and a calculation element coupled to the measuring element for determining the tensile strength at the substrate/coating interface from the measured movement of the coating free surface. The measuring element is a laser Doppler displacement interferometer.

30 Claims, 36 Drawing Sheets

|  | SILICON | FUSED QUARTZ | Al FILM |
|---|---|---|---|
| $\rho$ (g/cm$^3$) | 2.3 | 1.8 | 2.7 |
| $C$ (J/KgK) | 729.0 | 1130.0 | 900.0 |
| $k$ (J/msK) | 138.0 | 1.7 | 247.9 |
| $\lambda$ (GPa) | 62.0 | 84.3 | 58.4 |
| $\mu$ (GPa) | 41.0 | 21.1 | 26.2 |
| $c$ (m/s) | 7910 | 8380 | 6409 |
| $\nu$ | 1.21 | $5.8 \times 10^{-2}$ | 0.345 |
| $\alpha$ (K$^{-1}$) | $7.6 \times 10^{-6}$ | $4.0 \times 10^{-7}$ | $3.8 \times 10^{-5}$ |
| $\varepsilon$ (absorptivity) | – | – | 0.07 |

*FIG. 12*

| Properties | Al | Cu | Cr | Sb | Sn | Nb |
|---|---|---|---|---|---|---|
| E(GPa) | 70.6 | 129.8 | 279.0 | 54.7 | 49.9 | 103.0 |
| $\nu$ | 0.345 | 0.343 | 0.21 | 0.29 | 0.357 | 0.38 |
| $\rho$(g/cm$^3$) | 2.7 | 8.93 | 7.19 | 6.7 | 7.17 | 8.57 |

*FIG. 13*

|  | Al | Cu | Cr | Sb | Sn | Nb |
|---|---|---|---|---|---|---|
| Threshold energy (J/m$^2$) | 9700 | 2269 | 2557 | 796 | 3097 | 17707 |
| Transfer coefficient I | 0.184 | 0.322 | 0.298 | 0.299 | 0.309 | 0.305 |
| Interface strength (MPa) | 16.53 | 15.46 | 15.47 | 5.99 | 18.53 | 41.16 |

*FIG. 16*

| SUBSTRATE | COATINGS | E (GPa) | h(nm) | $\sigma_{max}$(GPa) | $G_{ci}$ (J/m²) |
|---|---|---|---|---|---|
| PYROLYTIC GRAPHITE | Al | 49.55 | 0.3255 | 0.01653 | 13.263×10⁻⁶ |
| | Cu | 79.15 | 0.3038 | 0.01546 | 6.779×10⁻⁶ |
| | Cr | 153.75 | 0.2673 | 0.01547 | 3.074×10⁻⁶ |
| | Sb | 41.60 | 0.3384 | 0.00599 | 2.157×10⁻⁶ |
| | Sn | 39.20 | 0.4146 | 0.01853 | 28.834×10⁻⁶ |
| | Nb | 65.75 | 0.2878 | 0.04116 | 54.794×10⁻⁶ |

*FIG. 19*

SYSTEM AND METHOD FOR MEASURING THE INTERFACE TENSILE STRENGTH OF PLANAR INTERFACES

GOVERNMENT SUPPORT

This invention was made in part with government support through the U.S. Army Research Office Under Contract No. DAAL03-91-6-0059. The government has certain limited rights in the invention.

BACKGROUND OF THE INVENTION

This invention relates generally to the application of a coating onto fibers or flat substrates. In particular, it relates to an improved method and system for measuring the interface tensile strength between a substrate and an applied coating.

Interfaces between thin films and substrates exist in many fields and applications, including composite materials, tribology, and solid state devices. In the field of composite materials, the interface between a thin coating and a fiber is considered for detecting and possibly deflecting impinging matrix cracks. In the field of tribology, interfaces between various types of functional coatings, e.g., magnetic, conducting, optical, or electrical, protective coatings, e.g., thermal barrier, corrosion, or wear resistant, or decorative coatings and their underlying substrates are of interest. In the foregoing various applications, the tensile strength of the interface is an important property that directly controls the interface decohesion process, and often controls the usefulness and reliability of the coating component. Additionally, the measurement of the interface tensile strength is of importance for reliable performance of the coating in the above applications.

Today, the laser spallation technique is used to determine the tensile strength of planar interfaces. Typically, a high energy laser pulse is made to impinge upon a planar arrangement of a confining plate, a metallic layer, a substrate plate, and a coating combination. The laser pulse impinges on a thick gold film that is sandwiched between the back surface of a substrate of interest and a fused quartz confining plate that is transparent to the wavelength of the laser. Normally, gold is used as the laser absorbing film. Absorption of the laser energy in the confined gold leads to a sudden expansion of the film which, due to the axial constraints of the assembly, leads to the generation of a compressive shock wave directed towards the test coating interface. A part of the compressive pulse is transmitted into the coating as the compression pulse strikes the interface. It is the reflection from the free surface of the coating of this compressive pulse into a tension pulse that leads to the removal of the coating, given a sufficiently high amplitude.

Prior art measurement techniques usually consist of a three-part approach. The first part was the development of a finite element computer simulation of the conversion of the laser light pulse into a pressure pulse, and of the resulting history of tensile stress which develops at the interface as the wave is reflected from the free surface of the coating. In the second part of the strategy, the pressure pulses were measured in a microelectronic, piezoelectric device in which the conditions of the computer simulation were experimentally achieved. This permitted verifying and fine-tuning the computer simulation. Finally, in the third part of the strategy, actual spallation experiments were carried out for several thin coating interfaces. The laser fluence necessary for the removal of the stressed portion of the coating at the interface was recorded, and the tensile stress across the interface that accomplished this was determined from the computer program.

However, problems exist when the prior art interface measuring technique is applied. Since the prior art method involved a finite element computer simulation of the conversion of the laser light pulse into a pressure pulse, complex nonlinear plasma equations must be solved. These equations model the multiproton ionization process within the plasma created at the film surface upon absorption of the laser energy for obtaining the optimal stress condition. These equations become more complex if a column of liquid is used as the confining medium in the experiment. The complexity of the equations that need to be solved to determine the interface tensile stress limits the types of components which can be measured. For example, samples involving substrates that can deform in a ductile fashion cannot be measured since this will require additional consideration of the modification of the stress pulse by the system components as it propagates through the substrate.

As these and other prior art techniques have proven less than optimal, an object of this invention is to measure the interface tensile stress through a direct measurement of the particle velocity at the rear surface of the coating or substrate.

Another object of the invention is to provide accurate measurements of the interface tensile stress for a variety of systems, including ductile components.

Still another object of the invention is to determine the interface tensile strength of the coating/substrate interface without necessitating the use of the complex equations.

Yet another object of the invention is to optimize the stress pulse so as to maximize the interface tensile stress to enable the system user to measure the strength of interfaces involving thin coatings.

Other general and more specific objects of the invention will in part be obvious and evidence from the drawings and description which follows.

SUMMARY OF THE INVENTION

The invention attains the foregoing and other objects with a system for measuring the tensile strength of a planar interface between a substrate and a coating which includes an energy source that generates a collimated electromagnetic beam along a first axis, and a sample assembly disposed along the first axis having a first face positioned to receive the beam so as to allow the beam to propagate within the assembly along the first axis, and a second face, where the first and second faces are oppositely opposed. The assembly includes a sample and a coating having a free surface, where both the sample and the coating are in intimate facing contact with one another thereby forming a substrate/coating interface, and are positioned along the first axis so that the coating free surface forms the second face of the sample assembly. The sample assembly further includes a pulse element for generating a stress pulse responsive to the electromagnetic beam that propagates within the sample assembly; the substrate and the coating being arranged to receive the generated stress pulse such that the coating free surface moves in response to the stress pulse propagating therethrough.

In one aspect of the invention, the system includes a measuring element for measuring the movement of the coating free surface in response to the generated stress pulse, and another element coupled to the measuring element for determining the tensile strength at the substrate/coating interface from the measured movement of the coating free surface.

According to another aspect of the invention, the tensile strength measuring system further includes an optimization element for optimizing the interface tensile stress, where the optimization element includes an element for maximizing the stress pulse generated in the sample assembly, and a first optical element positioned to receive the electromagnetic beam along the first axis and adapted to pass the beam along the first axis to the sample assembly first face. The first optical element is a convex lens.

According to a further aspect of the invention, the sample assembly further includes a confining plate and an energy absorbing layer having a first face and a second face. The confining plate and the energy absorbing layer are axially spaced along the first axis, and the plate and the energy absorbing layer first face are in intimate facing contact with each other. Moreover, the energy absorbing layer second face is in intimate facing contact with the substrate, and the confining plate forms the sample assembly first face that is in position to receive the electromagnetic beam along the first axis.

According to further aspects of the invention, the confining plate is solid water glass, the energy absorbing layer is a metallic coating, and the substrate is a silicon wafer. The measuring element is a laser Doppler displacement interferometer that measures the movement of the coating free surface. Additionally, the element that measures the tensile strength further includes a determination element for determining the free surface velocity of the coating free surface, such that the determination element is adapted for determining the interface tensile strength.

Further aspects of the invention may be determined from the above summary and from the description which follows.

BRIEF DESCRIPTION OF THE DRAWINGS

The foregoing and other aspects of the invention may be more fully understood from the following description, when read together with the accompanying drawings in which:

FIG. 3b shows the coating free surface displacementors as a function of time derived from FIG. 3a;

FIG. 12 illustrates the material properties used during the computer simulation;

FIG. 13 shows the mechanical properties for various metals used in the determination of the interface tensile strength;

FIG. 16 shows a chart of the interface tensile strength measurements for various metal/PG systems;

FIG. 17b shows a plot of the free surface displacement obtained from the fringe record plot of FIG. 17a;

FIG. 19 shows a correlation listing of the various fracture energy constants used for various metal/PG systems;

FIG. 34c shows the velocity profile corresponding to the fringe record of FIG. 34a;

FIG. 35b shows the velocity profile corresponding to the interference fringes of FIG. 35a;

FIG. 36b shows the velocity profile corresponding to the fringe record of FIG. 36a.

DESCRIPTION OF THE ILLUSTRATED EMBODIMENT

Figure 1:
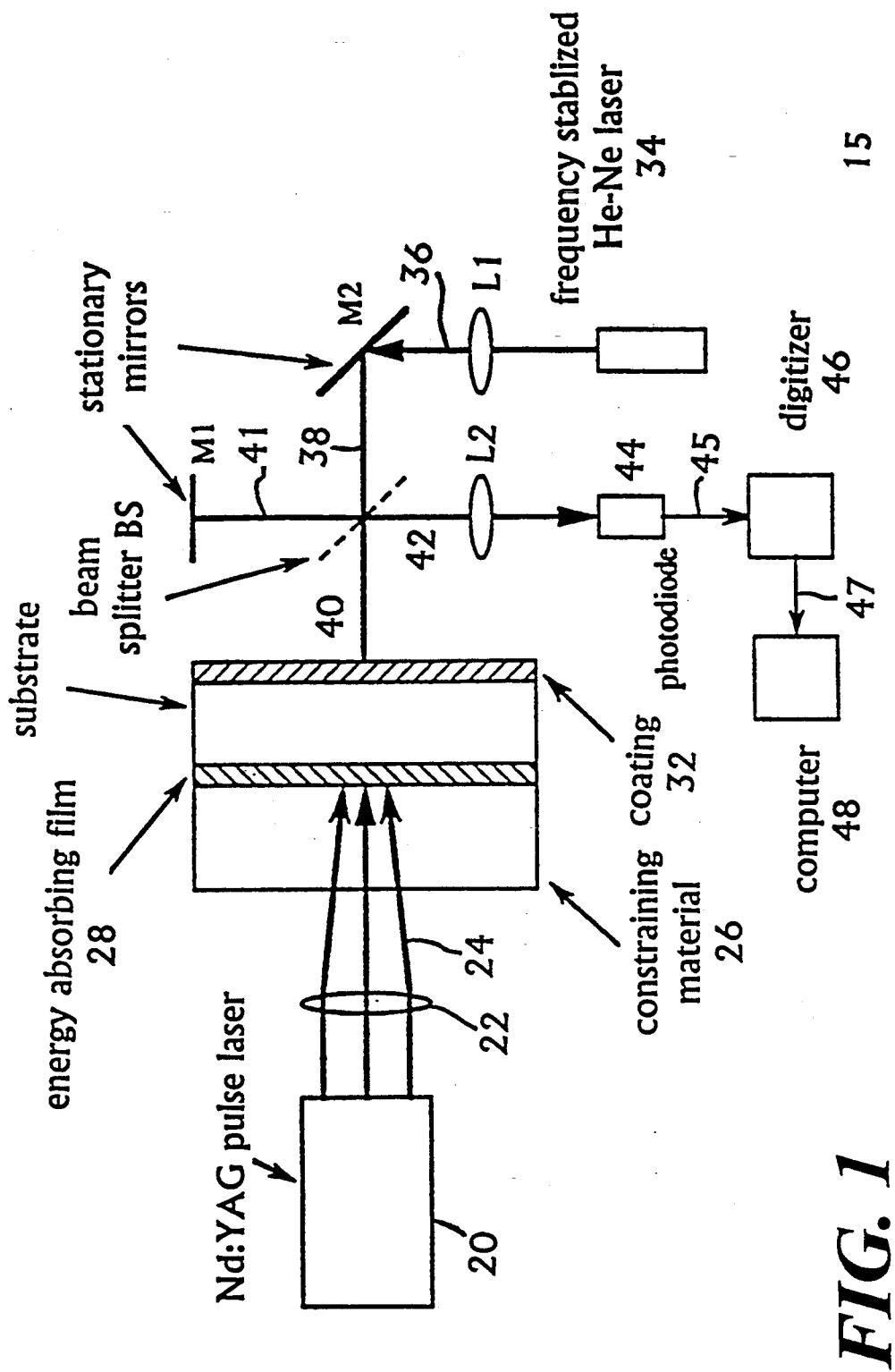
FIG. 1 shows a schematic diagram of the interface tensile strength measuring system according to a preferred embodiment of the invention which employs a laser Doppler displacement interferometer.

FIG. 1 illustrates an interface tensile strength measuring system according to a preferred embodiment of the invention including a laser Doppler displacement interferometer and a laser spallation setup. An input laser 20 generates a pulse beam of light along a first axis. A first optical element 22 is positioned along the first axis to receive the input beam of light. The element 22 collimates the input beam and passes the collimated beam 24 along a second axis substantially parallel to the first axis. Sequentially spaced along the second axis and disposed transverse thereto are a constraining element 26, an energy absorbing layer 28, a substrate element 30, and a sample coating 32. The laser Doppler displacement interferometer system 15 includes a second input laser 34, a first collimating lens L1 positioned so as to receive the laser 34 input beam and a first stationary mirror M2. The mirror M2 is angularly offset from the first collimating lens L1 to pass the laser beam along a first reflecting axis 38. The first reflecting axis 38 is substantially transverse to the input beam generated by the laser 34. A beamsplitter BS is disposed along the reflecting axis 38 so as to receive a selected portion of the input beam 38. A portion of the beam incident upon the beamsplitter passes therethrough along a second reflected axis 40. Additionally, a selected portion of the beam that passes along the reflecting axis 38 is directed along a first output axis 41 to a second stationary mirror M1 by the beamsplitter BS. The laser beam that passes along the second reflecting axis 40 is incident upon the free surface of the coating 32, and is reflected back along the axis 40 to the beamsplitter BS. The beamsplitter BS passes a selected portion of the beam reflected from the coating surface 32 along the second output axis 42. The first and second output axes 41, 42 are disposed transverse to the reflecting axes 38, 40. A second collimating lens L2 is positioned along the second output axis 42 so as to receive the reflected portion of the beam from the beamsplitter BS. The second collimating lens L2 passes the beam along the second output axis 42 to a photodiode 44. The photodiode 44 is also positioned along the second output axis 42 to receive the reflected beam. The photodiode 44 generates a signal 45 in response to the reflected portion of the beam incident thereon. The photodiode signal 45 is in electrical communication with a digitizer 46. The digitizer 46 also generates an output signal 47 which is in electrical communication with a computer 48.

When actuated, the first input laser 20 generates a laser pulse that passes along the first axis to the lens 22. In a preferred embodiment, the input laser 20 is a Q-switched Nd:YAG pulse laser that generates a pulse of three nanoseconds' duration. The lens 22 collimates the laser pulse into a collimated beam 24 that is incident upon a constraining layer 26. According to a preferred embodiment of the invention, the lens is a convex lens, and collimates the laser pulse between 100 micrometers and 4 millimeters in diameter; and preferably 3 mm. The constraining material is generally transparent to the input laser pulse thereby transferring the pulse to the energy absorbing layer 28. Absorbtion of the laser pulse by the energy absorbing layer leads to a sudden expansion of the layer 28 which, due to the axial constraints of the assembly, e.g., the constraining material 26 and the substrate 30, generates a compressive shock wave or pulse directed towards the substrate 30 and the coating 32. The energy absorbing layer 28 may be composed of a variety of metallic materials such as gold or germanium, but is preferably composed of a thin aluminum film as discussed further below. The constraining material is preferably composed of solid water glass and is between 5 micrometers and 100 micrometers thick; and preferably 5 micrometers. The compressive stress pulse propagating through the substrate 30 is incident upon the interface between the substrate 30 and the test coating or sample 32. A part of the compressive pulse is transmitted into the coating as the compression pulse strikes the interface. The compressive pulse reaches the coating free surface where it is reflected, thereby forming a tension pulse. It is this formation of the tension pulse that leads to the removal of the coating 32 from the substrate/coating interface, given a sufficiently high amplitude.

The substrate 30 is preferably circular in nature and is composed of single crystal silicone (Si) wafers that are between 10 millimeters and 30 millimeters in diameter, and preferably, 1 millimeter thick. The sample coating 32 is between 0.5 mm and 2.0 mm thick; and preferably is 1.0 mm thick.

When the stress pulse is reflected from the free surface of the coating 32 or the substrate 30, the particles at the free surface experience a transient velocity, which is proportional to the transient profile of the striking stress pulse. This transient velocity is measured directly by the laser Doppler interferometer system 15 of FIG. 1. It is to be understood, however, that the laser Doppler displacement interferometer system of FIG. 1 may comprise a laser Doppler velocity interferometer to also record the velocity of the particles at the coating free surface. However, for accurate measurements of the transient velocities, a displacement interferometer is preferably used.

To measure the vibrations caused in the coating 32 free surface, the laser Doppler displacement system 15 of FIG. 1 is employed. The laser 34 is actuated to produce a laser beam along the axis 36. The first collimating lens L1 collimates the beam and passes the beam along to the stationary mirror M2. The mirror M2 is angularly offset with respect to the axis 36. The mirror M2 reflects the laser 34 beam along the reflecting axis 38. The beamsplitter BS is positioned along the reflecting axis 38 so as to receive the reflected laser beam. The beamsplitter BS passes a selected portion of the reflected beam along the reflecting axis 40, while simultaneously passing a selected portion of the incident beam along the first output axis 41. In the preferred embodiment, the beamsplitter can be disposed at any angle with respect to the reflecting axis 38, but is preferably at a 45° angle thereto. Moreover, the beamsplitter preferably divides the laser beam into two equal beams.

The beam which is reflected from the stationary mirror M1 is the reference beam and the beam reflected from the free surface of the coating 32 along the second axis 40 is the signal beam. The reference beam and the signal beam are intermixed at the beamsplitter BS, and are passed along the second output axis 42. The lens 22, preferably a convex lens, collimates the mixed beam and passes the beam along the axis 42 to the photodiode 42. The photodiode 44 produces a signal 45 that is proportional to the movement, e.g., transient velocity, of the coating free surface. The photodiode 44 output voltage signal is in electrical communication with the digitizer 46. The digitizer is then actuated to produce an output signal 47 that communicates with the computer 48.

The digitizer 48 produces a signal 47 corresponding to the fringe record of the photodiode 44. The fringe record is related to the velocity of the coating free surface by the computer 48. The transient velocity of the coating free surface is then related to the interface stress via a series of wave mechanic equations. More specifically, the peak interface tensile stress generated at each level of the laser fluence is related to the maximum free surface velocity via computer 48. Computer 48 takes the stress pulse measured at the substrate's free surface (measured separately) and impinges it upon the interface at the substrate side, and determines the resulting peak tensile amplitudes of the stress (which is normalized via a normalizing factor) at the interface and the coating free surface. The ratio of the foregoing amplitudes comprise the transfer coefficients which are then used to convert the measured peak stress at the coating or the substrate free surface to the interface peak stress.

The movement of the free surface of the coating 32 generates a shift in the frequency of the light incident upon the coating 32 through the Doppler effect. For example, if the rear surface velocity ($v(t)$) is much less than the velocity of light (c), the Doppler shift in frequency $n(t)$ is given by $$n(t) = \frac{2v(t)}{\lambda_o} \quad (1)$$

where $\lambda_o$ is the original wavelength, preferably 632.8 nm of the He:Ne laser. When the reference beam, transmitted along the output axis 41, and the signal beam, transmitted along the reflecting axis 40, are remixed at the beamsplitter BS, the beam incident onto the photodiode 44 is amplitude modulated at the Doppler shift frequency referred to as the fringe frequency. Equation (1) can be integrated to relate the surface displacement ($u(t)$) to the fringe count ($f(t)$) as:

$$u(t) = \frac{\lambda_o f(t)}{2} \quad (2)$$

The mixed beams are paired by the beamsplitter BS, along the second output axis 42, through the second collimating lens L2 to the photodiode 44. The photodiode 44 output voltage amplitude ($A(t)$) is recorded on a transient digitizer 46 and related to the fringe count as:

$$A(t) = \frac{(A_{max} + A_{min})}{2} + \frac{(A_{max} - A_{min})}{2} \sin(2\pi f(t) + \delta) \quad (3)$$

where $A_{max}$ and $A_{min}$ are the maximum and minimum amplitudes respectively of the output voltage, and $\delta$ is a phase angle. Once $f(t)$ is determined from equation (3), $u(t)$ can be obtained through equation (2). Finally the free surface velocity ($v(t)$) is obtained by differentiating displacement ($u(t)$) with respect to time. The displacement interferometer 15 gives very precise data since one complete fringe shift corresponds to a $\lambda_o/2$ displacement of the free surface. However, if the stress pulse is too long (for example, 100 $\mu$s), hundreds of fringes have to be counted, which at times can be beyond the memory and resolution of an ordinary digitizer or an oscilloscope. In addition, the frequencies of the displacement fringes corresponding to the stress pulses with rise times shorter than 5 ns require 10–100 GHz transient digitizers.

In the preferred embodiment depicted in FIG. 1, the useful duration of the stress pulses generated thereby are about 20 nanoseconds, only about 10 displacement fringes are produced within this duration albeit with a minimum 0.5 nanosecond rise time. The digitizer 46 is preferably a Tecktronix SCD 1000 digitizer with the transient rise time of 5 picoseconds, and the photodiode 44 is preferably a Newport 877 ultra high speed photo detector with a rise time of less than 200 picoseconds; which allows the system operator to record fringes with a resolution of 0.2 nanoseconds. Additionally, the system of FIG. 1 is capable of recording velocities to about 800 meters per second.

Figure 2:
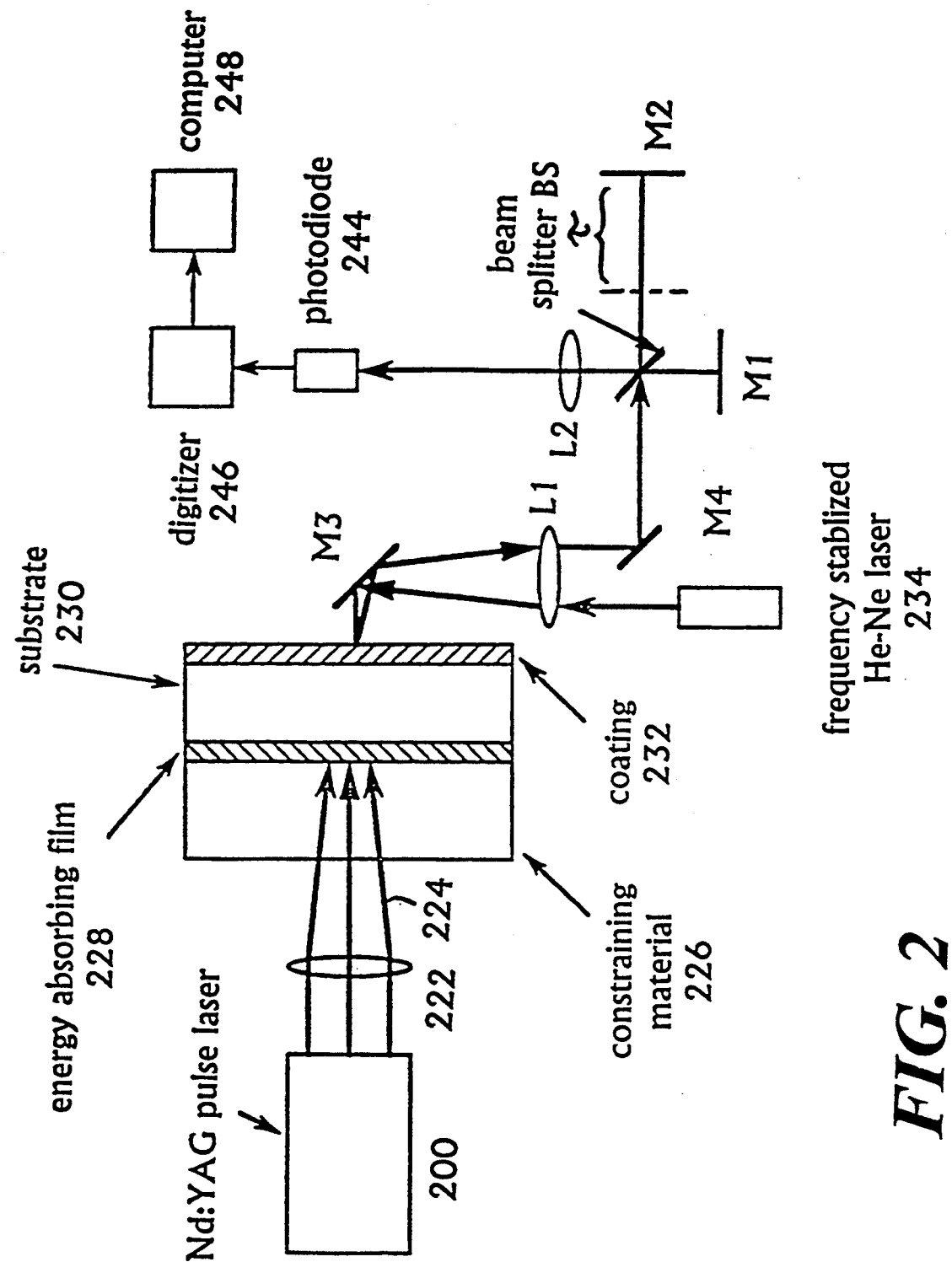
FIG. 2 shows a schematic diagram of the interface tensile strength measuring system employing a laser Doppler velocity interferometer.

The laser Doppler velocity interferometer of FIG. 2 includes a similar setup to that of FIG. 1, where the beam reflected from the rear surface is split into two equal parts by a beamsplitter BS. The difference in distance of the two beams between the splitter and the two stationary mirrors M1 and M2 gives a delay time ($\tau$) before the beams interfere to form the fringes. The relationship between the free surface velocity ($v(t-\tau/2)$) and the fringe count ($f(t)$) is given by $$v(t - \tau/2) = \frac{\lambda_o f(t)}{2\tau} \quad (4)$$

The fringe count ($f(t)$) in equation (4) can be determined from equation (3). The velocity determined by equation (4) is averaged over the time interval, ($t-\tau/2$) and ($t+\tau/2$). Therefore, if the rise time of the expected stress pulse is comparable to $\tau$, the velocity interferometer cannot provide accurate information about the stress pulse profile. Although $\tau$ can be increased to obtain more fringes for such cases, an increase of $\tau$ is restricted by the coherence limit of the laser 234. Since the typical delay time for a normal velocitimeter of 3 nanoseconds is comparable to the rise time of the A foregoing velocity profile, the average time interval is too large to be acceptable.

On the other hand, if the delay length is decreased such that the fringe count for the maximum surface velocity is within half a fringe, and the phase angle $\delta$ in equation (3) is equal to $(-\pi/2)$ or $(\pi/2)$, the profile of the photodiode 24 output voltage amplitude, A(t) corresponds approximately to that of the free surface velocity. This is called a quasi-linear velocity interferometer. Furthermore, if the fringe count for the maximum surface velocity is within one-sixth of a fringe and the fringe amplitude is within the range of $\frac{1}{4}$ to $\frac{3}{4}$ of the maximum amplitude, the photodiode output voltage amplitude (A(t)) is almost a linear function of the free surface velocity. In this case, A(t) takes approximately the appearance of the free surface velocity profile (the error for approximation is about 1%). This kind of velocity interferometer is called a linear velocity interferometer. Although the delay lengths in the quasi-linear or linear interferometers correspond to about 0.15 to 0.3 nanosecond and they give higher accuracy, an error of only one-sixtieth of a fringe can produce a 10% error in the velocity. Hence, none of the above velocity interferometers are particularly suitable for the accurate measurement of the velocity profile generated by a laser pulse in the present setup.

Figure 3A:
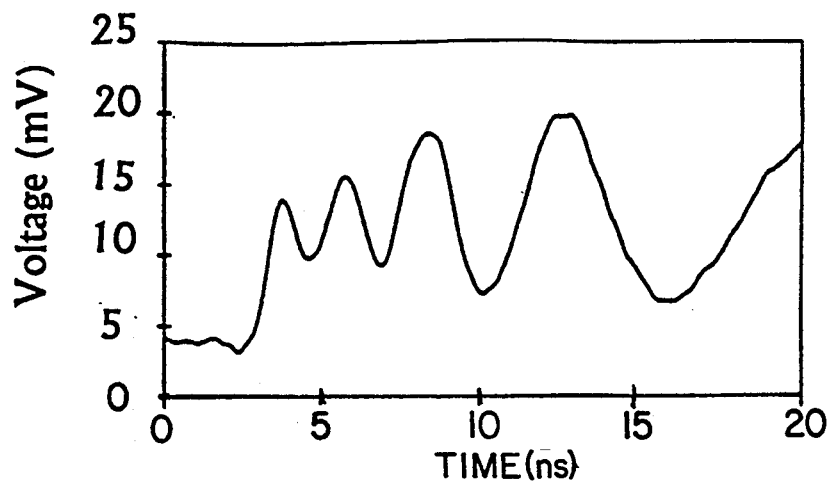
FIG. 3a depicts the photodiode output voltage corresponding to the free surface velocity of the coating as measured by the laser Doppler displacement interferometer.
Figure 3B:
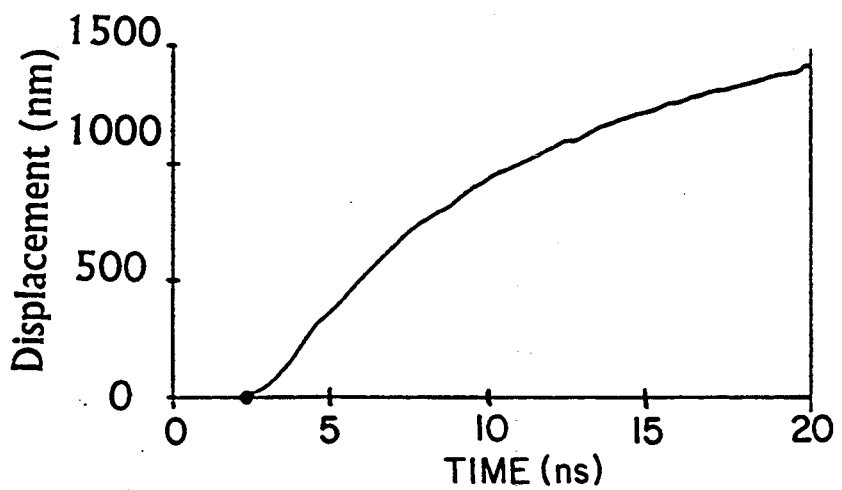
Figure 3C:
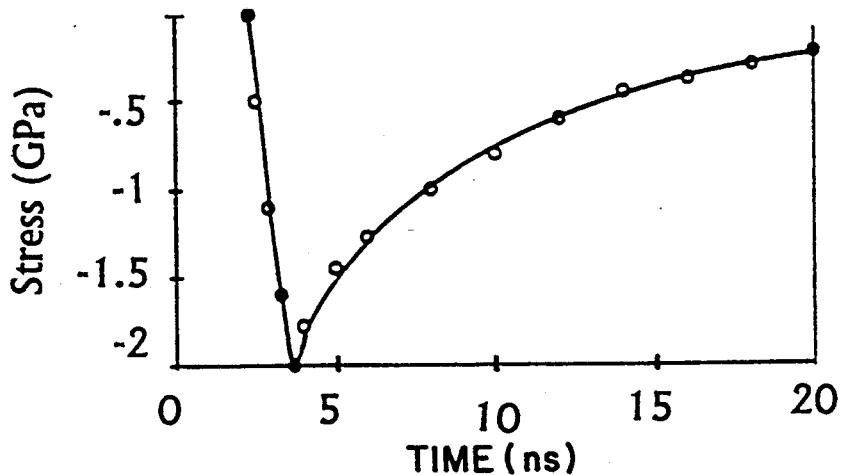
FIG. 3c shows the stress pulse profile of the compression shock wave striking the coating free surface as derived from FIG. 3b.

The process used for obtaining the stress pulse is presented in FIG. 3 obtained from the displacement interferometer of FIG. 1. FIG. 3(a) shows the photodiode 44 output voltage corresponding to a substrate free surface obtained by the laser Doppler displacement interferometer. FIG. 3(b) corresponds to the substrate free surface displacement obtained from the fringe record of FIG. 3(a), and finally, the stress pulse profile generated by the pulsed laser obtained from FIG. 3(b) is shown in FIG. 3(c). Since the displacement interferometer can record fringes with a time resolution of 0.2 nanoseconds, the point at which the free surface velocity reverses direction can be obtained from a visual inspection of the digitized data. To confirm this a series of stress pulses were produced.

Figure 4A:
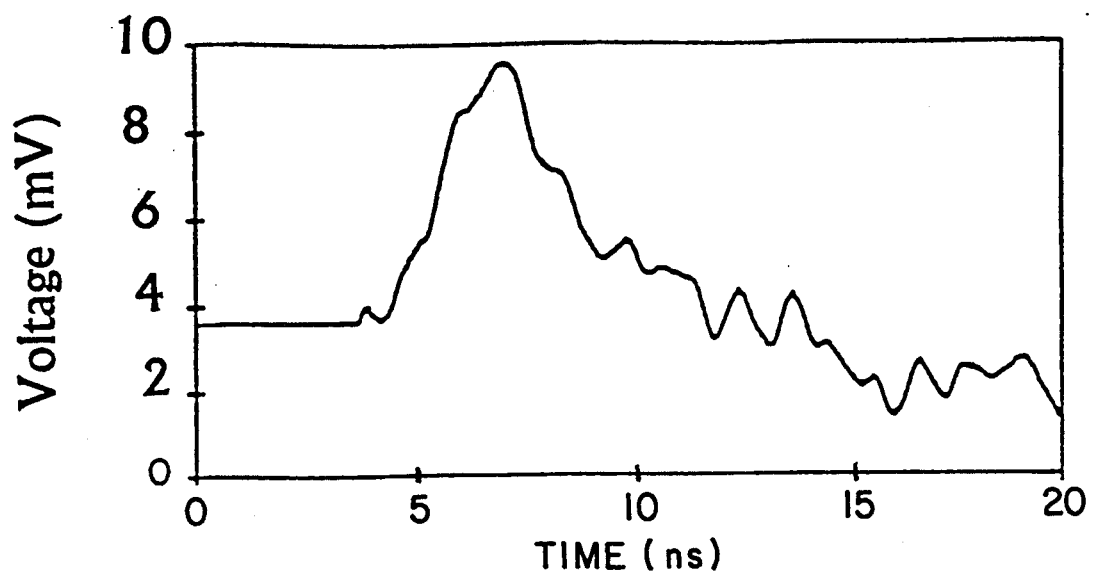
FIG. 4a illustrates the photodiode output voltage as measured by the laser Doppler velocity interferometer.
Figure 4B:
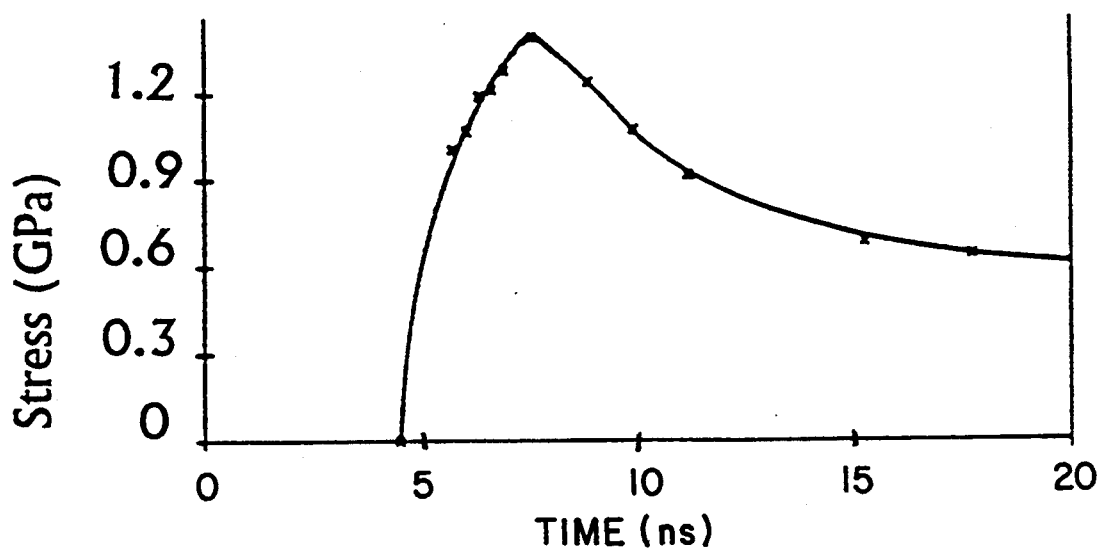
FIG. 4b depicts the velocity profile obtained from the displacement fringe record.

To determine where the free-surface velocity reverses its direction, a series of stress pulses were produced in a Si single crystal substrate. The displacement history of the Si surface was first determined, then differentiated to obtain the velocity profile, as shown in FIG. 4(b). Next, a quasi-linear velocity interferometer was employed to determine the velocity of the free surface at the same laser fluence level at which the displacement fringes were recorded. Since the velocity is approximately proportional to the photodiode output, the fringe record shown in FIG. 4(a) corresponds to the velocity profile. FIG. 4(a) shows that the velocity of the surface increases first and reaches a peak value, followed by a gradual decrease to zero.

A frequency stabilized He:Ne laser was used for the laser 34 to obtain a clean fringe record in the Doppler system 15. An ordinary laser, operating in the single transverse TEMoo mode, usually has several active longitudinal modes with different frequencies. Normally, these longitudinal modes interfere to produce an output laser beam with the amplitude modulated by the beat frequency. The lowest beat frequency in a laser is given by c/2L, where c is the light velocity and L is the cavity length of the laser. Unfortunately, the beat frequency of the ordinary He:Ne laser (for example, 320 MHz) is within the range of the displacement fringe frequency. FIG. 5 compares the fringe record corresponding to the free surface of a shock-loaded Si single crystal obtained by an ordinary He:Ne laser with that by a frequency stabilized He:Ne laser. The fringe record from a frequency stabilized laser is very clear, whereas, the one from an ordinary laser is unusable.

Since the stress pulse is produced over a 0.1 mm to 4.0 mm diameter area in the present invention, it is important to align the He:Ne laser beam with the center of the laser ablated spot. For example, in FIG. 1 the laser beam reflected along the reflecting axis 40 is aligned with input laser beam 24. In the present Doppler setup, the He:Ne laser beam with an initial 0.6 mm diameter was aligned and focused at the center of the sample's rear surface to a spot of about 632.8 nm diameter (equal to the laser wavelength) by using a convex lens (L1) (see FIG. 1). This setup measures the peak stress amplitude even if the Nd:YAG laser pulse shows a spatial distribution of the energy. The peak interface tensile stress is related to the maximum compressive stress at the free surface via a series of wave mechanics equation, a below. The ratio of these calculated amplitudes can be used as transfer coefficients to determine the interface tensile strength.

I. Determination of the Interface Strength via the Wave Mechanics Simulation

In the present invention, the ratio of the diameter of the illuminated spot to the thickness of the substrate is greater than 2. Employing the foregoing geometry, the wave propagation within the substrate can be regarded as one-dimensional, without any dispersive effects. For a material with the two Lame elastic constants, $\lambda$ and $\mu$, and the constant density $\rho$, the wave equation in each medium can be represented as:

$$\frac{(\lambda + 2)^i}{\rho^i} \frac{\partial^2 u_i}{\partial x^2} = \frac{\partial^2 u_i}{\partial t^2} \text{ or } (c_i)^2 \frac{\partial^2 u_i}{\partial x^2} = \frac{\partial^2 u_i}{\partial t^2} \quad (5)$$

where c is the longitudinal wave velocity, u is the displacement in the x direction, t is the time, and i denotes the substrate or the coating. The axial stress in the x direction is calculated from the displacement gradients, and is expressed as:

$$s_i = (2\mu + \lambda) \frac{i \partial u_i}{\partial x} \quad (6)$$

To solve the above equations, three boundary conditions are required. The first two ensure the continuity of the displacements and stresses at the interface, and the third one requires the stress at the coating free surface to be zero. Typically, it is useful to present these equations in a normalized form. To accomplish this, the following dimensionless variables for the coordinate (x), displacement (y), time (t), and stress (u), are introduced:

$$\chi = x/x_0;\ y = u/x_0;\ \tau = t/t_0;\ \Sigma = \sigma/(\lambda + 2\mu)_s \quad (7)$$

where the subscript s refers to the substrate and $x_0$, $t_0$ are respectively the fundamental units of displacement and time defined as: $x_0 = l_p/50$; and $t_0 = G_c/c_s$. Where $l_p$, $G_c$ and $c_s$ are respectively the length of the stress pulse in the substrate, the thickness of the coating and the longitudinal wave velocity in the substrate.

In the normalized coordinates, the corresponding wave equation becomes:

$$H_i \frac{\partial^2 y_i}{\partial x^2} = \frac{\partial^2 y_i}{\partial t^2} \tag{8}$$

where the material constant $H_i$ is defined as $$H_i = \frac{(c_i)^2}{(c_s)^2} \tag{9}$$

and correspondingly, the equation for the normalized stress becomes:

$$\Sigma_i = \beta_i H_i \frac{\partial y_i}{\partial x} \; ; \; \beta_i = \frac{\rho_i}{\rho_s} \tag{10}$$

Thus, $H_i = \beta_i = 1.0$ in the substrate.

Equations (8), (9) and (10) with the appropriate boundary conditions can be simulated by using a finite difference approach. The finite difference method was chosen because of its good stability and short processing time requirement. To model the details, 15,000 nodes were used in the substrate. Various thicknesses of the coating 32 were controlled by altering the number of nodes (10 to 2,500). The stress profile obtained from the free surface of a substrate 30 or a coating 32 (measured separately) is used as an input to the above equations. The experimentally measured stress profile is normalized so as to have the peak compressive stress of unity. The normalized displacement profile is obtained by integrating equation (10) with $H_i = \beta_i = 1$, and by applying the following equation:

$$d_i(x,t) = d_i(t)c_s \tag{11}$$

This displacement profile is represented by 15,000 nodes in the substrate. When expressed in the normalized coordinates, the normalized displacement profile serves as an input to the set of equations (8) and (10) with the appropriate values of $H_i$ and $b_i$ for the nodes representing the coating. Furthermore, the coating thickness was represented in normalized units of $l_p/50$.

Figure 7A:
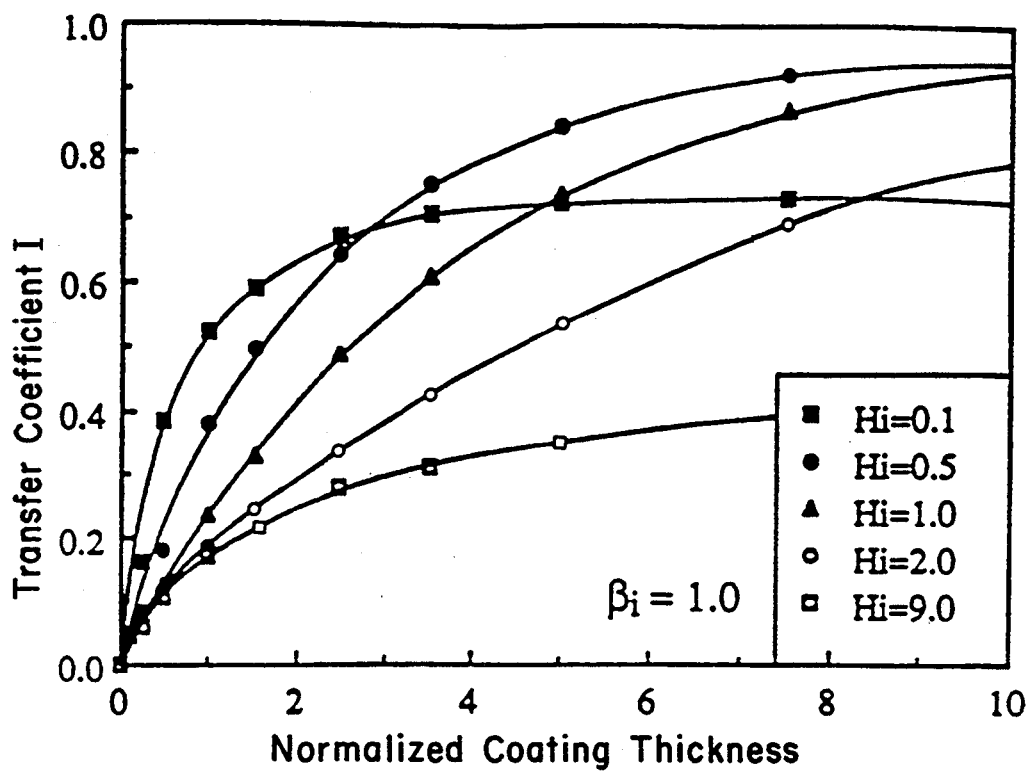
FIGS. 7A and 7B depict the correlation charts of the transfer coefficient I and the transfer coefficient II with a material constant of $\beta i = 1.0$.
Figure 7B:
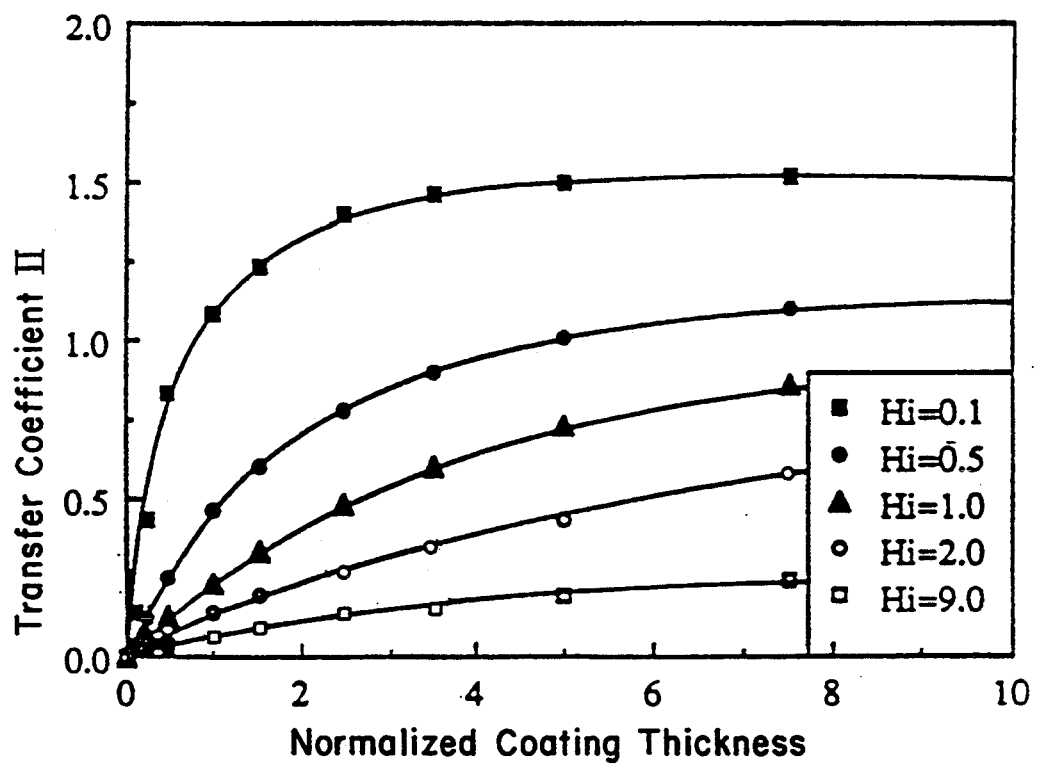
Figure 8A:
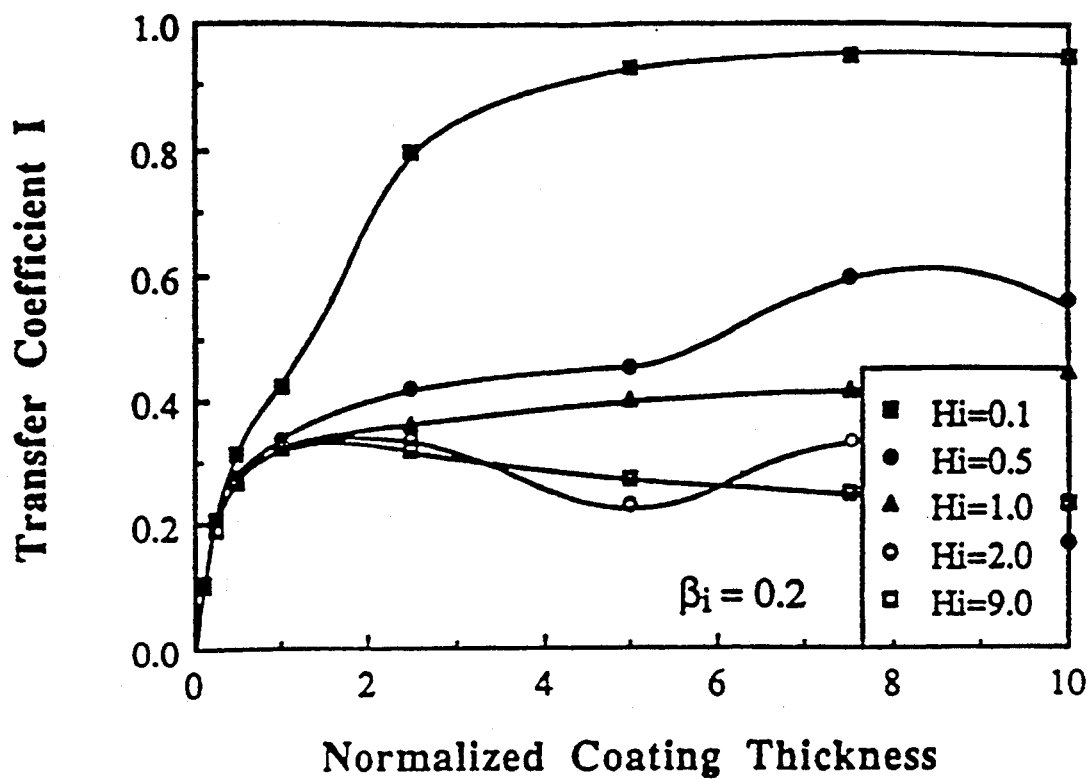
FIGS. 8A and 8B depict the correlation charts of the transfer coefficient I and the transfer coefficient II with a material constant of $\beta i = 0.2$.
Figure 8B:
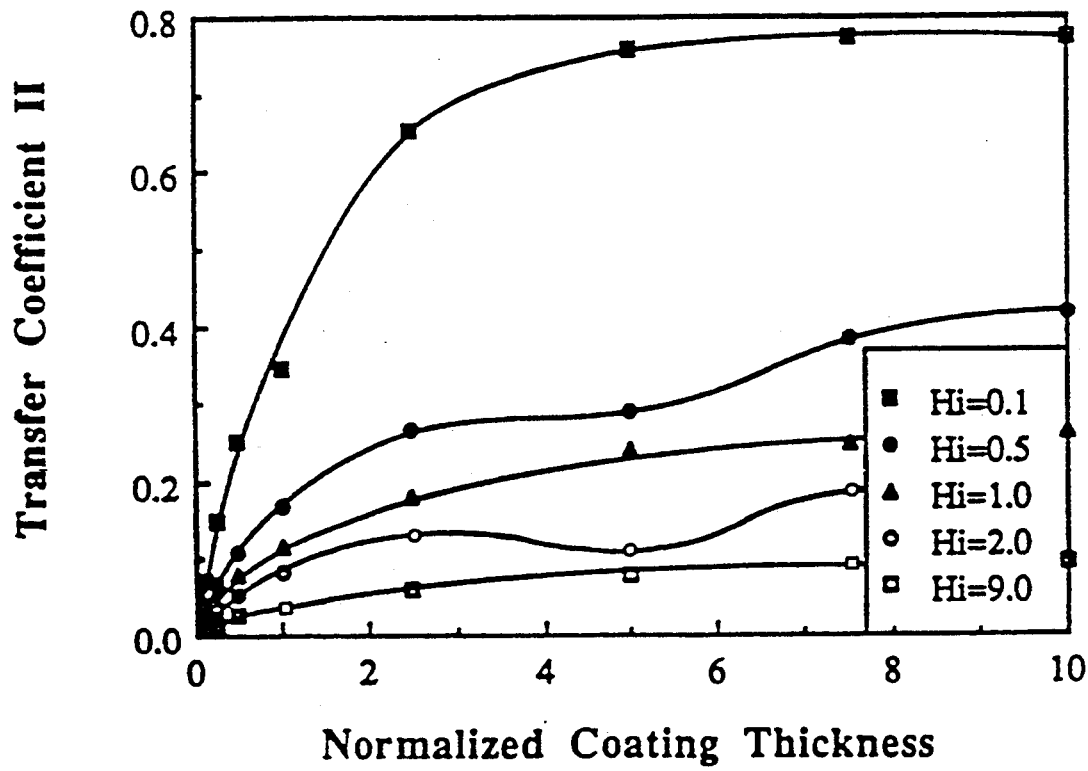
Figure 9A:
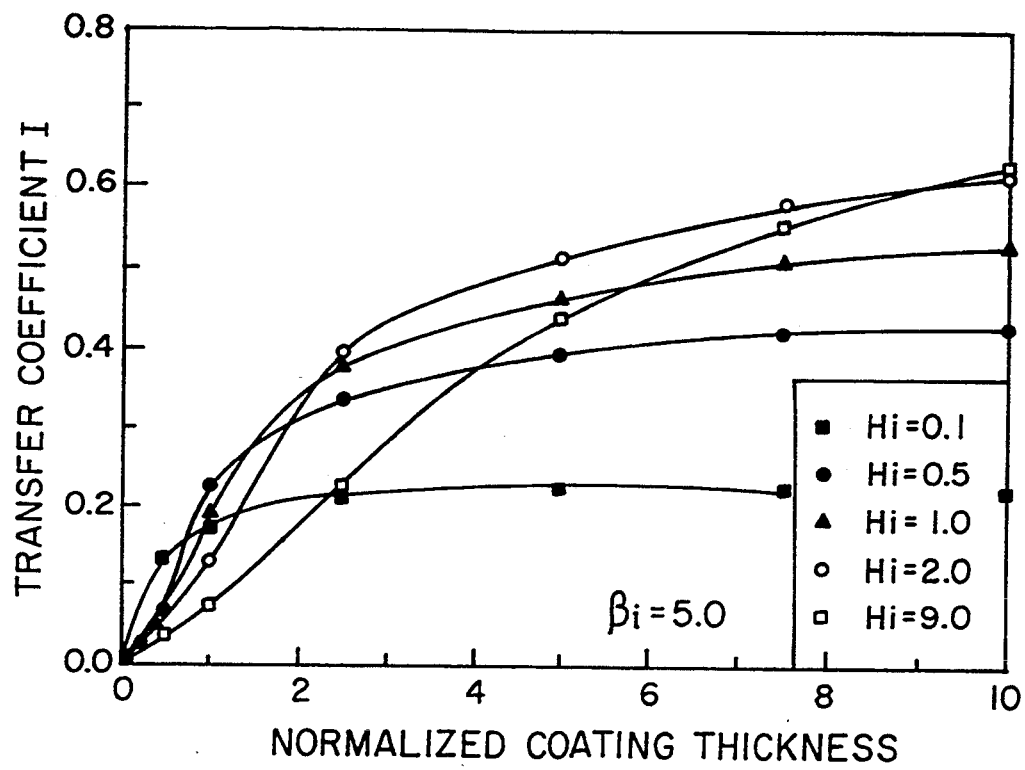
FIGS. 9A and 9B depict the correlation charts of the transfer coefficient I and the transfer coefficient II with a material constant of $\beta i = 5.0$.
Figure 9B:
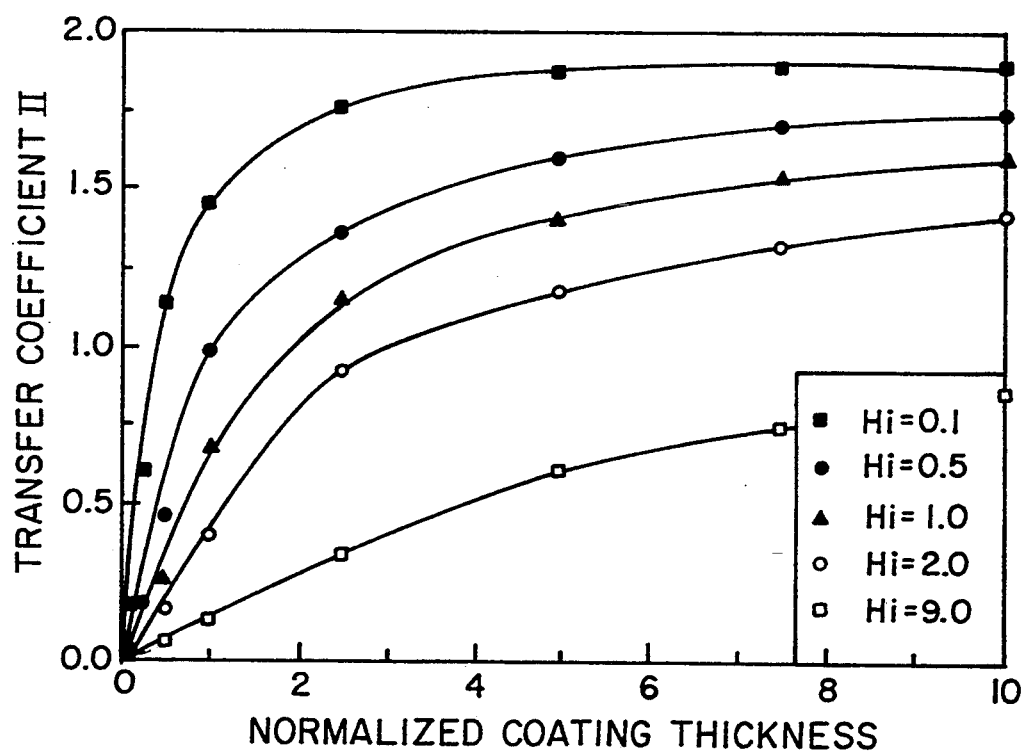

Two transfer coefficients were defined to convert the stress at the free surface into the interface stress. Transfer coefficient I is the ratio of the peak tensile stress at the interface to the maximum compressive stress in the substrate, while transfer coefficient II is the ratio of the peak tensile stress at the interface to the maximum compressive stress at the free coating surface. Both transfer coefficients can be determined by obtaining appropriate values of the normalized stresses through the above simulation. When the stress profile is obtained experimentally from the free surface of the substrate in a separate experiment, the interface stress can be determined by multiplying the maximum compressive stress by the transfer coefficient I; otherwise, if the stress profile is obtained experimentally at the free coating surface, the interface stress can be determined by multiplying the maximum compressive stress by the transfer coefficient II. The transfer coefficient charts for various values of $\beta_i$ and $H_i$ are illustrated in FIGS. 7-9. It is to be understood that these charts are illustrative and not exhaustive of the various values for $\beta_i$ and $H_i$. Finally, the interface strength is determined by finding the interface stress at the threshold laser fluence causing coating spallation, through the use of the above charts.

II. NUMERICAL STUDY OF THE SPALLATION PROCESS

A. Mechanics of interface stress build-up

Although the discussion in the above sections does not completely detail the coating spallation process, a full understanding can be reached through a computer simulation of the stress wave profiles at different times in the vicinity of the interface. Additionally, in the laser spallation experiment, it is desirable to maximize the interface stress for a given laser fluence and an interface system. Factors that can affect the sensitivity of the peak interface stress are the properties and thickness of the test coating, properties of the substrate, and amplitude and sharpness of the laser-produced stress pulse.

Figure 5A:
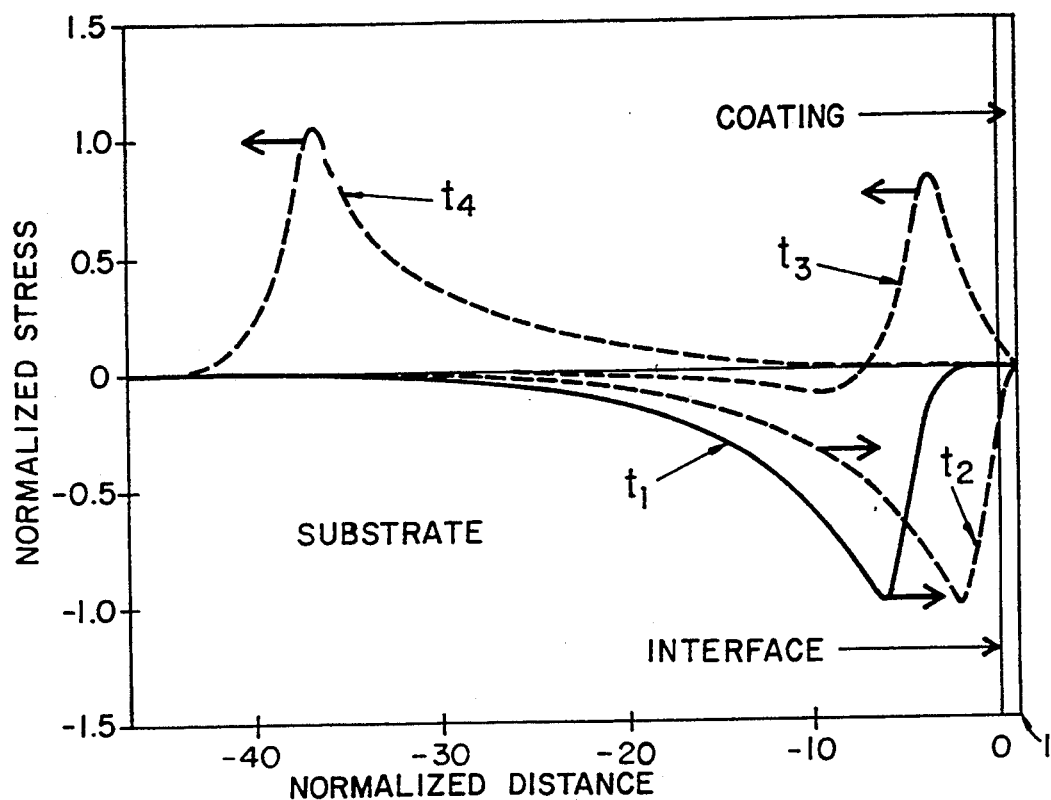
FIG. 5a shows a series of profiles of the normalized stress pulse as they propagate through the coating and substrate.
Figure 5B:
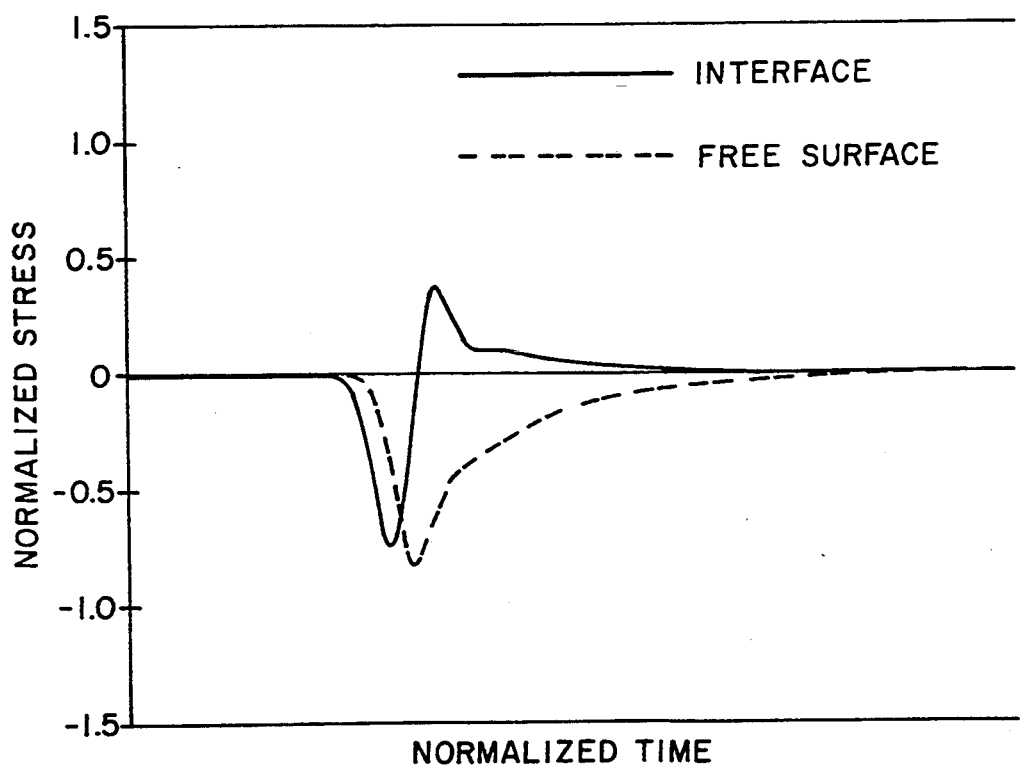
FIG. 5b depicts the normalized stress histories at the interface and coating free surface as a function of time.
Figure 6A:
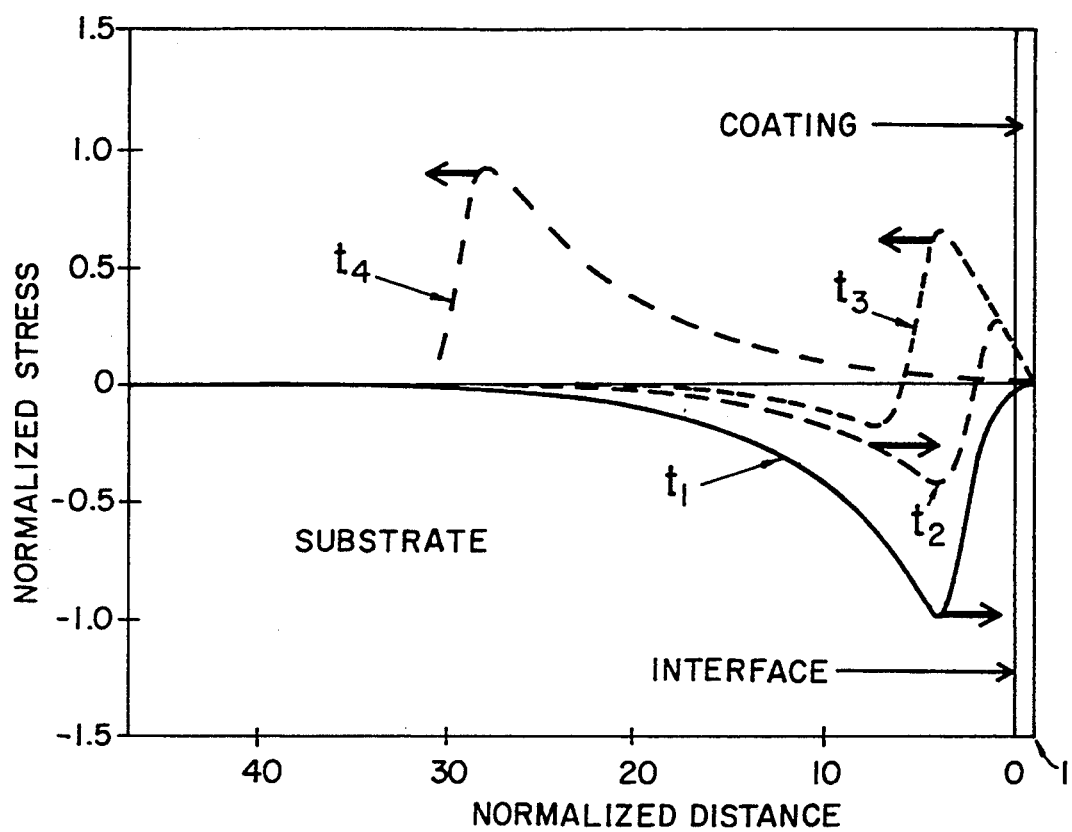
FIGS. 6a and 6b depict the normalized stress pulses and normalized stress histories of FIG. 5 using different material constants.
Figure 6B:
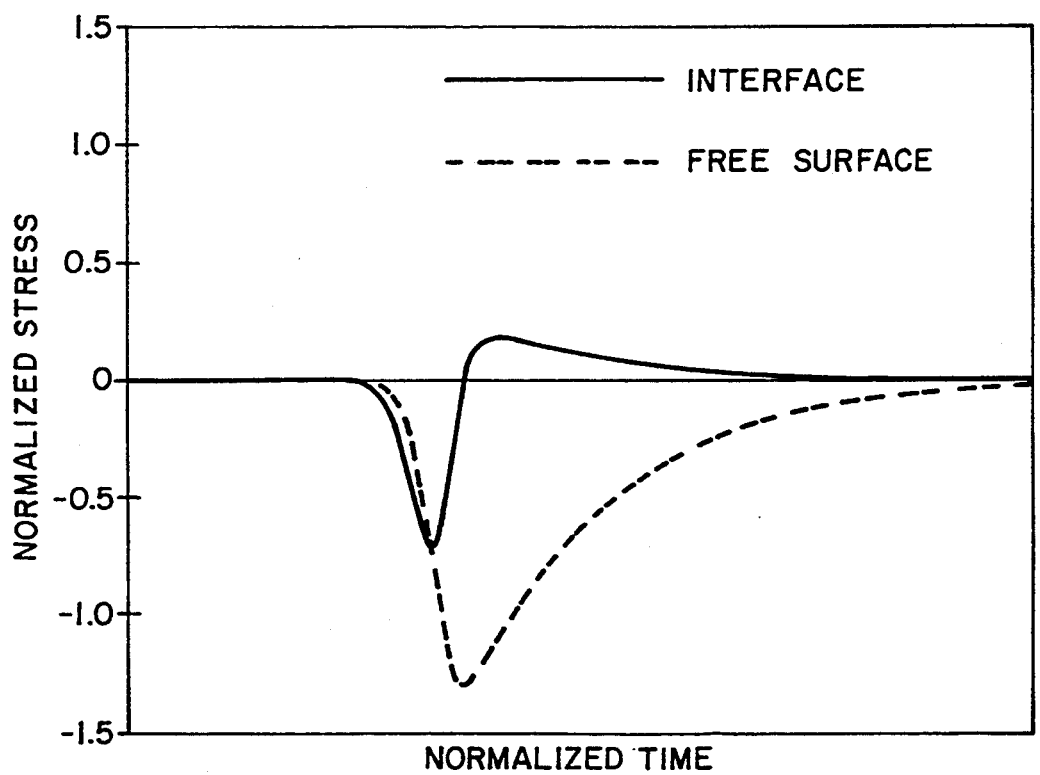

FIGS. 5(a) and 6(a) show several snapshots of the normalized stress pulses as they propagate through the coating 32 and the substrate 30 of FIG. 1, while FIGS. 5(b) and 6(b) show the normalized stress histories at the coating substrate interface, and that striking the free coating surface, both as functions of time. FIG. 5 corresponds to a case of a softer coating (relative to the substrate) with normalized parameters, $H_i = 0.5$ and $\beta_i = 1.0$; whereas FIG. 6 shows the pulse histories for a stiffer coating with parameters, $H_i = 2.0$ and $\beta_i = 1.0$. The most important feature of this simulation is that the shape of the normalized stress pulse was obtained experimentally (see FIG. 3(c)). The normalized incident stress is assigned a unit maximum compressive stress for convenience. The positive value of the stress corresponds to a tensile stress. Here, the term "stress striking the free coating" is used to indicate that the stress is calculated through the velocity of the free surface even though the stress at the free surface is always zero.

In FIGS. 5(a) and 6(a), the stress profile at $t_1$ is an input to the computer program, while the stress profiles at $t_4$ result after the reflection from the interface. The arrows indicate the propagation direction of the stress waves. The first reflection occurs at the coating/substrate interface with a compressive amplitude for $H_i = 2.0$, and a tensile amplitude for the case $H_i = 0.5$. Consequently, the transmitted compression stress in the coating is greater than the incident one for $H_i = 2.0$, and lower for $H_i = 0.5$. At time $t_2$, the wave front reaches the free coating surface. When the maximum compressive stress is reflected from the free surface, the tensile stress appears. It can be seen that even though the stress near the free surface already becomes positive at $t_3$ the tail part of the stress profile still remains compressive, indicating that a sharper post-peak decay will enhance the interface tensile stress.

Additionally, even though the reflected stress pulses (time = $t_4$) look similar to the original one (at time $t_1$), distortion is observed, which is caused by the reflection from the interface. The steeper front side for $H_i = 2$ and smoother front side for $H_i = 0.5$ are shown, as expected. Remarkably, for both cases the stresses striking the free coating surface have similar shapes to the incident pulse profile, albeit with different amplitudes. Thus, the foregoing method and system of obtaining the interface strength, where the ratio of the highest compressive stress striking the free coating surface to the highest interface tensile stress can be used as the transfer coefficient II to convert the experimentally measured free surface stress to the interface stress. Further, the transfer coefficients are largely influenced by the properties of the materials and are discussed next.

B. Influence of various variables on the interface stress: interface transfer coefficient charts The results of the computer simulation are summarized in the form of transfer coefficient charts for a wide range of substrate/coating systems, and presented in FIGS. 7 to 9. Since the profile of the generated stress pulse in the given substrate remains similar (except for its amplitude) within the range of the laser fluences employed, the same chart can be used at different laser fluence levels, albeit for the same normalized pulse profile here; as shown in FIGS. 5 and 6.

1. effect of the sharpness and shape of the stress pulse

The peak tensile stress is also affected by the rise and fall times of the substrate stress pulse. As discussed above, the interface stress reduces as the thickness of the coating decreases. For applications to thin coating interfaces (less than 0.1 μm thickness), the interface stress can be enhanced by shortening the stress pulse rise and fall times. The discussions below and elsewhere detail how an optimal stress pulse profile can be obtained experimentally.

Figure 10A:
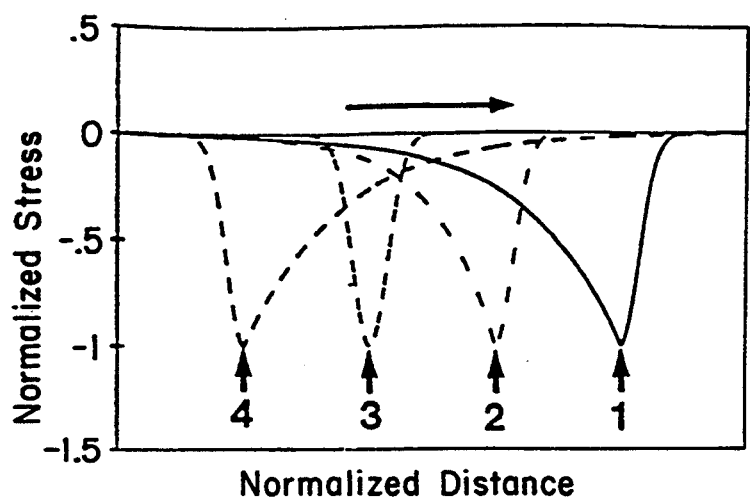
FIGS. 10A, 10B and 10C illustrate the effect of the shape of the stress pulse profile on the transfer coefficient I.

For a quantitative investigation of the effect of the sharpness and shape of the stress pulse, a series of special stress waves were designed, as shown in FIG. 10(a), to determine the values of transfer coefficient I as a function of the normalized coating thickness. Stress pulse 1 is the same as that used above. Stress pulse 2 has a sharper post-peak decay, while stress pulse 3 has identical rise and decay times to that of a typical Nd:YAG laser heating pulse. The comparison of the coating/substrate interface stress generated by pulses 1, 2, and 3 reveal the effect of the post-peak decay time, whereas the effect of the rise time is clear by comparing the stresses due to the pulses 3 and 4, which have the same fall time, but very different rise times.

Figure 10B:
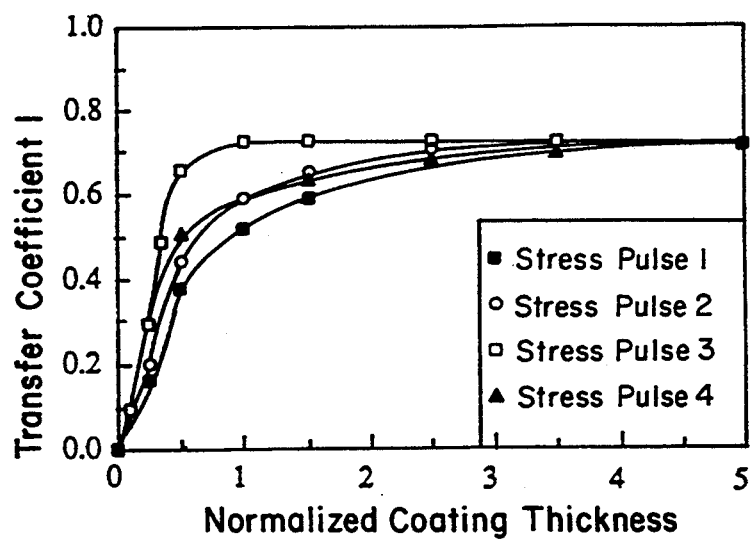
Figure 10C:
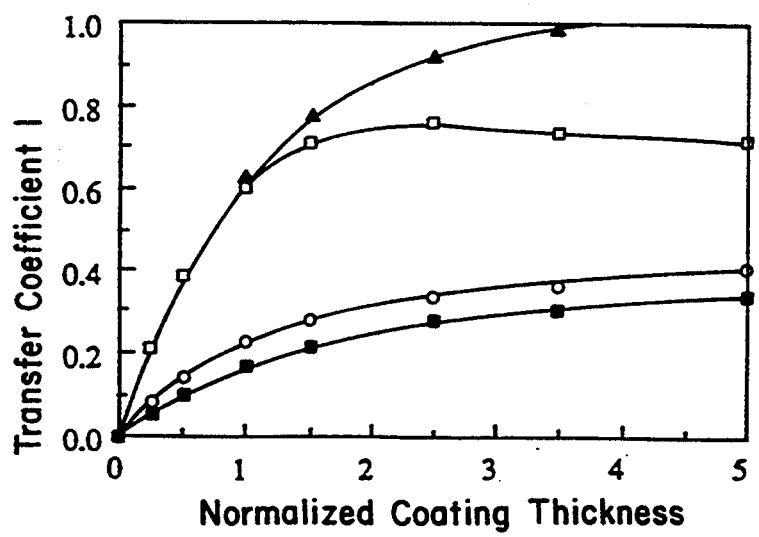

FIGS. 10(b) and 10(c) show the change in transfer coefficient I with normalized coating thickness for different stress pulses at $H_i=0.1$ and $H_i=5.0$ for $\beta_i=1.0$. The transfer coefficient I is used because it is actually the normalized interface stress for a given stress profile. The results in FIG. 10 indicate that the post-peak decay times significantly influence transfer coefficient I or the interface stress. The enhancement depends on the coating thickness and the $H_i$ value. For $H_i=0.1$, the enhancement first goes up, then drops down, and finally the difference tends to zero. The large enhancement is within the range from 0.25 to 1.0 of the normalized coating thickness, which is also the range of experimental interest. Curves 1 and 2 show that even a small alteration in the sharpness of the fall side can create an enhancement of up to 10% of the normalized interface stress. FIG. 10(c) shows a large increase in the interface stress for stress pulse 3, and a small increase for stress pulse 2, when $H_i=5.0$. It should be noted that even after a large increase due to the sharpness, the interface stresses of high $H_i$ are still lower than those found with low $H_i$ values in the low coating thickness range for stress pulse 3, and those found in the entire range for stress pulse 2. The maximum increase is about 0.45 of the normalized interface stress. Compared with that of $H_i$ 0.1, FIG. 10 illustrates that the sharpness has more influence on the substrate/coating system with high $H_i$ value.

The influence of the rise time can be included by examining the interface stress due to pulses 3 and 4, which show no increase at high $H_i$ value and a small increase at low $H_i$ values for thin coatings. Therefore, a sharper post-peak fall time of the stress profile is more significant in enhancing the interface stress for thin coatings than a shorter rise time pulse. This is achieved experimentally as discussed below.

In operation, the input laser 20 generates a laser pulse along a first axis. The laser pulse is collimated by a lens 22 into a collimated beam 24. A substrate assembly having a constraining material 26, an energy absorbing film 28, a substrate 30, and a coating 32, are sequentially positioned so as to receive the collimated laser beam 24, and are further disposed transverse to the first axis. The laser pulse is received at the constraining material 26 and passes therethrough; since the constraining material is transparent to the wavelength of the laser pulse. The energy absorbing film 28 absorbs the generated laser beam, which leads to a sudden expansion of the energy absorbing film. Due to the axial constraints of the constraining material 26 and the substrate 30, a compressive shock wave is developed by the expansion of the energy absorbing film, and is directed toward the substrate/coating interface. A portion of the compressive pulse is transmitted into the coating 32 as the compression pulse strikes the coating/substrate interface. The compressive pulse propagates through the coating 32 to the coating 32 free surface, is reflected back, thereby forming a tension pulse. It is the formulation of the tension pulse that leads to the removal of the coating 32, given a sufficiently high amplitude.

When the stress pulse is reflected from the free surface of the coating 32 or the substrate 30, the particles at the free surface experience a transient velocity which is proportional to the transient profile of the striking stress pulse. The laser 34 of the laser Doppler displacement interferometer is then actuated. The laser 34 generates a laser beam that passes through a first collimating lens L1. The collimated beam is conveyed along the reflecting axis 38 by a stationary mirror M2. A beamsplitter BS is positioned along the reflecting axis 38 so as to pass a selected portion of the reflected beam along the reflecting axis 40, while simultaneously passing a selected portion along the first output axis 41 to the stationary mirror M1. The portion of the laser beam reflecting off of stationary mirror M1 is the reference beam, and a portion of the beam directed toward the free surface of the coating 32 is the signal beam. The reference beam and the signal beam are intermixed at the beamsplitter BS and are passed along a second output axis 42, through a collimating lens L2 to a photodiode 44. The photodiode generates an output voltage proportional to the frequency of the incident beam reflected from the free surface of the coating 32. For example, the laser beam incident on the photodiode 44 is amplitude modulated at the Doppler shift frequency, referred to as the fringe frequency. The photodiode 44 generates an output signal 45 representative of the output voltage amplitudes. The digitizer 46 records the photodiode 44 output voltage amplitudes via the output signal 45. The digitizer 46 then generates an output signal 47 that is in electrical communication with a computer 48. The computer 48 then determines the free surface velocity of the coating 32 by differentiating the displacement of the free coating with respect to time. The peak interface tensile stress generated at each level of the laser fluence is related to the maximum velocity at the free surface by the computer 48. The computer 48 takes the stress pulse measured at the substrate free surface (measured separately) and impinges it upon the interface at the substrate side, and determines the resulting peak tensile amplitudes of the stress (which is normalized via a normalizing factor) at the interface and the coating free surface. The ratio of the foregoing amplitudes comprise the transfer coefficients which are then used to convert the measured peak stress at the coating or the substrate free surface to the interface peak stress.

Figure 11:
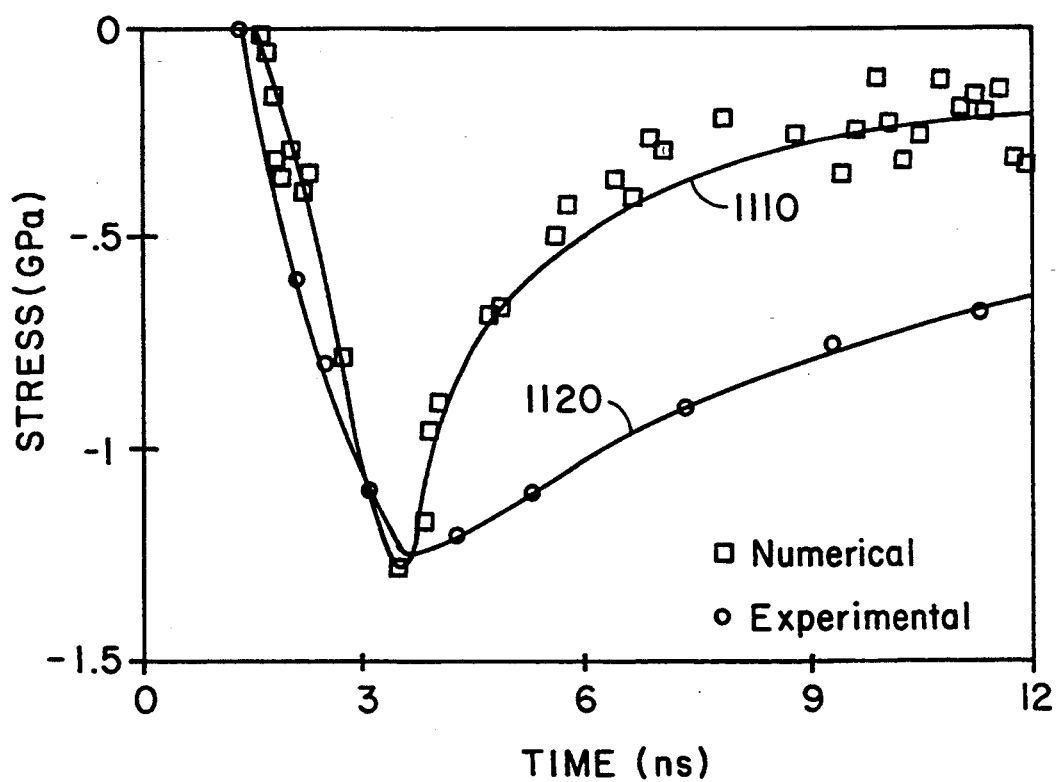
FIG. 11 shows a plot of the predicted and measured stress pulses at a laser fluence of $5.28 \times 10^4$ J/m$^2$.

The laser Doppler displacement interferometer 15 used in conjunction with the laser spallation setup of FIG. 1, measures the free-surface velocity profile experimentally, and calculates the maximum tensile stress at the coating/substrate interface through a wave mechanic simulation. During this measurement process, all of the non-linear plasma effects produced upon the laser interaction with a thin film are measured experimentally. Moreover, the modification of the pulse profile while it propagates through the substrate is also determined experimentally. Hence, the present invention accurately measures the interface strength of a variety of components and systems, including ductile components. FIG. 11 shows the difference between using the laser Doppler displacement interferometer system 15 of FIG. 1 and the prior art method of determining the modification of the stress pulse as it travels through the substrate assembly. Although the stress pulse propagation as depicted as FIG. 1 is one-dimensional, it may be used to accurately compare the present invention with the prior art technique since the ratio of the diameter of the illuminated spot on the constraining material 26 (3 mm) through the thickness of the substrate (1 mm) is greater than two.

The YAG input laser is actuated to produce a stress pulses in the silicon crystal (substrate) with a 1 micrometer thick aluminum laser absorbing film constrained by a 2 mm fused quartz disc. The material properties used during the comparison of the two techniques are compiled in FIG. 12. During the comparison, the absorption coefficient of aluminum film is taken to be 7 percent for a 1.06 mm wavelength. For aluminum, a volume expansion of almost 6.5 percent results upon melting. Additionally, the stress profiles depicted in FIG. 11 are generated for a laser fluence of $5.28 \times 10^4 J/M^2$, measured at the input laser source. In the main portion of the stress profiles, there is a close similarity between the predicted profile 1100 and the measured profile 1120. However, there is the difference in the post peak or tail structure between the two. The difference in the tail structure between the predicted stress pulse 1110 and the measured stress pulse 1120 is due to the non-linear ionization of the plume of plasma created upon evaporation by the initial part of the laser shooting pulse. Since the computer program of the prior art predicts a stress pulse profile sharper than experimentally found by the present invention, the computer simulation of the prior-art technique reveals inaccurate stress pulse profiles.

The interface strength can be controlled by depositing interlayers. However, in order to quantitatively evaluate the effect of interlayers on the interface strength, the laser spallation technique must be used. Demonstrated below are representative example of the above application.

To demonstrate the present invention, a few interface systems are discussed below. However, it should be understood that the technique can be used on other interface systems. The model interface systems are composed of polycrystalline alumina discs with 96% purity and of pyrolytic graphite platelets. The alumina discs with 12.7 mm diameter and 1 mm thicknesses are prepared by chemically cleaning them with trichloroethane, acetone, and methanol, rinsed with deionized water, and dried with ultra-pure $N_2$ gas. For PG, the experiments are performed on the surface parallel to the principal axis of the layer normals, as this mimics the morphology of the pitch-based carbon fibers. Discs 1 mm thick and having a rectangular cross-section with dimensions 8 mm $\times$ 25 mm are prepared and polished with an 0.05-$\mu$m alumina grit powder. The PG substrates were also cleaned chemically using the same procedure as for the alumina discs, followed by back-sputter cleaning for 20 minutes.

The various layers can be deposited by an LN2 cryo pumped system with an ultimate base pressure of $2 \times 10^{-7}$ torr. Coatings and interlayers are deposited by a sputter system, which consists of two 50.8 mm diameter magnetron sputter guns, a 1000-watt DC power supply, a 600-watt RF power supply with a matching network, and a backsputter gun for cleaning the substrate surface prior to the deposition. The backfill argon pressure is $10 \times 10^{-3}$ torr. The system consists of two sputter guns, one for deposting the interlayers and the other for the coating deposition.

The substrate discs are mounted on the backsputter gun, which is able to rotate along the vertical axis. A continuous rotating tray is placed between the sputter and the backsputter guns as a shutter, except for a diameter hole just larger than that of the substrate disc. Just prior to the deposition, the opening in the tray was aligned with the backsputter and the sputtering gun used for the coating deposition. Coatings of Nb, Al, Ni, Cr, Sn, and Cu are deposited using this setup.

For the Nb/$Al_2O_3$ system with interlayers of Cr and Sb, before the interlayer was deposited, the substrate was centered right above and in line with the sputter gun depositing the interlayer. This was preceded by substrate surface cleaning using the backsputter gun. After the required thickness of the interlayer was deposited, the backsputter gun was rotated to bring the sample in line with the already active second sputter gun. To avoid any reaction of the interlayer with its surrounding, the second gun was activated just prior to the completion of the interlayer deposition. The two sputter guns are separated by a metallic partition to avoid any interpenetration of plasma during their simultaneous operation. The thickness of the deposited layers is measured by a quartz crystal monitor, and achieved by controlling the deposition time.

III. SPALLATION RESULTS OF VARIOUS MATERIALS

A. Metals/Pyrolytic Graphite (PG) interfaces

All of the metal coatings tested were 3 mm thick. Coatings of Sn, Sb, Cu, Nb, Al, and Cr were chosen. The deposition rates were controlled to be 8 Å/second, and all coatings were polycrystalline microstructure. The optional setup employed is discussed elsewhere. The constraining medium is a 5-mm layer of solid water glass with a 0.5-mm thick A1 film as the laser-absorbing medium. The mechanical properties for the various metals to be used in the determination of the interface strength are given in FIG. 13. For the PG, the longitudinal velocity of the stress wave was measured experimentally to be 4570 m/s by obtaining the pulse travel time within the substrate disc of a known thickness, and the density of 2200 Kg/m$^3$ is commonly known.

Figure 14:
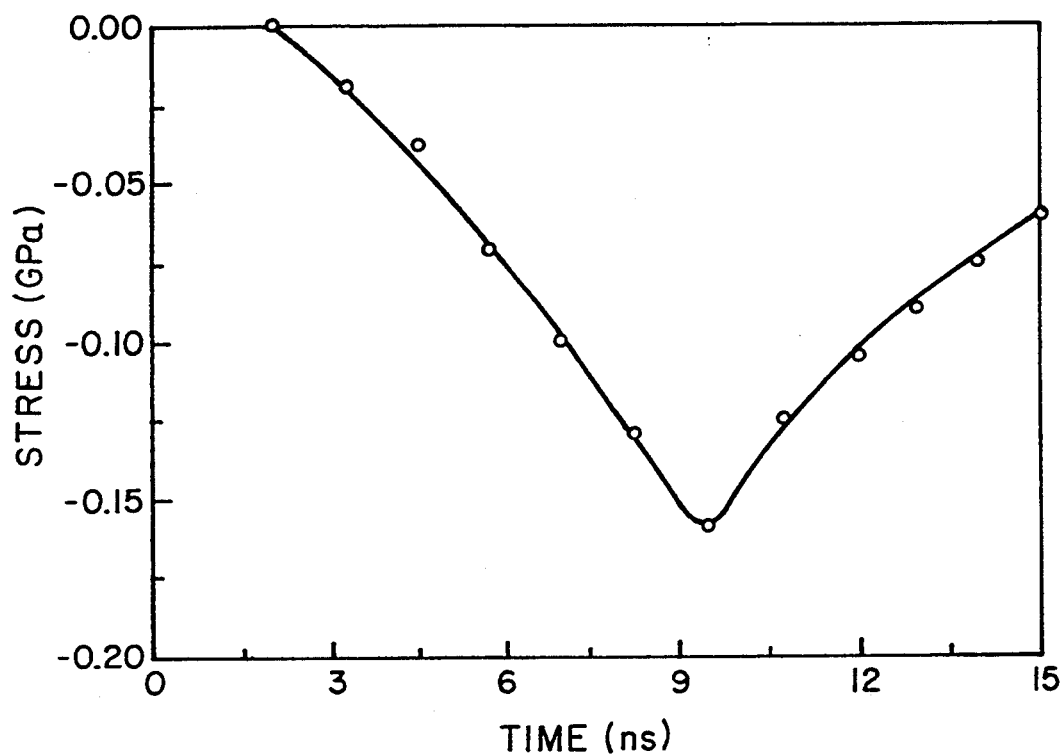
FIG. 14 shows the stress pulse profile generated in the PG substrate at a laser fluence of $2.25 \times 10^4$ J/m$^2$.
Figure 15:
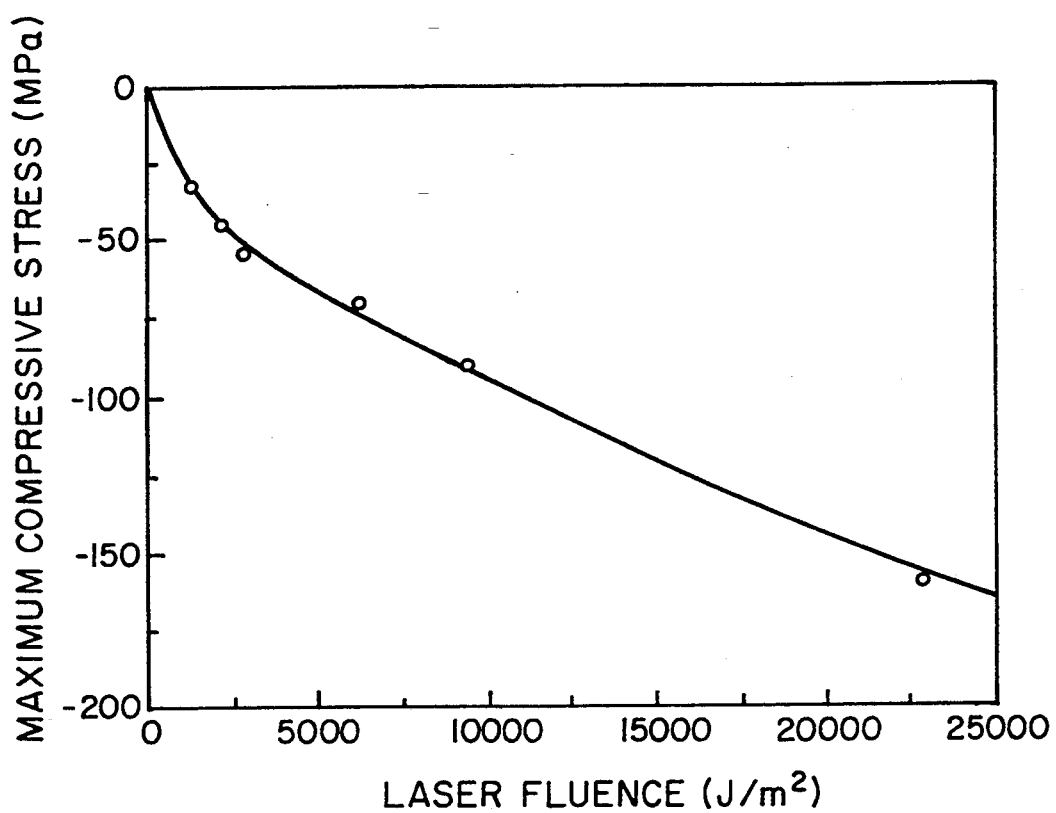
FIG. 15 shows a plot of the maximum of the maximum compressive stress versus the laser fluence in the PG substrate.

Since the PG substrates can be polished to a mirror surface, the displacement fringes were recorded on the free substrate surface by the Doppler displacement interferometer. FIG. 14 shows the stress pulse 1410 generated within the PG as measured by the Doppler displacement interferometer at a laser fluence of $2.25 \times 10^4$ J/m$^2$. The plot of the maximum compressive stress versus laser fluence is given in FIG. 15. A normalized stress pulse with the same shape as FIG. 14 was put into the computer program to obtain transfer coefficient I, as previously discussed. The transfer coefficients I for various metals are presented in FIG. 16. The threshold laser energy required to spall the coatings of various metals were measured separately and converted to interface strength by obtaining the corresponding maximum compressive stress from FIG. 15, and multiplying it by the appropriate transfer coefficient located in FIG. 16. The threshold energies and interface strengths for the various systems are also given in FIG. 16.

FIG. 16 indicates that the Nb/PG interface has the highest strength (41.14 MPa), and the Sb/PG interface shows the lowest strength (5.99 MPa), while the rest of the interfaces have strengths close to 15 MPa. Detailed microscopy of the failed interfacial region revealed that all interface failures were brittle, with limited growth of voids without any coalescence, which is consistent with similar observed strengths. However, the deformation within the coating during the process of interfacial spallation was found to be quite different.

Micrographs of the spalled spots for the above systems revealed that the separation occurs at the interface in all systems. The most interesting feature is in the fracture mechanisms of the coatings. These fracture mechanisms can be divided into three categories: brittle fracture, quasi-brittle fracture, and ductile fracture. Sb, Cr and Nb coatings exhibited brittle fracture features, in which the coatings are spalled off directly from the substrate without any plastic deformation within the coatings. Since the measured tensile strengths for the Cr and Nb interface of 15.47 MPa and 41.16 MPa are lower than their yield strengths of 362 MPa and 207 MPa, respectively, the coatings fracture in a brittle fashion. A similar conclusion follows for Sb, since the yield strength of 3.8 MPa as obtained from the conventional low strain tests is comparable to the measured strength of 5.99 MPa. Thus, at the typical strain rate of $10^6$ s$^{-1}$ in the spallation experiment, the yield strength of Sb must be much greater than 5.99 MPa, and should result in the observed brittle coating fracture. Additionally, the failed coating patterns are aligned with the stiffest direction of PG, which is along the edges of the graphitic planes on the surface. The spalled interfaces were observed to be flat and clean. In conclusion, for the interfaces involving Sb, Cr, and Nb coatings, both the interface and the coating showed a brittle failure.

The ductile fracture was observed in the Al coating. In this fracture mode, the coating bulges out, indicating a complete interface separation, albeit with no complete spallation even at laser fluence levels greater than the threshold value. However, some cracks were observed at the base of the bulge. The coating was carefully removed from the edges, and the surface toward the interface was examined under a scanning electron microscope. Interestingly, despite plastic deformation within the coating no significant plasticity in the form of hole growth was observed at the interface. Coalesced voids of about 1-mm diameter are arranged in slender pockets aproximately 10 mm in length. These pockets are aligned along the direction of the graphitic plane edges on the PG surface. The PG surface showed identical features, indicating stronger interfacial bonds along the edges of the graphite plane. Due to these stronger bonds, the local triaxial stress is elevated to several times the yield strength at the strain rate of the experiment of about $10^6$ s$^{-1}$ (values as high as 4 to 8 times the yield strength can be achieved). Due to the high triaxiality ratio, the voids within these slender pockets may grow and coalesce. This mechanism is feasible because the yield strength of Al is relatively insensitive to the strain rate; increasing from 15 MPa at $10^{-3}$ s$^{-1}$ to only 55 MPa at $10^4$ s$^{-1}$.[12] Since the interface stress within the pockets is higher than the measured value of 16.53 MPa by 3 to 6 times, the voids can grow as the stress is sufficiently higher than the yield strength of Al, taken here as 55 MPa, albeit for a strain rate of $10^4$ s$^{-1}$.

Finally, a quasi-brittle fracture mode was observed in the failures of Cu and Sn coatings. The Cu coating was completely removed from the interface, except for some coating flaps which hang from the interface. The coating-flap was carefully removed and its surface toward the interface was observed under high magnification. It was observed that the voids nucleated at the interface and grew only to 1 mm in diameter before the cleavage strength of the interface was reached. Moreover, micrographs of the PG surface contained markings similar to those observed for the Sb, Cr and Nb cases. Interestingly, no void nucleation was observed on the PG surface. Thus, the coating failure is brittle. Meanwhile, the ductile tearing at the flap edge is not due to the stress pulse; instead, it is an after-effect caused by the coating inertia and occurs at very small strain rates. The same is true for the apparent ductile tearing of the Sn coating. A high magnification view of the coating interface revealed sparse distribution of partially grown voids of about 1 mm in diameter.

It is interesting to note that the mode of coating failure is independent of its grain size. For example, the very fine grain size of Nb and the coarse one of Cr leads to brittle failure.

In conclusion, the Sb/PG and Nb/PG interfaces show the lowest and the highest interface strengths; respectively, however, they display the same fracture mechanism. Furthermore, Cu, Sn, and Al have similar interface strengths, while they produce different fracture mechanisms within the coating, albeit with similar brittle interface failures. Therefore, it is concluded that the interface fracture mechanism is influenced by the mechanical properties of the coatings and independent of the interface strength.

B. Nb/Al$_2$O$_3$ Interface

In this spallation measurement, all the Nb coatings were 3 mm thick. The deposition rates of the Nb, Cr, and Sb were controlled to 4.2 Å, 1 Å and 7 Å per second respectively. The Cr and Sb interlayer thickness ranged from 1 Å to 50 Å and from 7 Å to 140 Å, respectively, as attained by controlling the deposition time. The sputtered Nb coatings have a characteristic columnar microstructure. The energy-absorbing film is 0.5 Al film, and the constraining material is 3 mm fused quartz, as in the prior art technique. In the present invention, values of $\rho = 8570$ Kg/m$^3$, Young's modulus E=103 GPa, and Poisson's ratio $\nu = 0.38$ were used for the Nb coating and $\rho=3720$ Kg/m$^3$, E=303 GPa, and $\nu=0.23$ for the Al$_2$O$_3$ to obtain the interface strength.

Figure 17A:
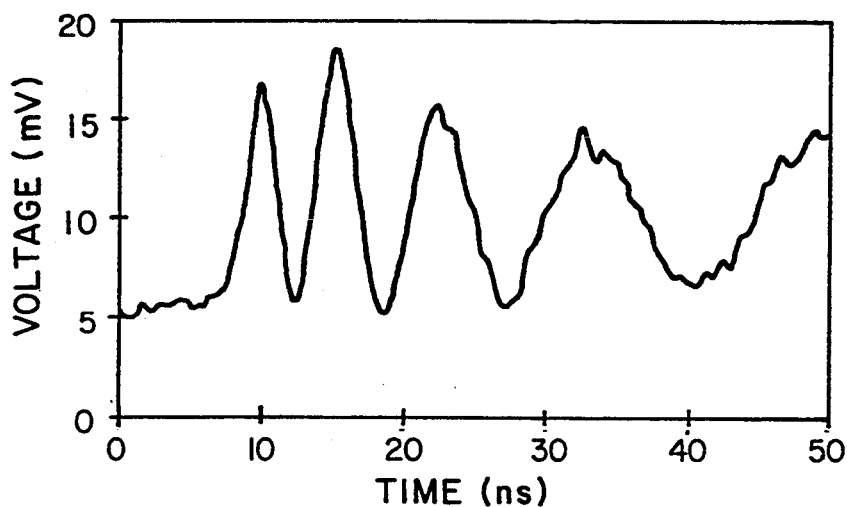
FIG. 17a shows a plot of the photodiode output voltage corresponding to the Nb coating free surface displacement obtained by the laser Doppler displacement interferometer.
Figure 17B:
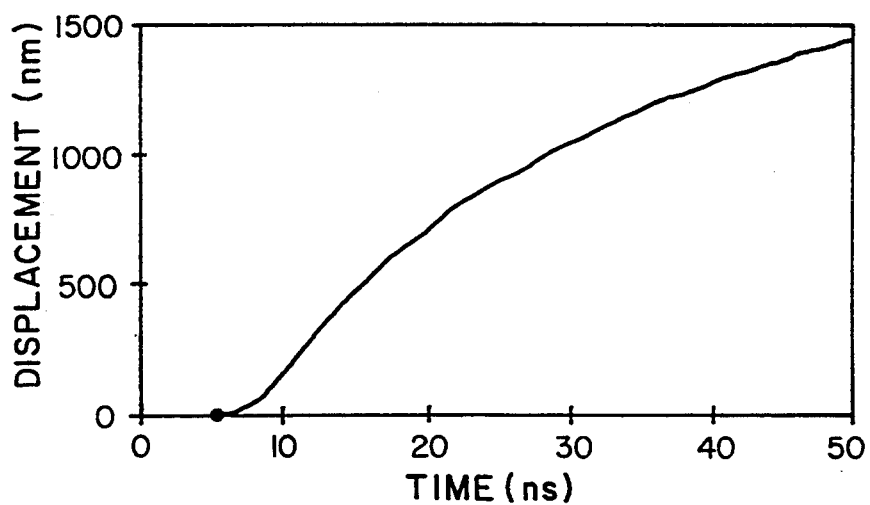
Figure 17C:
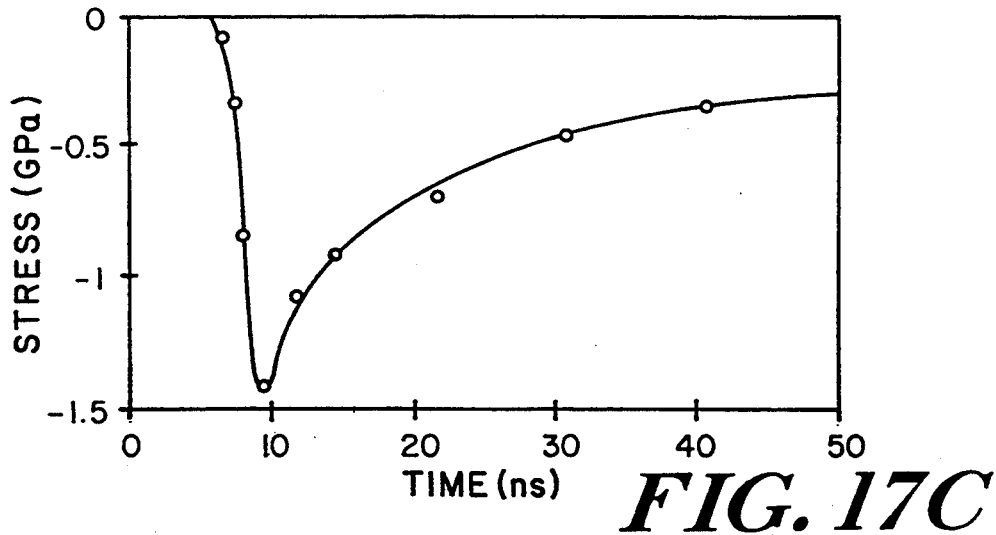
FIG. 17c shows a plot of the stress pulse profile striking the coating free surface obtained from FIG. 17b.
Figure 18:
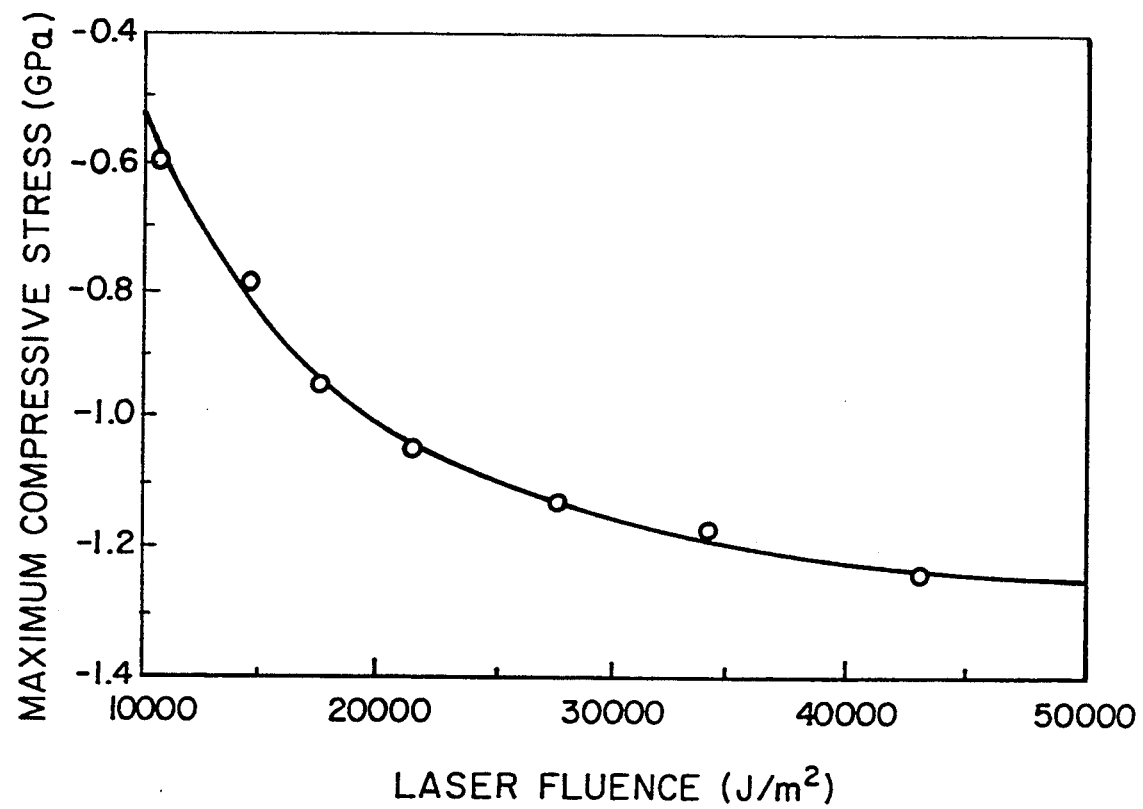
FIG. 18 shows a plot of the maximum compressive stress striking the Nb coating's free surface as a function of the laser fluence.

According to a preferred embodiment of the invention, the displacement fringes were recorded on the free coating surface by the laser Doppler displacement interferometer because of the poor optical reflection qualities of the alumina surface. FIG. 17(a) shows the photodiode voltage output corresponding to the coating free surface obtained by the laser Doppler displacement interferometer. FIG. 17(b) corresponds to the coating free-surface displacement obtained from the fringe record of FIG. 17(a), and finally, the stress pulse profile striking the coating free surface obtained from FIG. 17(b) is shown in FIG. 17(c). As previously discussed, because of the similarity in shape of the incident stress profile and that at the coating free surface, the transfer coefficient II can be used to convert the maximum compressive stress into the peak interface tensile stress. During this process, a stress profile with the same profile as FIG. 17(c) was inputted into the computer program, and the resultant transfer coefficient II for a 3-mm thick Nb coating was determined to be 0.31. Since the thicknesses of Cr and Sb interlayers are much smaller than the thickness of the Nb coating, the interlayers were not considered in the computer simulation. FIG. 18 shows the maximum compressive stress striking the Nb coating's free surface as a function of the laser fluence. The laser spallation measurements were carried out and the threshold laser energy at which the coating comes apart was measured and converted to interface strength by multiplying the value of FIG. 18 by transfer coefficient II of 0.31.

In the as-deposited state, the interface strength was determined to be 0.28 GPa. Since the stresses were generated only over a part of the interface, the coating of that part was completely removed at the interface. The fracture occurs at the interface in a brittle mode similar to that found in the Nb/PG system.

Control of the Nb/Al$_2$O$_3$ interface strength was achieved by using Cr and Sb interlayers. It was experimentally determined that an increase in the Nb/Al$_2$O$_3$ interface strength can be achieved as the Cr concentration is increased. The interface strength starts from 0.28 GPa, increases with the thickness of the Cr interlayer, and reaches a plateau of 0.35 GPa when the thickness of Cr is equal to and above 50 Å. Also, Sb was employed as an interface strength degrading element. A decrease in the Nb/Al$_2$O$_3$ interface strength was observed as the Sb thickness was increased to about 70 Å. Beyond this point, there is no further reduction in interface strength. Interestingly, the changes in the interface strength occur very rapidly within interlayer thicknesses of 20 Å, and the rate of change is eventually reduced to zero with the thickness of interlayers.

Due to the low wettability between interlayer metals and alumina, islands of metallic interlayer atoms are formed. These islands grow until they contact each other. The stable high and low levels of interface strength actually correspond to the interface strengths between interlayers and alumina. The changes in the interface strength relate to the increase in the area covered by the interlayer islands. For Sb layers of thickness exceeding 70 Å, an analysis of the structure showed no trace of Sb on the substrate side of the spalled interface. This observation supports the above explanation. The presence of oxygen results in the formation of the compounds like Cr$_2$O$_3$, with the availability of some free oxygen from the vacuum chamber or impurities from the uncleaned surface. This results in an increase of the interface strength.

C. Other Systems

The spallation experiments were also performed on interfaces between diamond film and polycrystalline alumina/diamond composite substrates, and those between SnO$_2$ coatings and alumina substrates. For the former system, the adhesion strength was determined to be greater than 137 MPa, since the failure was always observed within the substrate. It was found that the tensile strength of polycrystalline alumina/diamond composites decreased with an increase in the size and amount of the diamond particles. For the SnO$_2$/Al$_2$O$_3$ system, the adhesion strength was measured to be 286 MPa. In both of these applications, the stress pulse was measured at the surface of the alumina substrate.

As discussed above, various model applications of the laser spallation technique are shown. In order to accurately and reliably test thin coatings, the stress pulse profile should be optimized, e.g., shorter rise time and shorter decay time, which can be achieved via an experimental process described below.

IV. EXPERIMENTAL OPTIMIZATION OF THE STRESS PULSE

For potential applications of the present inventions to various interface systems, and systems involving thin coatings (less than 0.1 μm thickness), it is desirable to maximize the amplitude of the generated compressive pulse in the laser spallation experiment. Apart from increasing the pulse amplitude, as demonstrated by the numerical results previously described, the stress pulse rise and fall times also control the amplitude of the interface tensile stress. Furthermore, the interface tensile stress is far more sensitive to the decay time of the stress pulse than it is to the pulse's rise time. The optimization of the stress pulse generation conditions in the laser spallation technique of the inherent invention can be effectuated by changing the type and thickness of the laser-absorbing film, and its constraining medium. In addition, the influence of the substrate and laser fluence on the profile and amplitude of the stress pulse is discussed below.

The laser spallation technique of the present invention allows the system user to perform this optimization process experimentally since the generated stress pulse is detected at the rear surface of the coating or substrate. A competitive numerical model for obtaining the optimal conditions is very difficult to achieve as this requires modeling the multiphoton ionization process within the plasma, created at the film surface upon absorption of the laser energy. The ablating particles in the plasma produce a force normal to the material surface by momentum transfer. Acoustic waves formed by such processes differ markedly from those formed by the thermoelastic expansion of the solid or molten film. Since in the above-described laser spallation technique a combination of these processes occur at the threshold laser fluences, a direct experimental optimization is a reliable way of studying such laser/material interactions. In addition, a column of liquid was used as an alternative to the solid confining medium, which makes the modeling even more complicated.

The generation of stress pulses in solids by lasers has been actively pursued since 1963. One of the main interests over the years has been to enhance the stress pulse amplitudes. The first prior art and simplest approach involved using high-power laser pulses. The second prior art approach involved using constraining layers on the surface of the solids or laser-absorbing films, resulting in an amplitude enhancement through constrained plasma expansion. As such, coatings of transparent, relatively volatile materials were used to produce an order of magnitude increase in the pulse amplitudes, and a thin coating of black paint or drops of distilled water can produce results comparable to the constraining techniques. The effects of various laser-absorbing metallic films on the amplitudes of the stress pulses produced in a piezoelectric quartz crystal were also investigated. However, the prior art techniques failed to discuss the effect of the metallic films on the stress pulse profile (defined by both the rise and fall times of the stress pulse). The present invention optimizes both the profile and amplitude of the stress pulses generated by varying the various experimental conditions in the laser spallation setup, including the type and thickness of the constraining material, and the laser-absorbing film. In addition, the effects of the laser fluence and the substrate material on the stress pulse were also investigated.

All measurements for stress pulse optimization were performed using the laser spallation setup of FIG. 1. Except when studying the effect of the substrate material itself, all experiments reported here were performed on substrates of N-type Si single-crystal wafers with a 25.4-mm diameter and a 1-mm thickness. Both (100) surfaces of the Si wafer were polished to within a quarter of a wavelength of light. The deposition of the laser-absorbing films was done by the DC and RF-magnetron sputter system as previously discussed. The amplitude and the profile of the stress pulse were measured by monitoring the transient free-surface velocity of the Si surface by the Doppler displacement interferometer.

A. Influence of the type of the laser absorbing film

Figure 20:
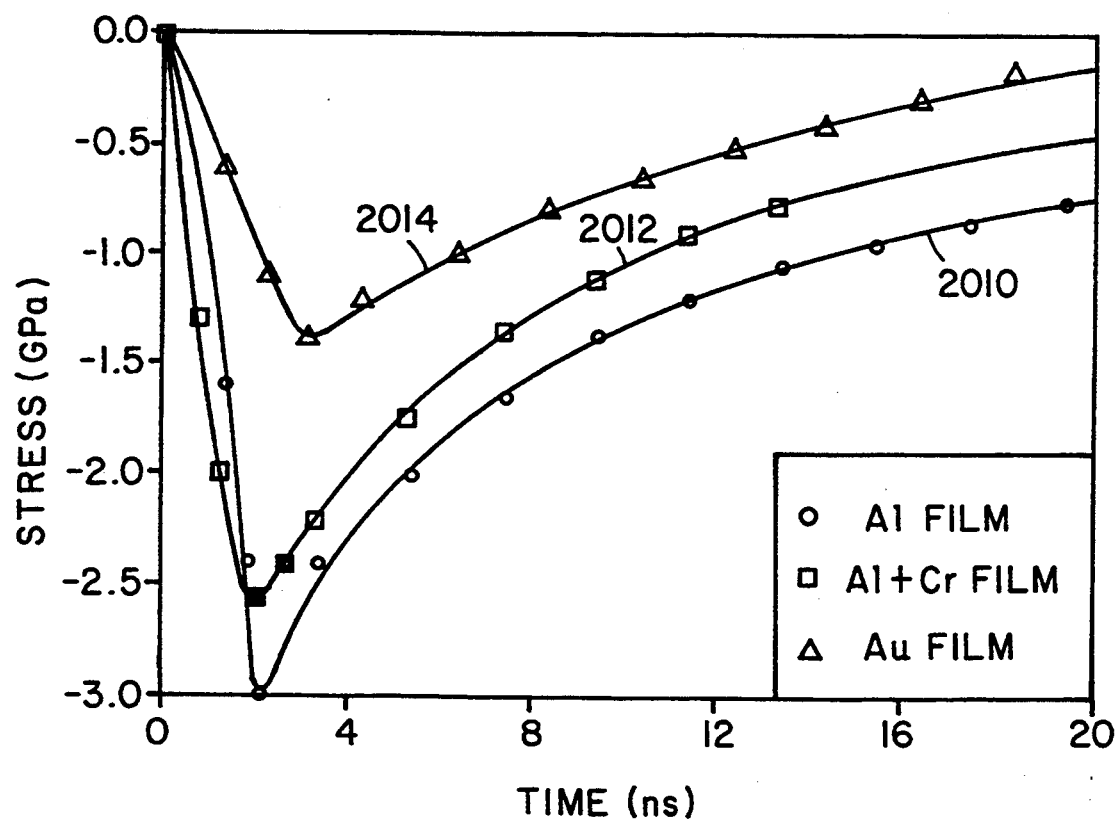
FIG. 20 is a plot of various energy absorbing films showing the influence of the various type films on the stress pulse when using a laser fluence of $8.67 \times 10^4$ J/m$^2$ and a fused quartz disc as a constraining material.

FIG. 20 shows the profiles of stress pulses generated in the Si wafer with different laser absorbing films. Since each film has a different emissivity at 1.06 $\mu$m, for the purpose of comparison all experiments were performed at a laser fluence of $8.67 \times 10^4$ J/m$^2$, measured before the laser pulse strikes the film. A fused quartz disc was used as the constraining material and lapped onto the film in a known manner. The candidates for the laser absorbing films were Au, Al, and Al+Cr. The bilayer of Al+Cr involve depositing a film of Al on the substrate, followed by a deposition of the Cr film. In this arrangement the Al film acts as a stress-generating film because of its high thermal expansion coefficient, while the Cr film maximizes the absorbed laser energy because of its low reflectivity to the 1.06 $\mu$m laser beam. The thicknesses of Au, Al, and Cr films were chosen to be 0.5 $\mu$m, 0.5 $\mu$m, and 0.06 $\mu$m, respectively. FIG. 20 shows that the Al film stress pulse 2010 and Al+Cr film stress pulse 2012 produced higher amplitudes and lower rise times than the Au film stress pulse 2014. Specifically, the rise-times for the Au, Al, and Al+Cr films are 3 ns, 2.4 ns, and 2.2 ns respectively, while the corresponding peak stresses, as measured from the laser Doppler displacement interferometer, were 1.34 GPa, 2.5 GPa, and 3.0 GPa, respectively. The decay time of the pulse is controlled by the extent of the thermal pulse propagation within the film which is controlled partly by the thermal diffusivities of the film and the constraining medium. FIG. 20 further shows that similar decay times exist for all three cases, and interestingly, the thermal diffusivities for Al and Au are $0.982 \times 10^{-4}$ m$^2$/sec and $1.30 \times 10^{-4}$ m$^2$/sec, respectively. The low rise time for the Al film in comparison to the Au film is due to its lower heat capacity and higher emissivity (7%) resulting in higher temperatures, as the thermal diffusivities of Al and Au are quite comparable. The rise time of the stress pulse is limited by the rate at which the heat energy is input, which in turn is controlled by the rise time of the laser pulse, being equal to about 1.5 ns in the present experiment. Although the rise time of 2.2 ns for the Al+Cr film is marginally lower than 2.4 ns obtained using the Al film alone, the amplitude of the stress pulse is about 20% lower. Therefore with respect to both the amplitude and rise time optimization, an aluminum layer was chosen as the energy absorbing layer of the present invention.

B. Influence of the type of the constraining material

Since the axial sample assembly ensures only a hermetic contact between the constraining element and the energy absorbing layer, it is important that the surfaces be flat in order to avoid trapping of the interface air pockets. In order to remove the possibility of such pockets, the possibility was explored of using free standing columns of liquid, and thin layers of solid produced by applying liquid solution, which are transparent to the laser light. Interestingly, apart from achieving better reproducibility, both the stress pulse amplitudes and profiles were also optimized.

Figure 21:
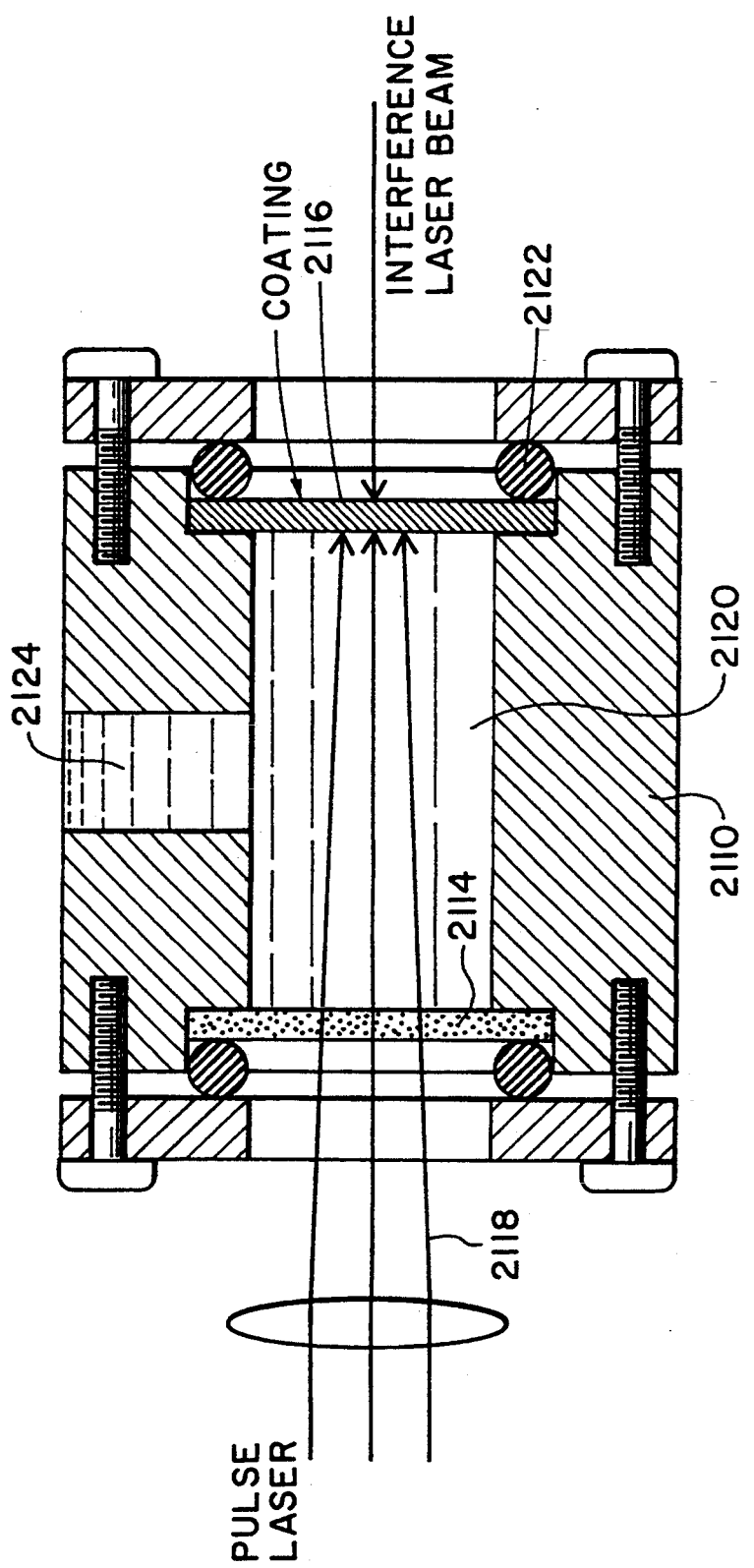
FIG. 21 shows an alternate embodiment of the sample assembly used to generate the stress pulse.

Several liquids were also used as constraining materials. To employ these liquids, a special liquid tank was designed and built. A schematic of the liquid tank is shown in FIG. 21. The liquid in the tank 2110 was held by a fused quartz wall 2114 and the surface of the sample 2116 was coated with the laser-absorbing film previously discussed. The fused quartz 2114 also acts as a transparent window for the 1.0 $\mu$m Nd:YAG laser pulse 2118 and allows it to reach the laser absorbing film through the liquid column 2120. The "O" rings 2122 prevent the liquid 2120 from leaking from the tank 2110. The thicknesses of the liquid column 2120 and fused quartz 2114 were 25 mm and 3 mm respectively. A 12-mm diameter hole 2124 was provided on the upper part of the tank 2110 to release the air, otherwise the air pressure build-up upon evaporation of the liquid 2120, would break the substrate. In the present experiments, the liquids chosen were water, 2-propanol and water glass ($H_2SiO_3$:($H_2O)_x$).

Finally, a 0.5-$\mu$m thick layer of solid water glass was used as a constraining medium. A thin layer of liquid water glass ($H_2SiO_3$:($H_2O)_x$) was first applied to the energy-absorbing film; after several minutes' exposure in the air, water evaporated from the water glass leaving behind a layer of SiO$_2$ film that is transparent to the laser wavelength. The solid water glass film fits exactly to the energy-absorbing film. The thickness of the solid film was controlled by the amount of liquid water glass. A laboratory procedure was adopted to yield a final solid layer thickness of 5 $\mu$m.

For all the constraining materials, Al film was used as the laser-absorbing film. The results at laser fluence of $8.67 \times 10^4$ J/m$^2$ (measured at the Nd:YAG source) for 0.5-$\mu$m thick Al film are presented in FIG. 22. Remarkably, a 5.0-$\mu$m thick layer of solid water glass generates the strongest and sharpest stress pulse. Although the fused quartz plate produces the same amplitude of 3.0 GPa, the rise time of 3.05 ns is almost 2.7 times that obtained by the layer of solid water glass. Furthermore, the stress pulse shows a much sharper decay in the case of solid water glass, a feature which is critical to increasing the interface tensile stress. The shallow decay in the case of the fused quartz is due to a decrease in the effective thermal diffusivity and to the presence of interface air pockets. Such a decrease in the thermal diffusivity will result in a longer and more gradual tail of the stress pulse profile.

Figure 22A:
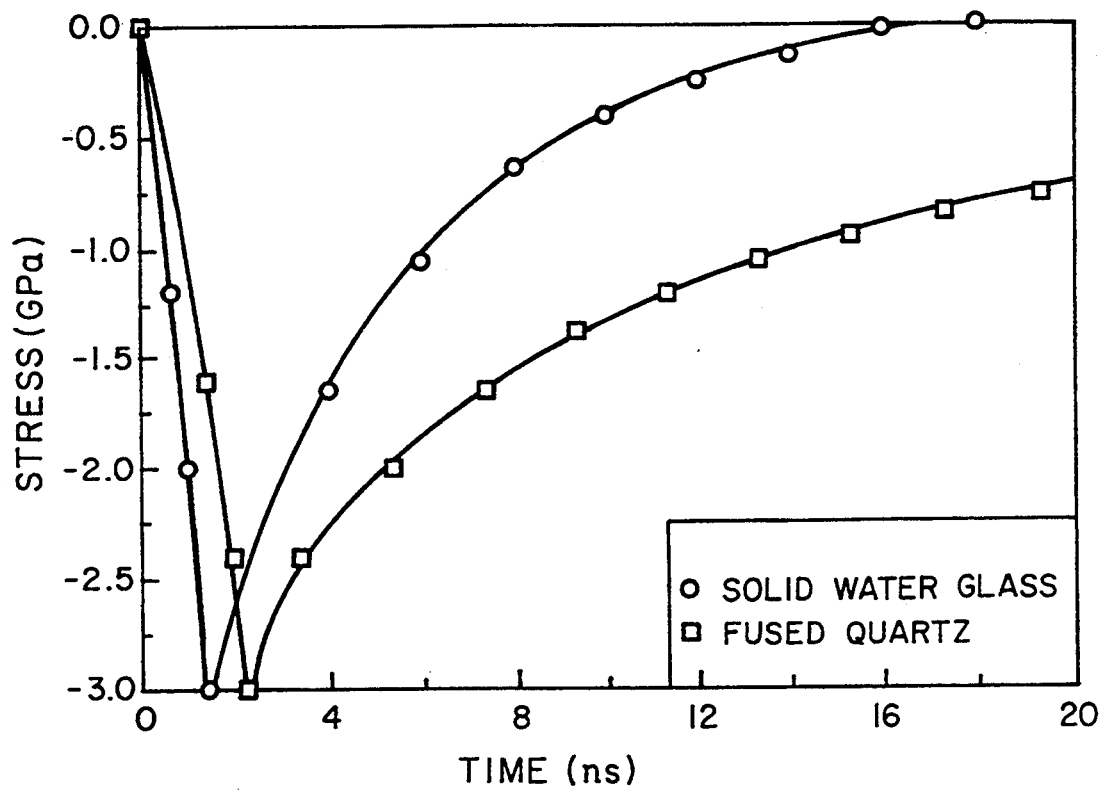
FIG. 22a shows the influence of a solid water glass constraining material on the generated stress pulse.
Figure 22B:
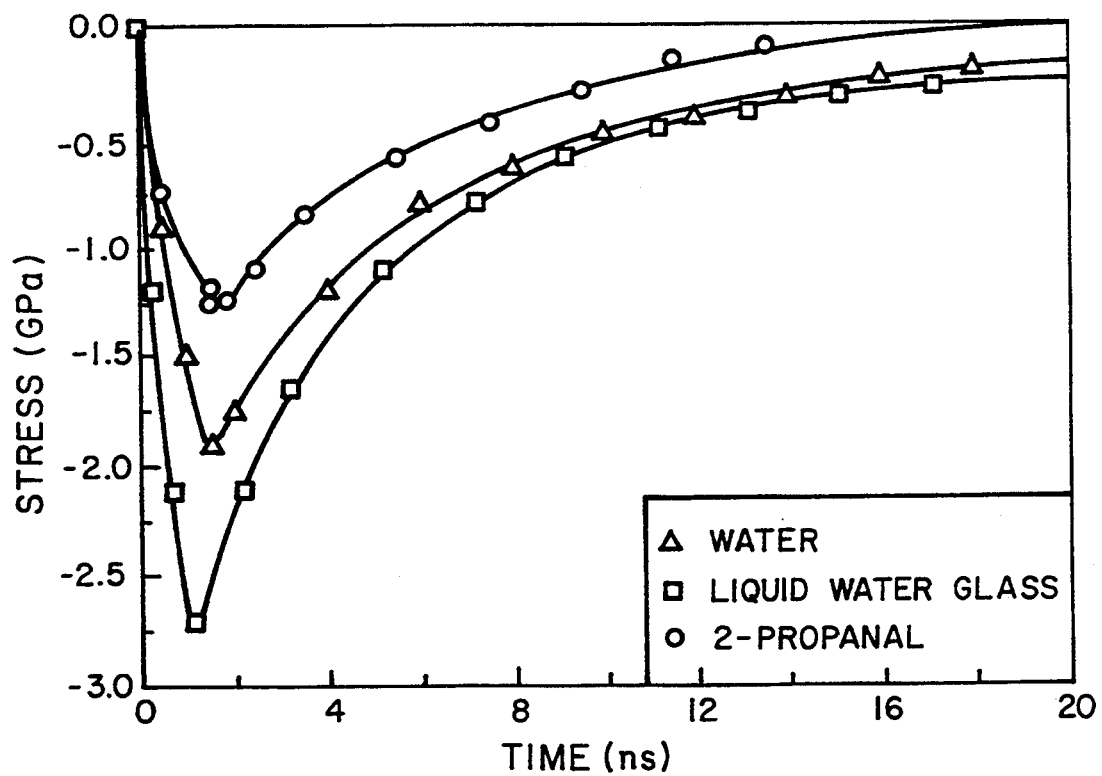
FIG. 22b shows the influence of a liquid constraining media on the generated stress pulse.

The most interesting feature of FIG. 22 is that a use of liquid water glass produces a stress pulse amplitude that is only 10% lower than that obtained by its solid counterpart, and by the fused quartz. Interestingly, the rise time of 1.33 ns is lower compared to that of 3.05 ns obtained through the use of fused quartz. The same is true for the post-peak fall profile. In fact, compared to the fused quartz, both the rise and fall times are much sharper even for water (1.52 ns rise time) and for a liquid solution of 2-propanol (1.90 ns), albeit at lower amplitudes of 1.88 GPa for water and 1.25 GPa for the propanol solution. This presumably occurs due to a better interface, free of air bubbles.

The process of stress pulse generation with liquids as constraining media involves reaching the nucleation condition through a non-equilibrium, super-heating of the liquid. For liquid water glass, both the amplitude and rise time of the pulse is almost the same as its solid counterpart, because at very high strain rates, the liquid provides all the inertia and acts exactly like a solid. Therefore, for time intervals shorter than the laser pulse rise time, the liquid water glass acts like a solid with similar thermo-mechanical properties, leading to a similar rise time. The sharper post-peak decay compared to the fused quartz occurs because of a sudden cooling at the liquid/film interface from the liquid nucleation process. The cooling of this interface should significantly reduce the thermal pulse diffusion distance towards the substrate. As discussed earlier, this will result is a sharper decay of the stress pulse. Although a more quantitative understanding is required to select the most efficient liquid, nevertheless, the selection of various liquids based on a physical understanding given here indicates that a 5.0-$\mu$m thick layer of solid water glass provides the desirable profile for the modified laser spallation experiment.

C. Influence of the Thickness of the Laser Absorbing Film

Figure 23:
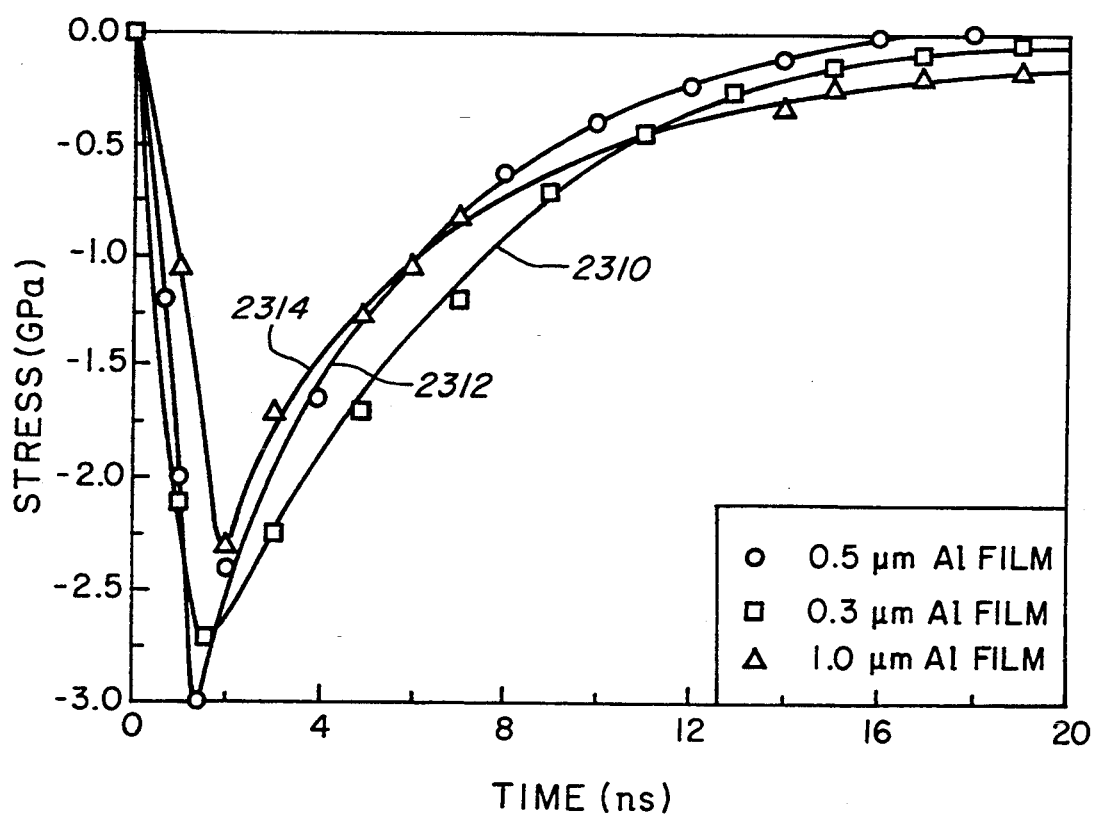
FIG. 23 shows the influence of the thickness of the energy absorbing layer on the stress pulse profile.

The thickness of the laser-absorbing film also influences the characteristics of the stress pulse. Since the Al film, when constrained by a 5-$\mu$m layer of solid water glass, provides the optimal pulse profile, experiments were carried out with Al film thicknesses of 0.3 $\mu$m, 0.5 $\mu$m, and 1.0 $\mu$m, and constrained by a 5-$\mu$m thick layer of solid water glass. FIG. 23 shows the profiles of the stress pulses 2310, 2312, and 2314 for different Al thicknesses, all obtained at a laser fluence of $8.67 \times 10^4$ J/m$^2$. No trend, either for the rise time or for the amplitude of the stress pulse, was observed with the coating thickness. The highest amplitude (3.0 GPa) and lowest rise time (1.14 ns) was obtained with a 0.5-$\mu$m thick Al film 2312. The rise time/maximum amplitude pair of 2.19 ns, 2.3 GPa, was obtained with a 1.0-$\mu$m thick film, while the pair 1.62 ns, 2.68 GPa, resulted with a 0.3-$\mu$m thick film 2310. The lower amplitudes at thicknesses less than 0.5 $\mu$m are due to a reduction in the total laser energy absorbed by the Al film. Clearly, the penetration depth at a laser wavelength of 1.0 $\mu$m should define the smallest thickness of the film for maximum pulse amplitudes.

Furthermore, higher rise times are obtained at thicknesses lower than a critical film thickness (here, 0.5 $\mu$m) because the poor thermal diffusivity of the confining medium starts to dominate, leading to lower spatial temperature gradients within the film, and resulting in a higher rise time. Therefore, 0.5-$\mu$m thick Al film confined by a 5-$\mu$m thick layer of solid water glass is used for the laser spallation set-up of the present invention.

D. Influence of the Thickness of the Constraining Material

The optimal thickness for solid water glass layer was also explored in order to maximize the pulse characteristics. A 0.5-$\mu$m thick Al film was used as the laser-absorbing material. It was observed that the stress pulse does not change when the water glass thickness changed from 1 $\mu$m to 10 $\mu$m. Within this range in thickness, the solid water glass layer and the molten Al film are completely removed after the generation of the stress pulse. In the laser spallation setup, one compressive pulse is produced in each the substrate and the constraining medium. It is the reflection of the compressive pulse into a tension pulse from the free surface of the solid water glass that leads to its removal. As explained in detail below, the removal of the Al and solid water glass occurs within 1.27 ns and all of the heat trapped within these layers is completely detached from the substrate. Consequently, the stress pulse within the substrate is free of any thermal tail and leads to a hitherto unreported stress pulse profile with 1.14 ns rise time, and with no post-peak decay tail. Referring to FIG. 22, the stress becomes zero at 17 ns, whereas for other constraining media, the tail of the pulse assumes an asymptotic behavior. This effect is analogous to the mechanism of stress pulse generation through an impact of a thin flyer plate in the plate impact experiment.

Figure 24A:
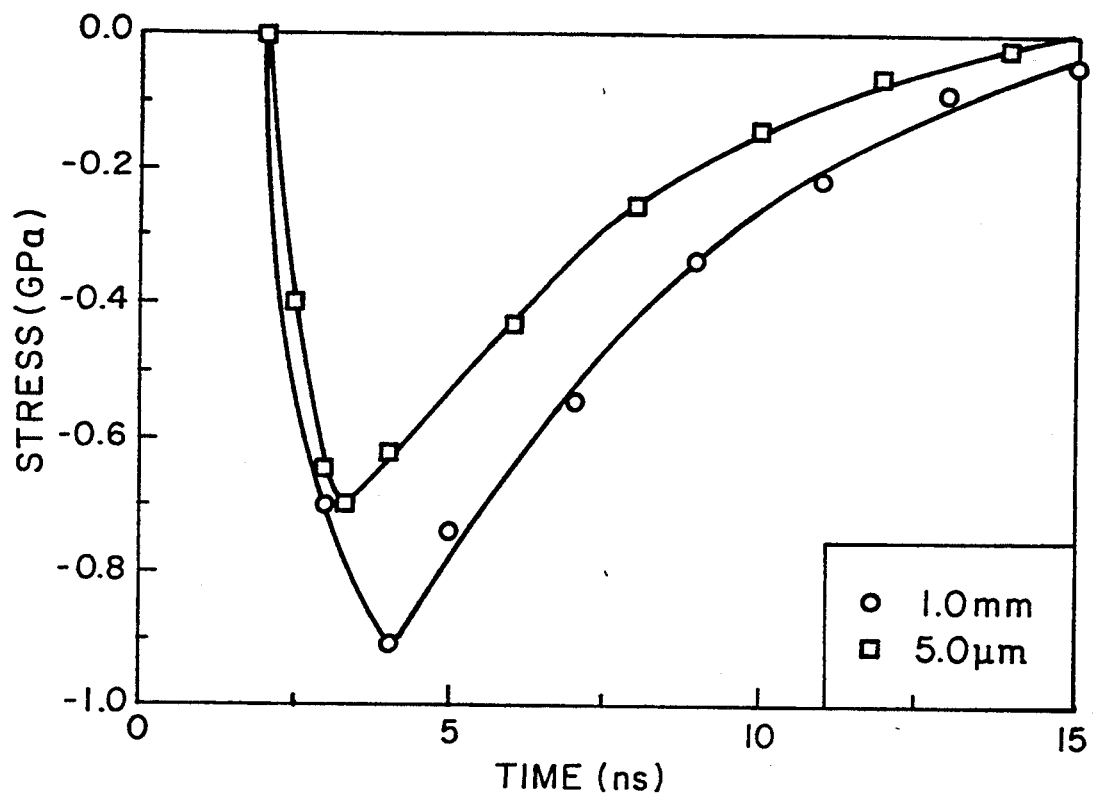
FIG. 24a shows the influence of the thickness of the constraining material on the stress pulse profile at a laser fluence of $1.07 \times 10^4$ J/m$^2$.
Figure 24B:
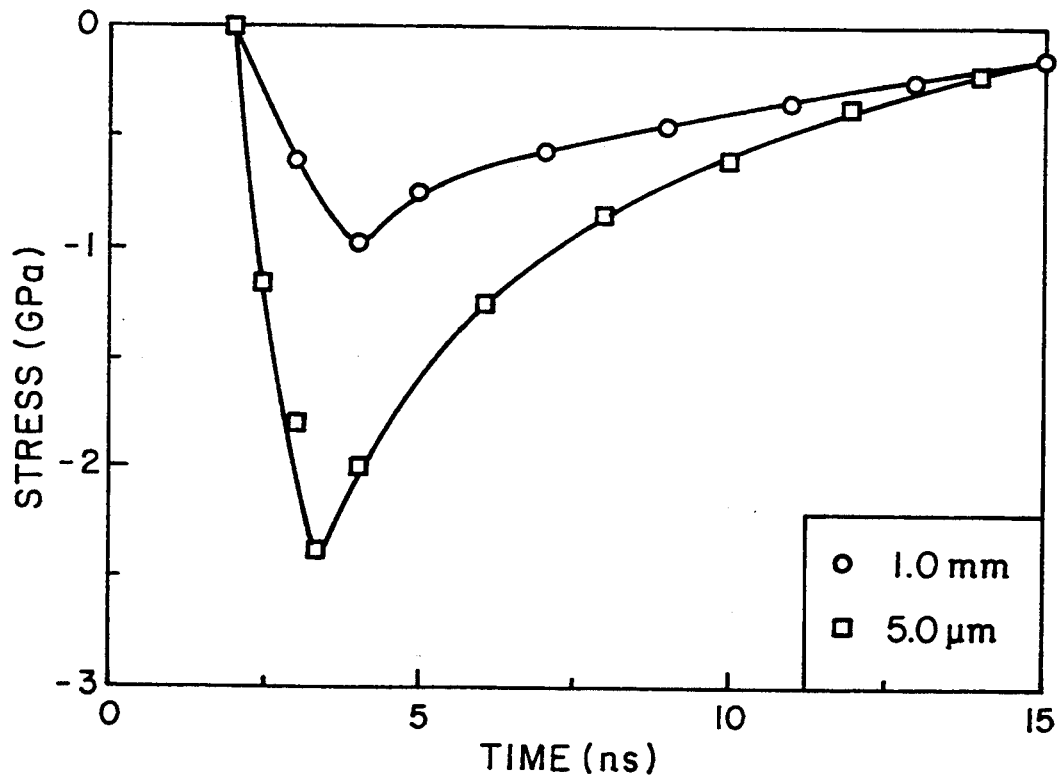
FIG. 24b show the influence of the thickness of the constraining material on the stress pulse profile at a laser fluence of $4.18 \times 10^4$ J/m$^2$.

It is of interest to define the characteristics of the stress pulses in cases where the solid water glass layer remains intact. Additional experiments were performed with 5 $\mu$m and 1 mm thick solid water glass layers. Solid water glass 1 mm thick remained intact against the substrate upon microexplosion of the Al film. The results are shown in FIG. 24. The 1-mm layer produces 30% higher amplitude than that produced by a 5-$\mu$m layer at low laser fluence levels, and much lower (60%) amplitudes at a higher laser fluence. The rise time of 1.2 ns with a 5-$\mu$m layer is much shorter in comparison with 2.0 ns for the 1 mm thick layer. The results indicate that different laser-material interactions occur in cases involving removed and intact constraining material.

E. Influence of the Laser Fluence

Figure 25:
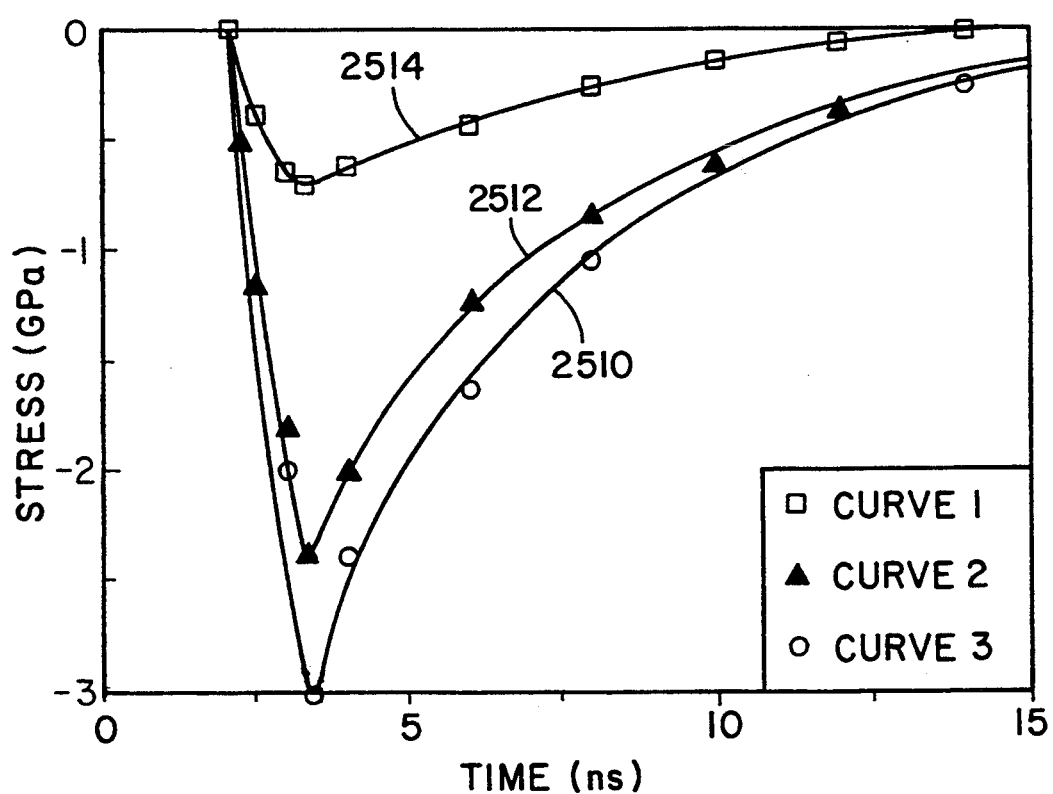
FIG. 25 shows the influence of the laser fluence on the generated stress pulse using Al film as absorbing layer and 5 μm tuck solid water glass or the constraining material where curve $1=1.07\times10^4$ J/m²; curve $2=4.18\times10^4$ J/m²; and curve $3=1,07\times10^4$ J/m².

Within the range of laser fluences used in the experiment, we have found that a higher fluence results in an increased stress pulse amplitude. However, the effect of the laser fluence on the shape of the stress pulse is also important. For a given substrate, if the profile of the stress pulse remains similar (they can have different amplitudes) for different laser fluences, then one stress pulse profile can be used as an input into the computer program to calculate the transfer coefficients (as previously discussed), and this can be used throughout the entire experiment. Otherwise, the computer program has to be run for every stress pulse shape, which can be time-consuming. FIG. 25 presents the results for such experiments performed with 0.5-$\mu$m Al film and 5-$\mu$m solid water glass at increasing laser fluences. It shows that as the fluence level is increased, the stress pulse profiles 2510, 2512, and 2514 are retained, albeit with different amplitudes. Therefore, it is feasible to resort to the computer code only once for each substrate/coating system. The similarity in shape of the stress pulse implies the same mechanism for generation of the stress pulse within the fluence levels considered here.

Figure 26:
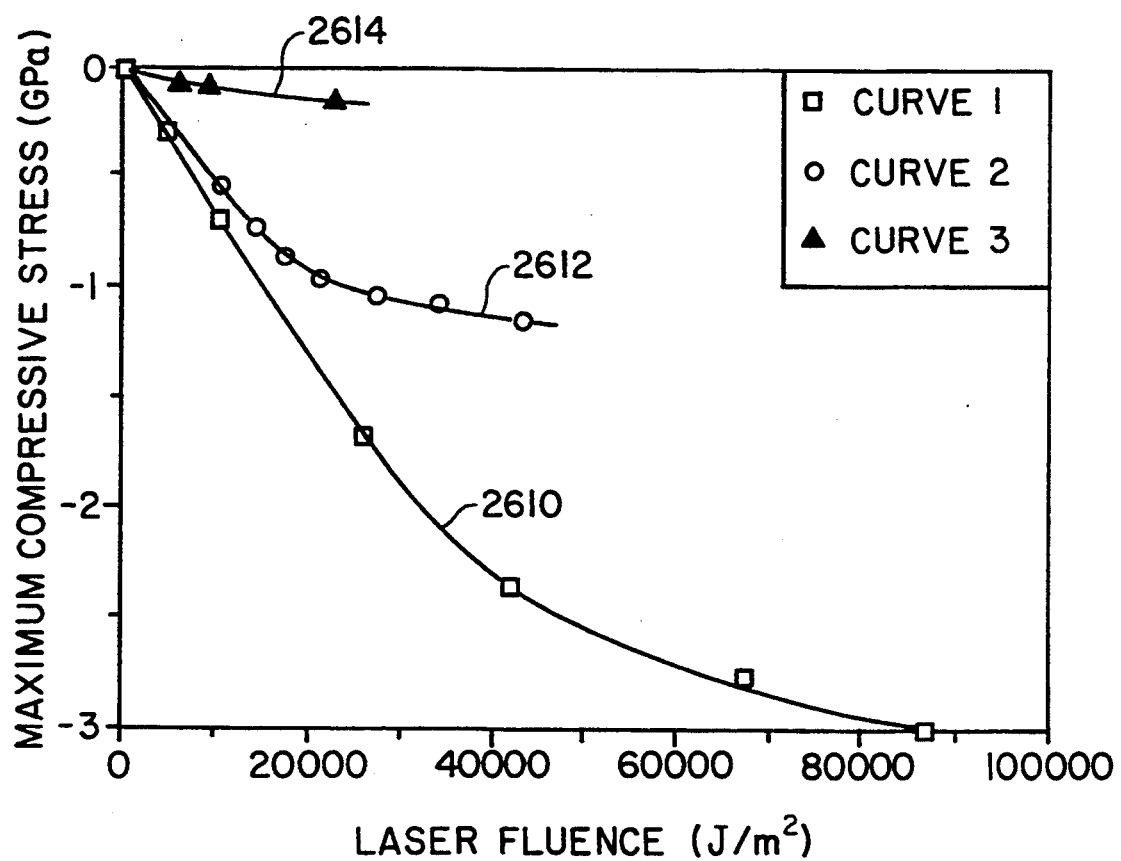
FIG. 26 shows a plot of the maximum compressive stress versus the laser fluence for different combinations of energy absorbing layers and constraining media.

The effect of the laser fluence on the maximum compressive stress is one of the most important characteristics of the stress pulse, since the maximum interface tensile stress is calculated by multiplying this value by the transfer coefficient. FIG. 26 shows plots 2610, 2612, and 2614 of the maximum compressive stress vs. the laser fluence for several different experimental conditions. Based on experimental results, laser fluence curves depend on the kind of substrate material, the kind and thickness of the energy absorbing material, and its constraining material.

F. Influence of the Substrate Material

Figure 27A:
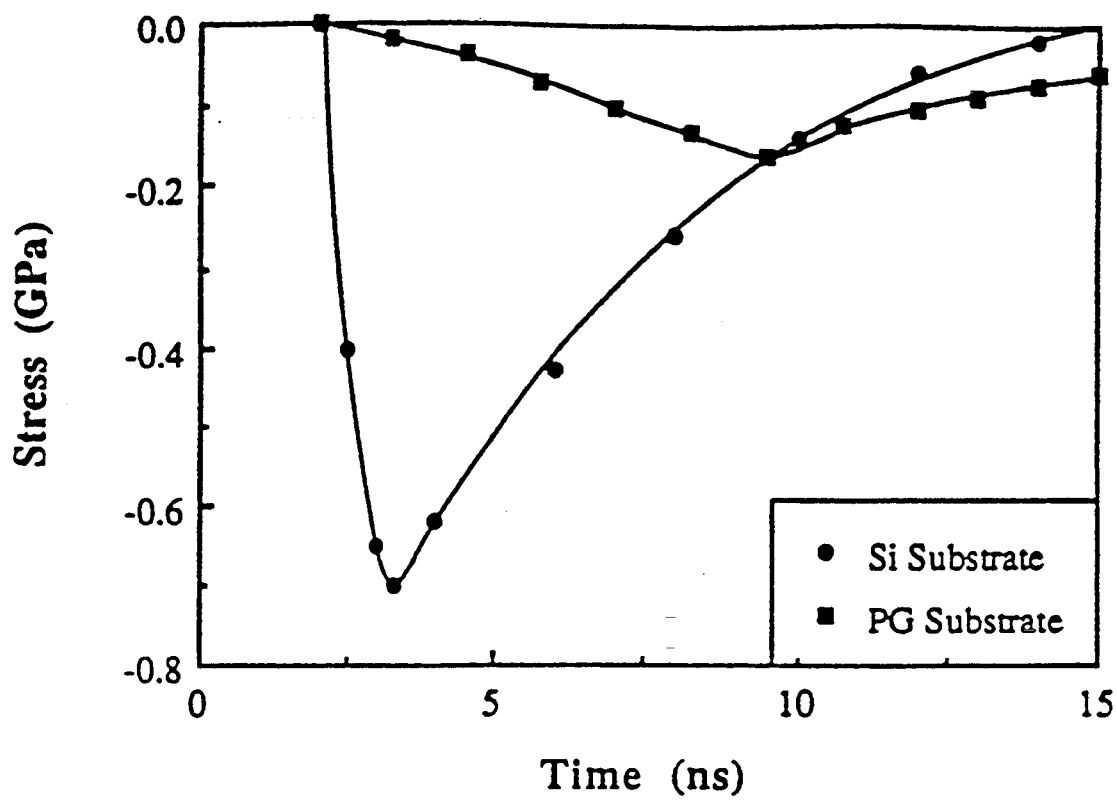
FIGS. 27A and 27B show the influence of the substrate material on the stress pulse profile.

FIG. 26 shows that the amplitude of the stress pulse varies in different substrates even at the same laser fluence. As expected, the profile of the stress pulse is also influenced significantly by a change of the substrate material. One such example is shown in FIG. 27(a), which shows that the stress pulse generated in silicon substrate 2710 is much stronger (0.71 GPa) and sharper (1.2 ns rise time) than that in the pyrolytic graphite substrate 2712, (with 0.05 GPa amplitude and 4.5 ns rise time). Even the post-peak decay is sharper for Si due to its higher thermal diffusivity.

Figure 27B:
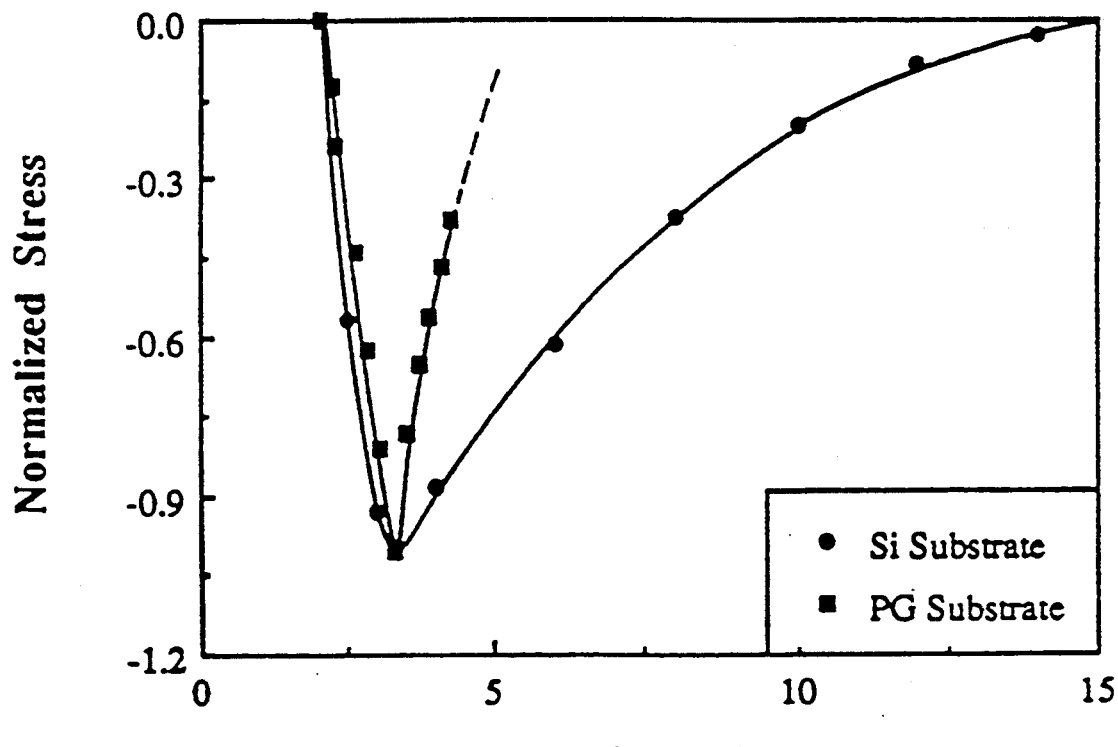

Normalizing the amplitude by using its maximum amplitude, and the time by using the rise-time, normalized profiles 2720 and 2722 were obtained for different substrates. Unfortunately, as shown in FIG. 27(b) the normalized shapes are not similar. Therefore the transfer coefficient charts as provided in Part I are associated with a given stress pulse profile.

The foregoing results indicate that a setup which consists of a Al film of 0.5 $\mu$m as the energy-absorbing film and a layer of solid water glass several micrometers thick, when used as the constraining material in the modified laser spallation experiment, gives the highest and the sharpest stress pulse. This stress pulse has the best potential for spalling thin film interfaces. The system of the present invention is an improvement over an earlier version where a 1.0-$\mu$m thick gold film, confined by a 2 mm thick fused quartz was used.

In addition to the higher and sharper stress pulse profiles, the present system offers several advantages. First, the contact between the energy-absorbing film and constraining medium is improved. In cases where a fused quartz is used as the constraining medium, even a very flat surface can lead to the trapping of air gaps between the film/quartz interface due to small local roughness. The air gap reduces the amplitude of the stress pulse and results in a longer post-peak decay time. In addition, after the first shot, the thermal expansion and ablation of the energy-absorbing film and local microcracking of the fused quartz, causes additional air gaps near the ablated area. The replicability of the results in the modified setup is improved due to the coherent, air bubble free interface. In addition to the elimination of air gaps, the stress pulse is independent of the thickness of the constraining solid water glass provided the thickness is between 1 $\mu$m and 10 $\mu$m.

For a given substrate, the stress pulse rise time is controlled predominantly by the rise time of the Nd:YAG laser pulse. In all of the examples reported herein, the stress pulse rise-time is relatively less sensitive to the experimental variables, remaining within 1 ns to 3 ns. In contrast, the decay time or the fall time of the stress pulse is a strong function of the experimental variables. The interface tensile stress is far more sensitive to the decay time of the stress pulse than it is to the pulse's rise-time.

The stress pulse generation mechanisms can be divided into two broad categories, those involving a change in the state of the irradiated medium, and those that do not. The constrained thermoelastic expansion of the Al film is the dominant mechanism in the category involving no phase change of the irradiated medium. The normal force generated by the thermal expansion features a bipolar stress pulse. A change in the phase of the irradiated medium occurs if the energy density of the pulsed laser is raised above a threshold value. When the energy fluence is high enough, multiphoton ionization takes place on the surface, causing a plasma to form. The ablating particles in the plasma produce a force normal to the material surface through momentum transfer. It is found that the acoustic waves formed by plasma differ markedly from those formed by the thermoelastic expansion. The normal forces generated by the plasma have the feature of a monopolar pulse with a constant rise time and a slow fall time. The plasma effect can persist for substantial fractions of one microsecond. At high power densities, plasma induced forces will dominate over the thermoelastic forces, provided there is no constraining medium. In the cases of thermoelastic expansion and melting, the amplitude of the stress pulse is influenced by the optical absorbing coefficient, thermal expansion coefficient, and volume change upon melting of the energy-absorbing film, and the sharp decay of the pulse results from the high thermal diffusivity of the laser absorbing, constraining, and substrate materials. In the present laser spallation system, the plasma is observed in the energy ranges of interest; thus it is necessary to account for the plasma effect. However, when a transparent constraining fused quartz plate is used, the thermal expansion mechanisms (including the thermoelastic and the melting effects) are enhanced and the relative portion of the plasma effect becomes smaller.

In the case of liquid constraining layers such as water and liquid water glass, the presence of both the constraining layer and evaporating liquid are demonstrated to be the cause of normal forces. Since such phenomena are difficult to simulate by using prior-art computer techniques, the present invention has an advantage over the prior-art, since it does not need to consider the generation mechanisms of the stress pulse by a pulsed laser. It is this feature that makes it possible to optimize the laser spallation experimentally.

Finally, modern acoustic applications require special ultrasonic sources to generate strong and short stress pulses for applications in interface strength measurements, measurement of elastic constants of materials through ultrasounds, and nondestructive detection of submicron flaws. In the present invention, it is demonstrated that narrower and stronger stress pulses can be produced by applying only a thin layer of solid water glass. Since solid water glass can be used simply on any kind of solid surface, it is feasible to use this method for in situ detection of flaws in the manufacturing industry. Without doubt, the results presented here should be significant in developing future laser ultrasonic sources.

The mechanics of how short stress pulses can be produced are discussed below.

V. STRESS PULSES WITH NO ASYMPTOTIC DECAY

Typically, stress pulses exhibit a gradual post-peak decay resulting in an asymptotic tail, usually about 5% of the peak amplitude. The system of the present invention demonstrates a short rise time of 1.14 ns with a sharp post-peak decay resulting in zero stress at about 17 ns. Normally, the long tail results from the long penetration depth of the thermal pulse in the substrate. The use of a confining medium with higher thermal diffusivity than that of air helps decrease the penetration depth by providing an energy sink away from the direction of the substrate. For example, when air is used as the constraining medium for the laser-absorbing film, a long gradual tail reaching an asymptotic value of about 10% of the peak amplitude.

Figure 28:
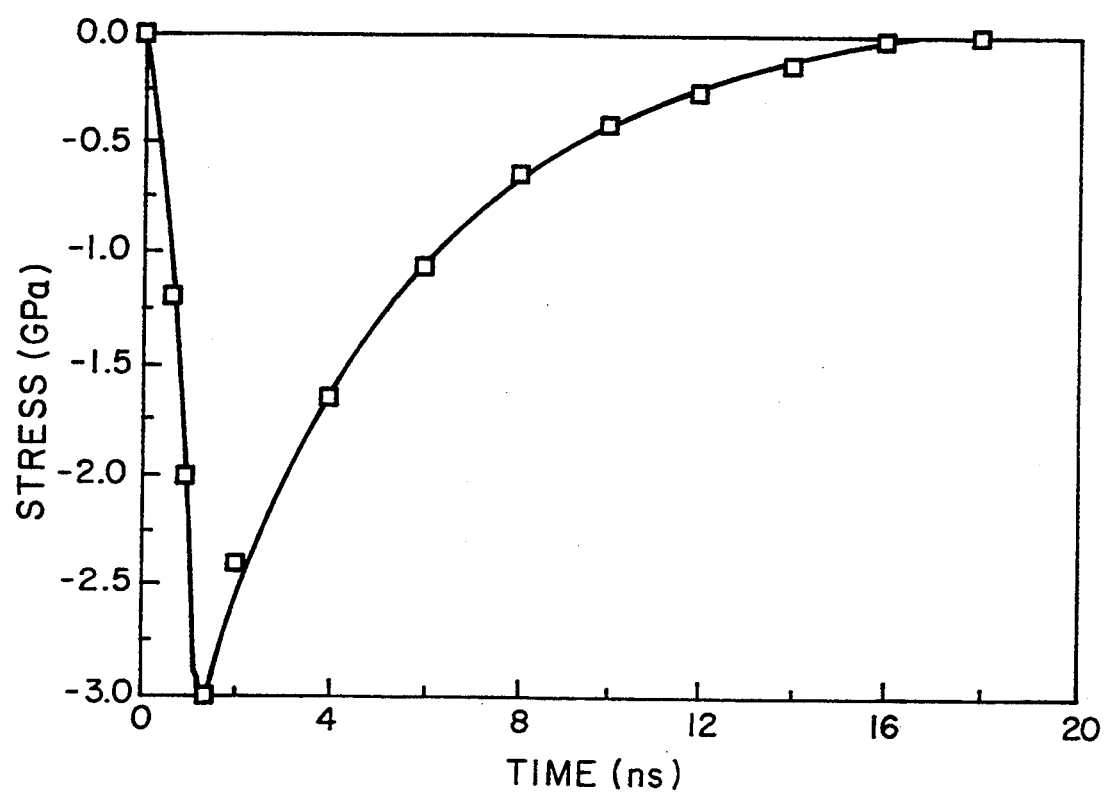
FIG. 28 show the stress pulse profile generated at a laser fluence of $8.67\times10^4$ J/m².
Figure 29:
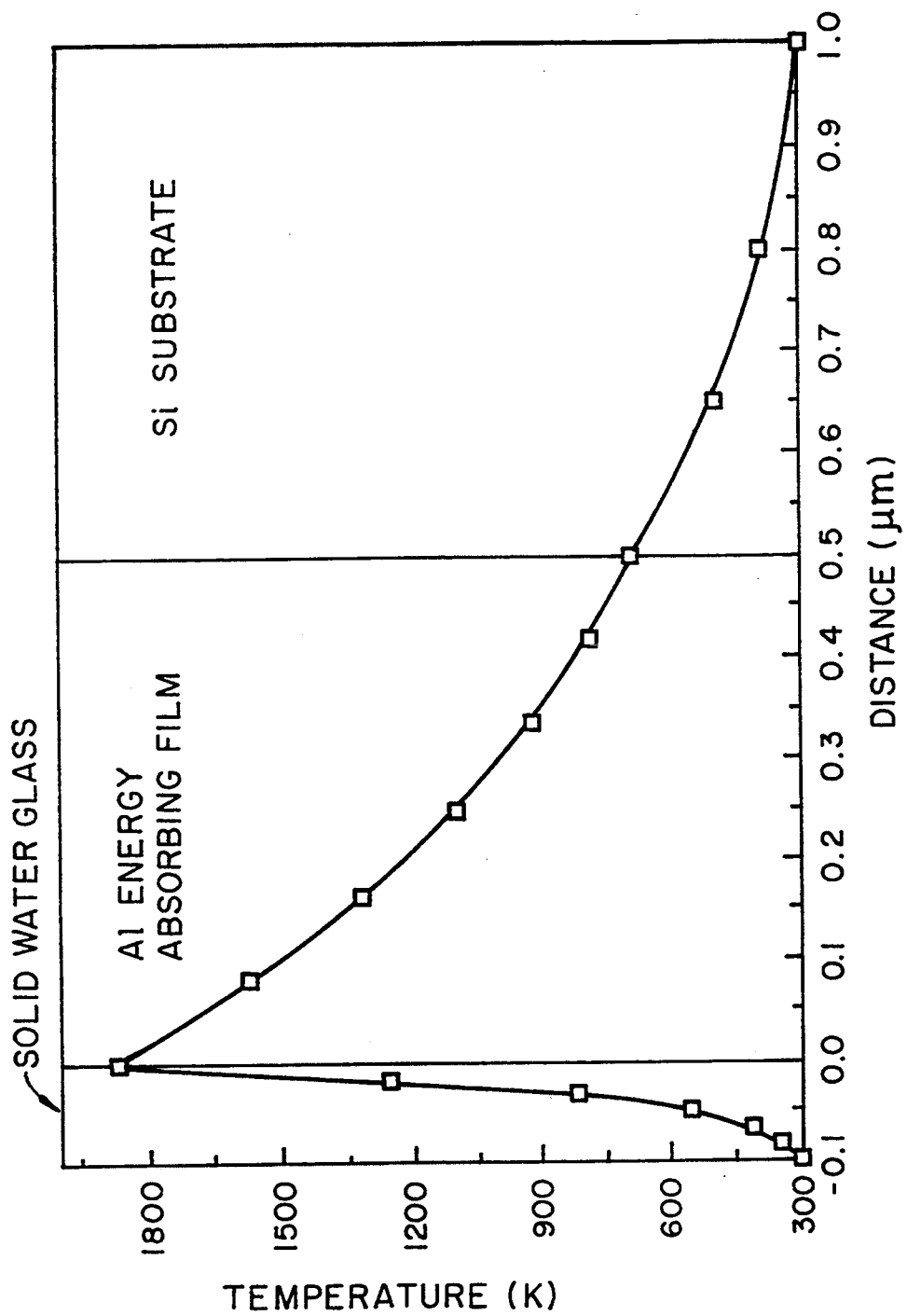
FIG. 29 shows the temperature distribution in the vicinity of the substrate/coating interface at 1.27 nanoseconds.
Figure 30:
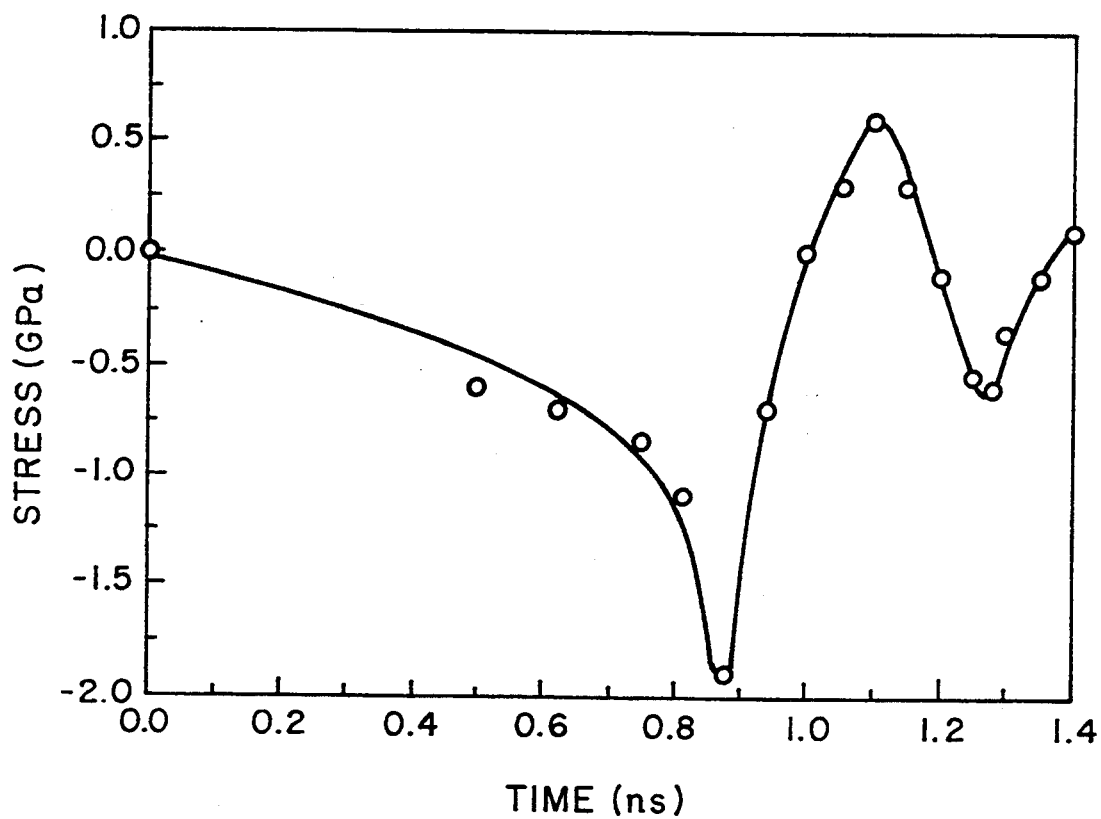
FIG. 30 shows the stress pulse history at the Al/Si interface during the first 1.4 nanoseconds.

Although a quantitative proof of the mechanism leading a stress profile exhibiting no asymptotic tail is not attempted, a phenomenological model presented here provides a possible mechanism. In the laser spallation system of FIG. 1, one compressive pulse is produced in each the substrate and the constraining medium. It is the reflection of the compressive pulse into a tension pulse from the free surface of the solid water glass that leads to the removal of the Al film from the Si/Al interface. For a 5-mm thick layer of solid water glass and an Al film of 0.5 mm thickness, the tension pulse reaches the Al/Si interface in about 1.27 ns (assuming a longitudinal wave velocity of 8000 m/sec in $SiO_2$ and 4000 m/sec in Al). FIG. 28 shows the stress pulse profile obtained for a laser fluence of $8.67 \times 10^5$ J/m$^2$, measured at the YAG source. Apart from an amplitude increase, and a pulse risetime of 1.14 ns, this profile displays a sharper post-peak decay with the stress finally decaying to zero in 17 ns. Since the laser heating pulse is 3 ns long, such a spallation process within 1.27 ns removes the heat source, resulting in the absence of a thermal tail in the generated stress pulse. Using the computer simulation previously discussed, the spatial temperature distribution within the first 1.27 ns was determined in the vicinity of the Al/SiO$_2$, and of the AlSi interface, and this is shown in FIG. 29. The Figure shows that the thermal pulse has penetrated to a depth of only 0.5 mm in the Si substrate. Furthermore the maximum temperature at the Al/Si interface is only 700K, which decays to zero within 0.5 mm of the Si substrate. Although such a temperature gradient and amplitude remain within the Si upon the removal of the heat source entrapped within the Al film, these are insufficient to produce any comparable stresses. Therefore, the decay tail of the stress pulse shown in FIG. 28 is a mechanical tail produced by the sudden impact of the Si substrate in the first 1.27 ns. More specifically, the Si surface sees only a transient pressure loading in the first 1.27 ns, resulting from a pressure pulse in the Al film, produced through the laser-Al interaction and transmitted through the Al/Si interface. FIG. 30 shows the stress history at the Al/Si interface in the first 1.4 ns as obtained from a computer simulation. Remarkably, the first sizable tension at the Al/Si interface occurs at 1.27 ns. The chopped stress pulse now acts as a new boundary condition for the Si surface.

Figure 31:
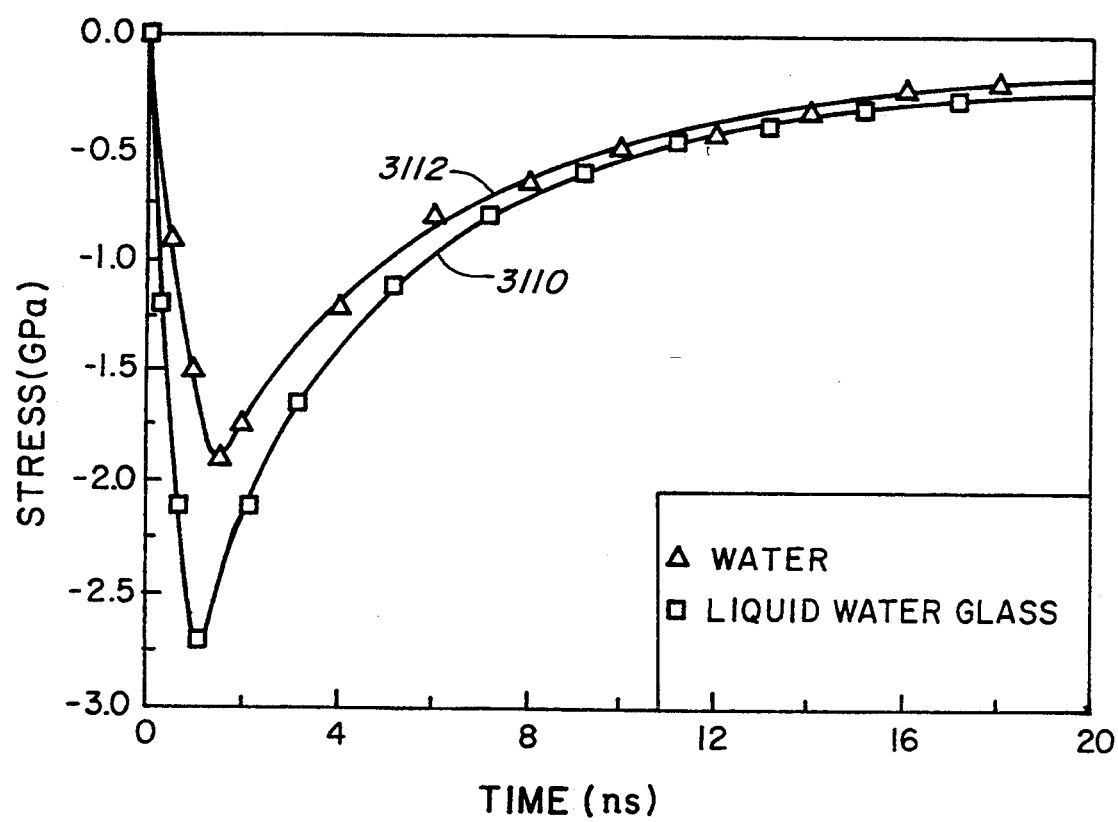
FIG. 31 shows the stress pulse profiles when using different constraining media.

FIG. 31 shows stress pulse profiles 3110, 3112 obtained with the same setup but with different constraining media, including a 25-mm thick liquid column of water, propanol, and water glass. In the above cases, a typical asymptotic thermal tail at about 5% to 20% of the peak stress can be seen. No spallation of the Al film was observed in any of these setups. Interestingly, the chopping of the stress pulse tail within the Si is analogous to the mechanism of stress pulse generation through an impact of a thin flyer plate in the plate impact experiment.

Figure 32:
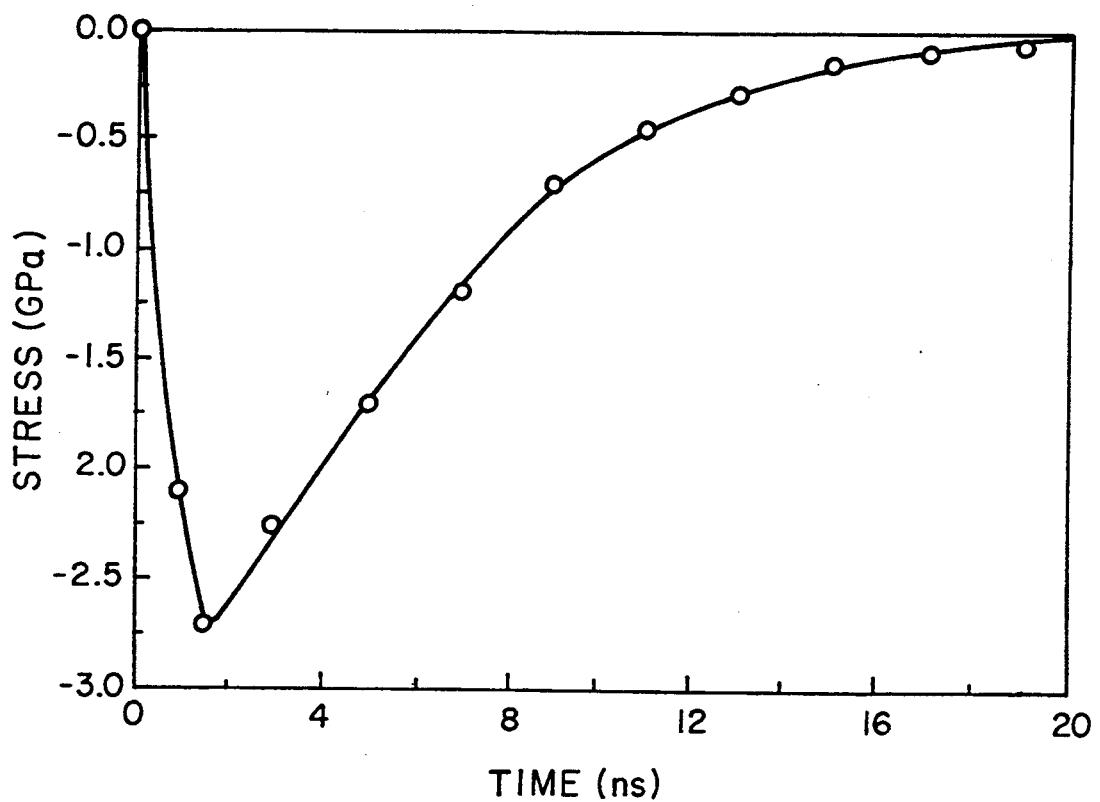
FIG. 32 shows the stress pulse profile generated when using a 3 μm thick layer of solid water glass.

Finally, the above mechanism also suggests that for a given laser fluence, the stress pulse amplitude should decrease below a critical thickness of the solid water glass layer. At lower thicknesses, a significant portion of the heat source is removed via spallation of the Al/Si interface during the rise time of the laser heating pulse. Since the pulse rise time is fixed, even an increase in the laser pulse energy can increase the stress only marginally. FIG. 32 shows the stress pulse profile obtained with a 0.3-mm thick layer of solid water glass at the same laser fluence as that used for obtaining the profile of FIG. 28. The amplitude of the pulse is 10% lower and since the transient stress pulse acting at the Al/Si interface is smaller, the stress reaches a value of zero earlier, at less than 20 ns. Both the stress pulses have the same rise time.

The foregoing method and analysis utilizing laser pulses is used briefly to obtain stress pulses with nanosecond rise times and sharp post-peak decay profiles. The stress pulses show zero stress at 17 ns, which also corresponds to the total duration of the pulse. This is in contrast to prior art techniques, in which a gradual fall of the stress pulse results into a long asymptotic tail to 5% to 20% of the peak stress level. A phenomenological model is proposed to explain the sharp stress pulse profiles produced in our setup. In some thin film applications, the coating surface can be rough. For such cases, the laser Doppler displacement interferometer employed in the present invention cannot be used because the geometric coherency of the He:Ne laser beam is scattered when it reflects from the coating free surface. In order to overcome this problem, a WAMI interferometer can be used as discussed below.

VI. HIGH VELOCITY MEASUREMENTS OF DIFFUSE SURFACES

The measurement of the stress pulse profile and amplitude of specular surfaces is usually achieved by measuring the free surface velocity of the substrate or thin film produced upon reflection of the stress pulse via a laser velocity or displacement interferometer. A major constraint with most interferometers is the availability of a specular moving surface, which preserves the geometric coherence of the reflected laser beam, and leads to interference fringes proportional to either the displacement or the velocity of the moving surface.

The incoherent reflected beam, produced by a diffuse or scattering surface, can also be used to produce velocity-related fringes using a wide-angle Michelson Interferometer (WAMI). In this system, the apparent mirror position is placed at the same distance from the beamsplitter as the mirror on the other leg of the interferometer. The same apparent distance produces interference from spatially non-coherent light, whereas, the difference in the actual optical lengths allows the interference fringes to be related to the surface velocity. Normally, an etalon is used to produce the virtual image of one of the mirrors. An alternative setup can replace the etalon by a combination of two convex lens separated by the sum of their focal lengths in both legs of the interferometer. Substrates of carbon-carbon composites and polycrystalline alumina with non-uniform microstructure on the scale of 5 to 10 mm, were considered. Additionally, replacing a set of photomultipler tubes with a fast photodiode and a high speed digitizer with 5 picosecond rise-time provides a time resolution of 0.2 ns in recording the displacement fringes. Thus, the system user can measure transient velocities with 800 m/sec amplitude and with rise times of one nanosecond.

A. A Variable Displacement-Velocity Interferometer

Figure 33:
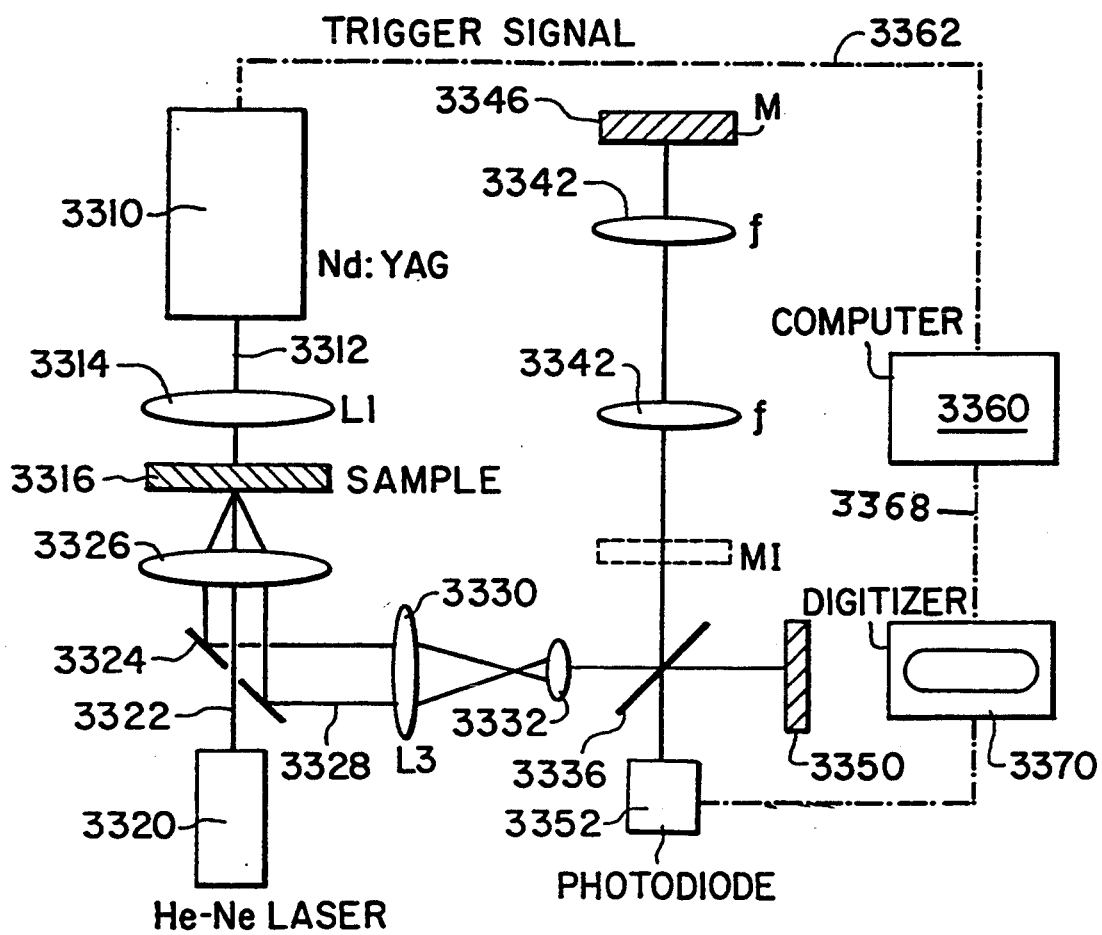
FIG. 33 is a schematic representation of a WAMI interferometer used to measure both specular and diffuse surfaces.

FIG. 33 shows the optical setup of the WAMI interferometer used to measure the free-surface velocities of both the diffuse and specular surfaces. An input laser 3310 produces a laser beam along a first axis 3312. A first optical element 3314 is disposed transverse to the first axis 3312 so as to receive the generated laser beam. The optical element 3314 passes the laser beam to the sample 3316. A second laser 3320 generates a laser beam along a second axis 3322 parallel to the first axis 3312. A first beamsplitter 3324 is located along the second axis 3322 and is angularly offset thereto. The beamsplitter 3324 passes a selected portion of the laser beam generated by the second laser 3320 to a second optical element 3326. The second optical element 3326 passes the incident laser beam onto a second face of the sample 3316. The beamsplitter 3324 also passes a selected portion of the reflected laser beam from the sample 3316 along a first output axis 3328. The first output axis 3328 is transverse to the second axis 3322. A collimating lens 3330 is positioned along the first output axis and substantially transverse thereto to receive the reflected laser beam from the first beamsplitter 3324. A telescope 3332 is also positioned along the first output axis 3328 so as to receive from the collimating lens 3330 the laser beam. The telescope 3332 passes the reflected laser beam along the first output axis 3328 to a second beamsplitter 3336. The second beamsplitter 3336 is also positioned along the first output axis 3328 and is angularly offset thereto. The beamsplitter 3336 passes a selected portion of the reflected laser beam received thereon along the first output axis 3328 to a first stationary mirror 3350, and along a second output axis 3338. The light reflected along the second output axis 3338 passes through a first focusing lens 3342 and a second focusing lens 3344 to a second stationary mirror 3346. The laser beam is reflected from the mirror 3346 back along the second output axis 3338 through the beamsplitter 3336 to a photodiode 3352. The photodiode 3352 generates an output signal 3354 that is in electrical communication with a digitizer 3370. The digitizer 3370 communicates with a computer 3360 via signal 3368. The computer 3360 generates a trigger signal 3362 that is in electrical communication with the input laser 3310.

The input laser 3310 is actuated to generate a laser pulse along the first axis 3312. The first optical element 3314 collimates the laser beam. The beam passes through the lens 3314 to a first face of the sample 3316. The laser beam received thereon produces a transient velocity in the free-surface particles located at the second face of the sample 3316 (as previously discussed). Meanwhile, the second laser 3320 is actuated to generate a laser pulse along a second axis 3322. The laser pulse is received by the first beamsplitter 3324 disposed along the second axis 3322. The first beamsplitter 3324 passes a selected portion of the laser pulse to a collimating lens 3326, which in turn focuses the laser beam onto the second face of the sample 3316. The laser beam is reflected from the second face of the sample 3316 back along the second axis 3322 through the second optical element 3326 to the beamsplitter 3324. The beamsplitter 3324 passes a selected portion of the reflected laser pulse along the first output axis 3328. The collimating lens 3330 is located along the first output axis 3328 to receive the reflected laser pulse. Light reflected from the diffuse surface of the sample 3316 is collected by the lens 3330 and directed to a telescope 3332, which condenses and collimates the beam received thereon. The telescope 3332 passes the reflected beam along the first output axis 3328 to the second beamsplitter 3336. The beamsplitter 3336 reflects the light received thereon along two legs of the WAMI interferometer, and the returning beams are recombined at the photodiode 3352. The photodiode is preferably a new port 8877 photodiode with a 200 picosecond rise time. The photodiode 3352 produces interference fringes corresponding to the amount of reflected light received thereon. An output signal 3354 is generated by the photodiode 3352 and is in electrical communication with a digitizer 3370. The fringes are recorded on the digitizer, preferably a tektronix SCD 1000 digitizer with a signal short rise time of five picoseconds.

An important aspect of the WAMI interferometer shown in FIG. 33 is the optical setup of the second leg (lenses 3342, 3344) of the interferometer. The first and second focusing lens 3342, 3344 consist of two lenses having equal focal lengths, preferably equal to 50 centimeters each. The first focusing lens 3342 and the second focusing lens 3340 are separated by the sum of their focal lengths, which images the mirror 3346 onto the apparent position MI. But the actual difference in optical paths between the optical legs of the interferometer is equal to 8 F/C (where C is equal to the velocity of light); and is about 13.3 nanosecond.

Figure 34A:
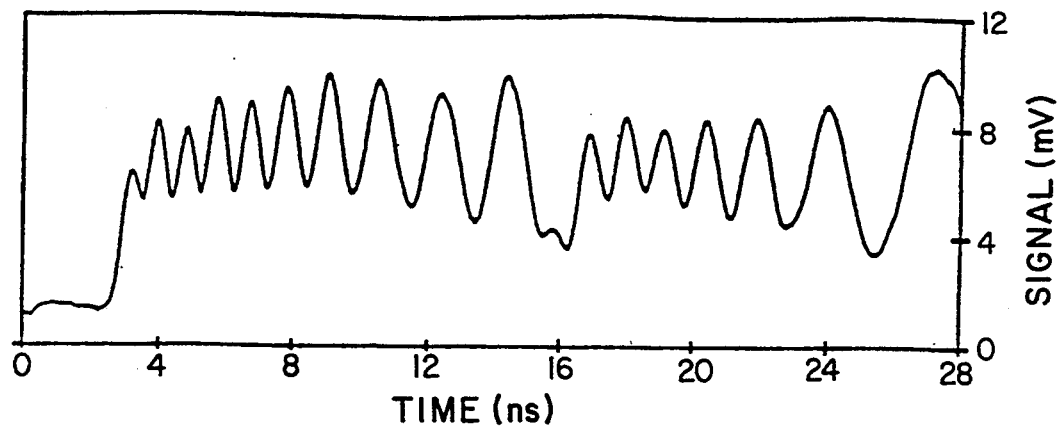
FIG. 34a shows the interference fringes obtained from a Si specular surface.
Figure 34B:
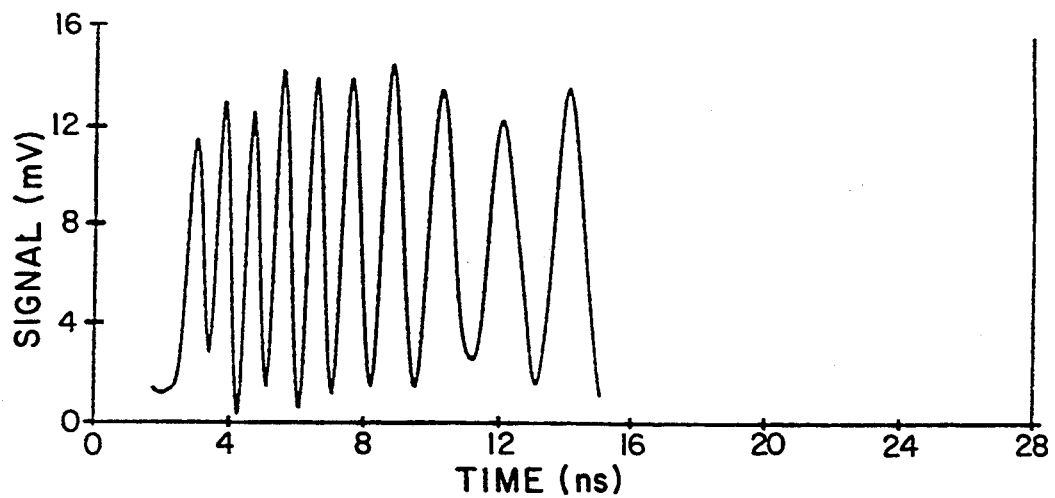
FIG. 34b shows the interference fringes of FIG. 34a without the effect of the photodiode rise time.
Figure 34C:
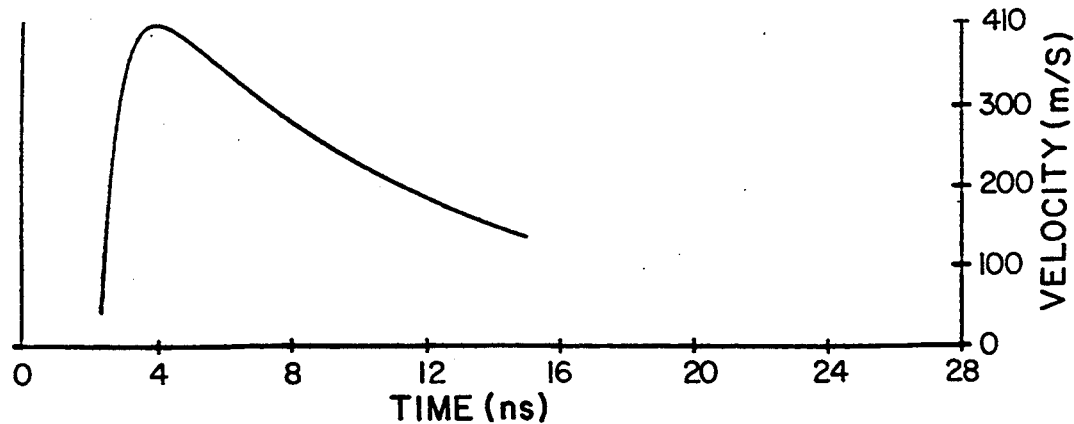

To check the interferometer system of FIG. 33, a series of stress pulses were produced in 25.5 mm diameter and 1-mm thick Si wafers with a Nd:YAG laser 3310. The surface of the wafers provides a specular surface. The fringe record obtained is shown in FIG. 34(a), and the removal of the effect of the photodiode 3352 rise time is displayed in FIG. 34(b). FIG. 34(c) displays the velocity profile corresponding to the fringe record of FIG. 34(a). FIG. 34(a) shows two sets of the interference fringes. The time difference between these sets is equal to 8f/c, or about 13.3 ns. The signal of the ideal photodiode in velocity interferometer is:

$$y(t) = A + B\cos\{(u(t) - u(t-\tau))(4\pi/\lambda) + \phi_o\} \quad (12)$$

where u(t) is the displacement of the moving surface, $\phi_o$ is initial phase, $\lambda$ is the laser wavelength, and A and B are constants. Before the arrival of the signal from the longer leg of the interferometer, $u(t-\tau)$ is constant, and the velocity interferometer within this period can be considered as a displacement interferometer. The time delay $\tau$, which in our case is about 13.3 ns, is sufficient to supply the information concerning the amplitude and even the shape of the stress wave pulse within the Si wafer.

The fringes recorded after 13.3 ns in FIG. 34(a) provide the velocity information with the displacements averaged over 13.3 ns. The velocity profile of FIG. 34(c) was obtained from the displacement fringes obtained within the first 13.3 ns. The signal-to-noise ratio is determined by two factors. First, the power of the probe laser must be high enough compared to the electronic noise level. Second, at a given laser power, measured velocity can not be too high: there is a decreasing of the signal-to-noise ratio with increasing measured velocity. Remarkably, for the Si case, use of a He:Ne laser with only a 5-mW power produce the high contrasting fringes of FIG. 34(a) for transient velocities with approximately 1 ns rise times and peak amplitudes of 800 m/sec. The use of high contrasting figures is important because they are more accurate.

If the velocity rise-time is much longer than the delay length of the interferometer, then the fringes obtained can be treated as velocity fringes and related to the velocity V(t) via equation (16). In this case, instead u(t)−u(t−$\tau$), we can use $\tau$V(t) in eqn.(16) to relate the fringe frequency to the velocity. Therefore, for a given velocity profile the delay length can be changed to transform the interferometer from a velocity to a displacement one, and vice versa. A strategy for easily changing the delay length is to choose the lens with a large focal length ratio, denoted as R. Increasing the real mirror position by distance D will move the virtual image by only $D/R^2$. Therefore, the other mirror of the interferometer has to be moved by only $D/R^2$ to obtain the interference. Choosing higher R values gives a longer flexibility in t, albeit restricted by the coherence length of the illuminating laser. Therefore, in one setup it is possible to combine the advantages of either a velocity and a displacement interferometer, that is, the high resolution of the displacement interferometer and the stability of the velocity interferometer.

Figure 35A:
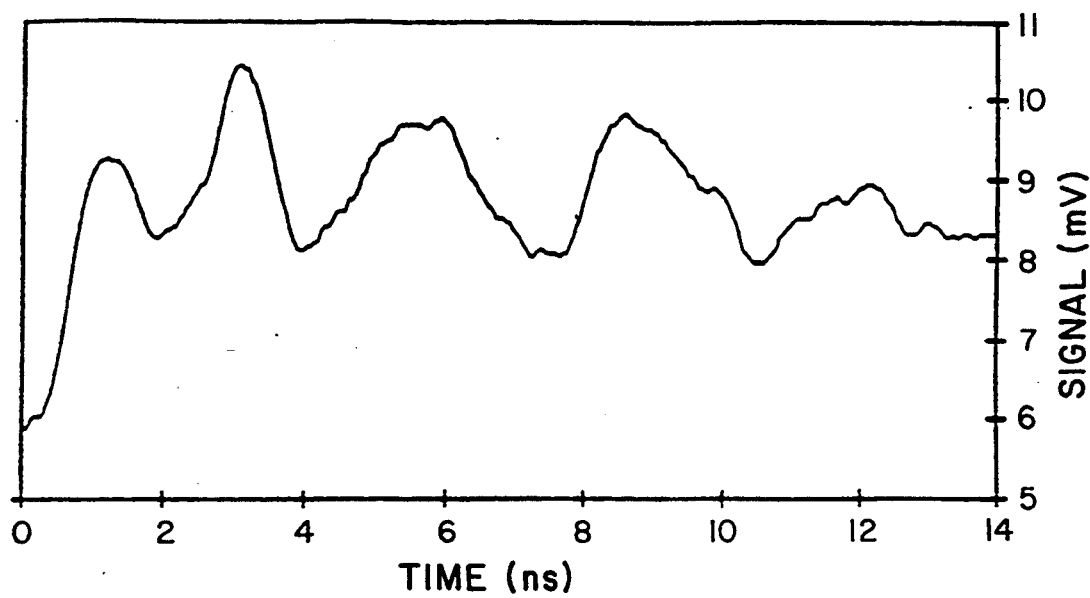
FIG. 35a shows the interference fringes obtained from a polycrystalline alumina diffuse surface.
Figure 35B:
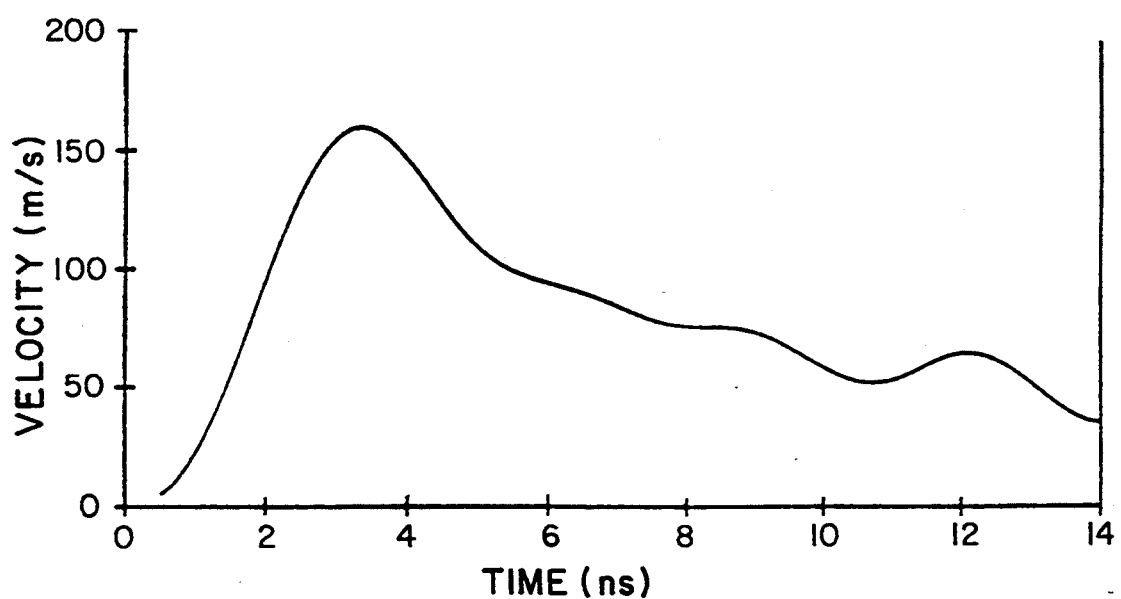

The problem of insufficient laser power becomes more important for diffuse surfaces. As a sample with a diffuse surface, slightly polished alumina substrate is used. Some degree of polishing was required to increase the total energy reflected from the sample. A scanning electron micrograph of the polished alumina surface shows the surface roughness features to within 5 to 10 mm, which lead to the scattering of the He:Ne laser beam upon reflection. In the present case, the power of the reflected beam is closer to the noise level of the photodiode. FIGS. 35(a) and (b), respectively, show the fringe record and the associated velocity profile from the alumina surface. The imperfect shape of these fringes is due to the influence of the noise. The peak velocity is equal to 150 m/sec with a rise time of 3 ns. As previously discussed, the system of FIG. 33 works as a displacement interferometer within the first 13.3 ns. At lower velocities this setup acts as the usual velocity interferometer.

Figure 36A:
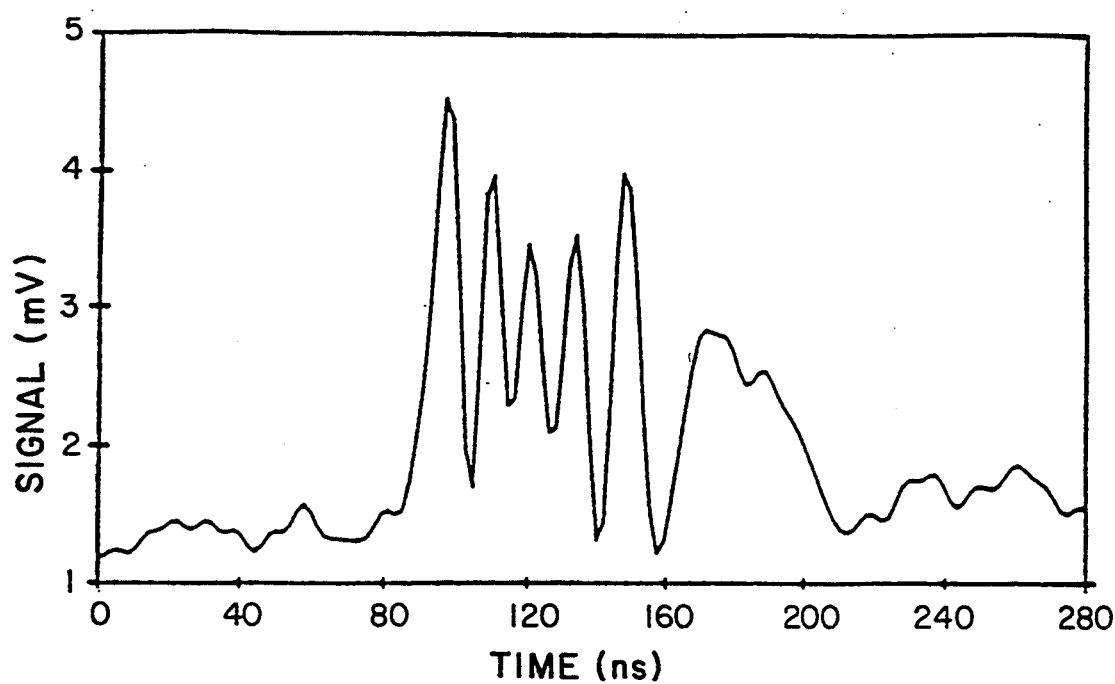
FIG. 36a shows the fringe record obtained from the rear surface of a carbon composite sample.
Figure 36B:
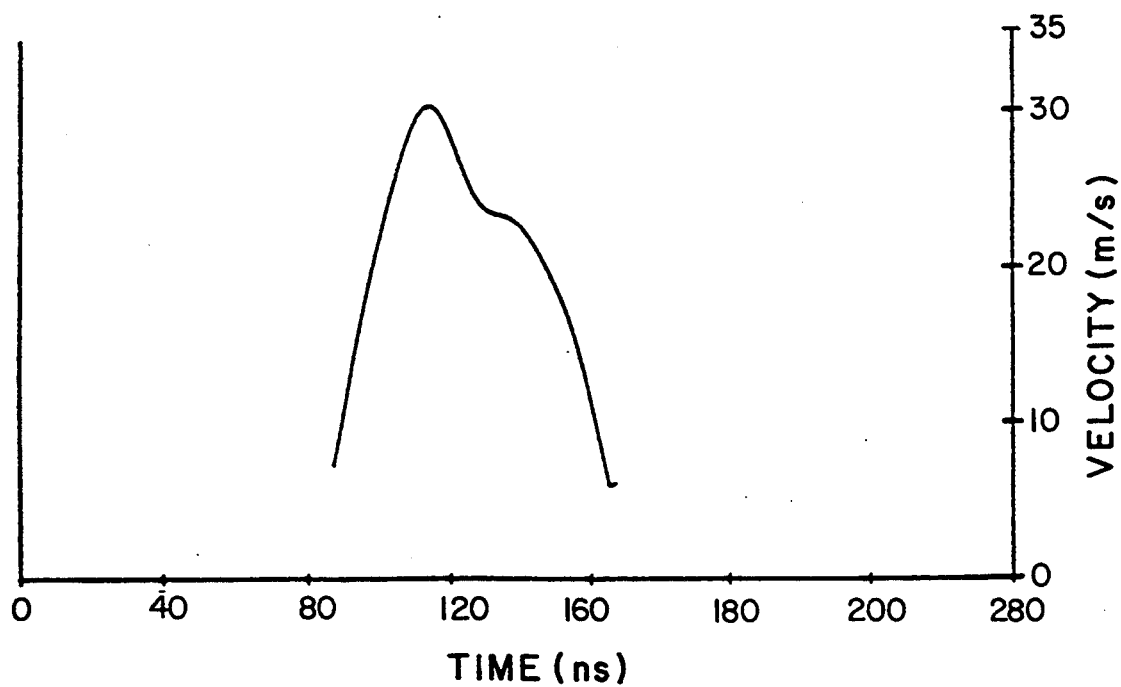

Finally, an application involving two-dimensional, laminated, carbon-carbon composites is considered. The stress wave is produced normal to the plane of the woven fabric. The aim was to measure the elastic constants by measuring the time delay between the generation of the Nd:YAG laser pulse and the start of the motion of the rear surface for a given laminate thickness. Carbon-carbon composites are difficult to polish to perfect optical quality. FIG. 36 shows the fringe record obtained from the rear surface of a carbon-carbon composite sample. As previously mentioned, the present optical system works as a velocity interferometer, as the delay time is much less than the characteristic time for the fringes. Since the fringe record beyond 13.3 ns corresponds to the displacements averaged over 13.3 ns, the velocity calculated from the fringe data beyond this time is highly inaccurate. For the sake of completion, the velocity profile in FIG. 6(b) was determined, even beyond 13.3 ns. However, the velocity data within the first 13.3 ns is accurate, during which the setup works like a displacement interferometer. Although the stress wave characteristics at the front face of the sample are the same as those obtained from the Si free-surface, a considerable dispersion of the wave occurs during its propagation within the 2 mm thickness of the composite plate. This is because the characteristic microstructural dimension (e.g., the distance between the fabric planes) is almost 10 times the length of the stress pulse of about 54 mm.

Since the expected profile of the transient surface velocity can be detected (i.e., it increases monotonically to a peak value and then decays continuously to zero), it is not necessary to use a quadrature detector to determine the point at which the velocity peaks. Since the present system can record fringes with high resolution, the point at which the velocity peaks, which corresponds to a change in the displacement fringe frequency, can be detected from the detailed digitized data. Even in the most difficult case where the reversal (from deceleration to acceleration) information is contained within half a fringe can be resolved. In the general case, however, when the nature of the surface velocity is unknown, a quadrature detector is necessary to distinguish accelerations from decelerations, and points of velocity reversals.

Stress pulses were produced in a Si substrate to obtain the displacement history of the Si surface, then differentiate it to obtain the velocity profile. Next, a linear velocity interferometer was used to determine the velocity of the free surface at the same laser fluence at which the displacement fringes were recorded. Since the velocity is approximately proportional to the photodiode output in the linear velocitimeter, the photodiode output voltage corresponds to the velocity profile. It shows that the velocity of the surface increases first and reaches a peak value, followed by a gradual decline to zero.

In accordance with the above description, the invention attains the objects set forth. It is further intended that all matter and the description and drawings be interpreted as illustrative and not in a limiting sense. While various embodiments of the invention have been described in detail, other alterations obvious to those skilled in the art are intended to be embraced within the spirit and scope of the invention. The invention is to be defined, therefore, not by the preceding detailed description but by the claims that follow.

What is claimed as new and desired to be secured by Letters Patent is:

1. A system for measuring the tensile strength of a planar interface between a substrate and a coating, said system comprising an energy source including means for generating an electromagnetic beam along a first axis, a sample assembly disposed along said first axis and positioned to receive said collimated electromagnetic beam so as to allow said beam to propagate within said assembly along said first axis, said sample assembly includes a substrate and a coating having a free surface, each said substrate and coating being axially spaced along said first axis and in intimate facing contact with each other, thereby forming a substrate/coating interface, said sample assembly further including pulse forming means, axially spaced along said first axis and in contact with said substrate opposite said substrate/coating interface for generating a stress pulse responsive to said electromagnetic beam that propagates within said sample assembly along said first axis, said substrate and said coating being arranged to receive said generated stress pulse such that said coating free surface moves in response to said stress pulse propagating therethrough, said pulse forming means including means for generating said stress pulse with a selected profile having a selected amplitude, rise portion, and decay portion, wherein said decay portion of said stress pulse attains zero amplitude in substantially less than 100 nanoseconds, measuring means for measuring the movement of said coating free surface in response to said generated stress pulse, and calculation means, coupled to said measuring means, for determining the tensile strength at said substrate/coating interface from said measured movement of said coating free surface.

2. A system according to claim 1 wherein said energy source comprises a laser.

3. A system according to claim 2 wherein said laser generates a laser pulse having a rise time in the range of 1 to 5 nanoseconds.

4. A system according to claim 1 further comprising a first optical element positioned to received said electromagnetic beam along said first axis, and adapted to pass said beam along said first axis to said sample assembly.

5. A system according to claim 4 wherein said first optical element comprises a convex lens.

6. A system according to claim 5 wherein said lens further collimates said electromagnetic beam to between about 100 $\mu$m to about 4 mm in diameter.

7. A system according to claim 1 wherein said pulse forming means comprises a confining layer and an energy absorbing layer each having a first face and a second face, said confining layer and said energy absorbing layer being axially spaced along said first axis, and said first faces of said confining layer and of said energy absorbing layer being in intimate facing contact with each other, and said energy absorbing layer second face being in intimate facing contact with said substrate opposite said substrate/coating interface, and said confining adapted to receive said electromagnetic beam along said first axis.

8. A system according to claim 7 wherein said confining layer comprises solid water glass.

9. A system according to claim 7 wherein said energy absorbing layer is a metal.

10. A system according to claim 9 wherein said metal is aluminum.

11. A system according to claim 7 wherein said energy absorbing layer is in the range of 0.1 $\mu$m to 1.0 $\mu$m thick.

12. A system according to claim 1 wherein said substrate is a single crystal Si wafer.

13. A system according to claim 12 wherein said Si wafer is in the range of 10 to 30 mm in diameter, and in the range of 0.5 mm to 2.0 mm thick.

14. A system according to claim 1 wherein said measuring means comprises a laser Doppler interferometer.

15. A system according to claim 14 wherein said laser Doppler interferometer measures said movement of said coating free surface.

16. A system according to claim 1 wherein said rise portion of said stress pulse attains said selected amplitude in between about 0.5 nanoseconds and about 3.5 nanoseconds.

17. A system according to claim 7 wherein said confining layer is a liquid.

18. A system according to claim 7 wherein said confining layer is selected from the group consisting of 2-propanol, water, liquid silicon dioxide and solid water glass.

19. A system according to claim 7 wherein said coating comprises a plurality of layers.

20. A system according to claim 7 wherein said energy absorbing layer comprises a plurality of layers.

21. A system according to claim 7 wherein said confining layer is between about 0.1 $\mu$m and about 10 $\mu$m thick.

22. A method for measuring the tensile strength of planar interfaces, comprising the steps of generating an electromagnetic beam generally along a first axis, providing an axial arrangement of planar interfaces forming a sample assembly having a free surface, and positioned along said first axis so as to receive said electromagnetic beam, generating a stress pulse within said sample assembly to produce movement within said free surface of said sample, said stress pulse having a selected magnitude, rise portion, and decay portion, maximizing said stress pulse within said sample assembly such that said decay portion of said stress pulse attains zero magnitude in substantially less than 100 nanoseconds, measuring directly the movement of said sample coating including measuring the displacement history of said free surface, and determining the interface tensile strength from said displacement measurement.

23. The method of claim 22 including the steps of configuring said sample assembly to have a confining layer, an energy absorbing layer, a substrate, and a coating, each being axially spaced apart along said first axis, disposing said energy absorbing layer between and contacting said confining layer and disposing said substrate and said coating in intimate facing contact with said substrate, such that the face of said coating opposite that of said substrate defines said free surface of said sample assembly.

24. The method of claim 23 including the step of configuring said confining layer to comprise solid water glass.

25. The method of claim 23 including the step of configuring said energy absorbing layer to comprise a metal.

26. The method of claim 23 including the step of configuring said substrate to comprise silicon.

27. The method of claim 23 including the step of configuring said confining layer to comprise a liquid.

28. The method of claim 22 including the step of configuring said decay portion of said stress pulse to attain zero magnitude in less than 20 nanoseconds.

29. The method of claim 23 including the step of configuring said coating to comprise a plurality of layers.

30. The method of claim 23 including the step of configuring said energy absorbing layer to comprise a plurality of layers.

* * * * *